(12) United States Patent
Zheng et al.

(10) Patent No.: US 11,060,976 B2
(45) Date of Patent: Jul. 13, 2021

(54) METHODS AND SYSTEMS FOR OPTICAL CONTROL OF METAL PARTICLES WITH THERMOPHORESIS

(71) Applicant: BOARD OF REGENTS, THE UNIVERSITY OF TEXAS SYSTEM, Austin, TX (US)

(72) Inventors: Yuebing Zheng, Austin, TX (US); Linhan Lin, Austin, TX (US); Xiaolei Peng, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 89 days.

(21) Appl. No.: 16/331,249

(22) PCT Filed: Sep. 8, 2017

(86) PCT No.: PCT/US2017/050605
§ 371 (c)(1),
(2) Date: Mar. 7, 2019

(87) PCT Pub. No.: WO2018/049109
PCT Pub. Date: Mar. 15, 2018

(65) Prior Publication Data
US 2019/0195805 A1 Jun. 27, 2019

Related U.S. Application Data

(60) Provisional application No. 62/385,454, filed on Sep. 9, 2016.

(51) Int. Cl.
*G01N 21/65* (2006.01)
*G01N 21/05* (2006.01)
(Continued)

(52) U.S. Cl.
CPC .......... *G01N 21/658* (2013.01); *G01N 21/01* (2013.01); *G01N 21/64* (2013.01)

(58) Field of Classification Search
CPC .............. B05D 1/00–42; B05D 3/0263; B05D 3/0281; B05D 3/029; B05D 3/06;
(Continued)

(56) References Cited

U.S. PATENT DOCUMENTS

| 4,425,261 A | 1/1984 | Stenius et al. |
| 6,016,226 A | 1/2000 | Arisawa et al. |

(Continued)

FOREIGN PATENT DOCUMENTS

WO     2016023904 A1     2/2016

OTHER PUBLICATIONS

International Search Report and Written Opinion dated Nov. 13, 2017 in International Application No. PCT/US2017/050605.
(Continued)

*Primary Examiner* — Dah-Wei D. Yuan
*Assistant Examiner* — Kristen A Dagenais-Englehart
(74) *Attorney, Agent, or Firm* — Meunier Carlin & Curfman LLC

(57) ABSTRACT

Disclosed herein are methods comprising illuminating a first location of a plasmonic substrate with electromagnetic radiation, wherein the electromagnetic radiation comprises a wavelength that overlaps with at least a portion of the plasmon resonance energy of the plasmonic substrate. The plasmonic substrate can be in thermal contact with a liquid sample comprising a plurality of metal particles and a surfactant, the liquid sample having a first temperature. The methods can further comprise generating a confinement region at a location in the liquid sample proximate to the first location of the plasmonic substrate, wherein at least a portion of the confinement region has a second temperature
(Continued)

that is greater than the first temperature such that the confinement region is bound by a temperature gradient. The methods can further comprise trapping at least a portion of the plurality of metal particles within the confinement region.

17 Claims, 40 Drawing Sheets

(51) Int. Cl.
*G01N 21/64* (2006.01)
*G01N 21/01* (2006.01)

(58) Field of Classification Search
CPC .......... B05D 3/065; B05D 3/067; B05D 7/14; B05D 2401/32; C23C 18/14; C23C 20/00–08; C23C 26/00
USPC ................ 427/498, 512, 521, 551–559, 581; 204/491, 493, 494, 500, 501, 509, 533
See application file for complete search history.

(56) References Cited

U.S. PATENT DOCUMENTS

| | | | |
|---|---|---|---|
| 6,348,295 B1 | 2/2002 | Griffith et al. | |
| 8,431,903 B2 | 4/2013 | Baaske et al. | |
| 9,096,430 B2 | 8/2015 | Xiao et al. | |
| 10,281,398 B2 | 5/2019 | Zheng et al. | |
| 10,603,685 B2* | 3/2020 | Zheng | B05D 3/06 |
| 10,620,121 B2* | 4/2020 | Zheng | G01N 15/14 |
| 10,640,873 B2* | 5/2020 | Zheng | C23C 18/1667 |
| 2003/0224162 A1 | 12/2003 | Hirai et al. | |
| 2005/0281944 A1 | 12/2005 | Jang et al. | |
| 2006/0057502 A1 | 3/2006 | Okada et al. | |
| 2008/0245430 A1 | 10/2008 | Adleman et al. | |
| 2009/0034053 A1 | 2/2009 | King et al. | |
| 2010/0142038 A1 | 6/2010 | Sugiura et al. | |
| 2011/0084218 A1 | 4/2011 | Duhr et al. | |
| 2014/0204385 A1 | 7/2014 | Ouyang et al. | |
| 2015/0036234 A1 | 2/2015 | Ben-yakar et al. | |
| 2015/0056426 A1 | 2/2015 | Grouchko et al. | |
| 2015/0111199 A1 | 4/2015 | Hart et al. | |
| 2015/0204810 A1 | 7/2015 | Pan et al. | |
| 2015/0316480 A1 | 11/2015 | Baaske et al. | |
| 2015/0380120 A1* | 12/2015 | Wereley | G21K 1/006 250/251 |
| 2017/0166760 A1 | 6/2017 | Dietsch et al. | |
| 2017/0194144 A1 | 7/2017 | Duan et al. | |
| 2018/0348128 A1 | 12/2018 | Zheng et al. | |
| 2019/0113453 A1 | 4/2019 | Zheng et al. | |
| 2020/0264101 A1* | 8/2020 | Zheng | B32B 27/283 |

OTHER PUBLICATIONS

International Preliminary Report on Patentability dated Mar. 12, 2019 in International Application No. PCT/US2017/050605.
Ahn, W et al., "Photonic-Plasmonic Mode coupling in On-Chip Integrated Optoplasmonic Molcules", ACS Nano 2012, 6, 951-960.
Arias-González, et al., "Optical forces on small particles: Attractive and repulsive nature and plasmon-resonance conditions", J. Opt. Soc. Am. A 20, 1201-1209 (2003).
Ayala-Orozco, et al., "Au nanomatryoshkas as efficient near-infrared photothermal transducers for cancer treatment: Benchmarking against nanoshells.", ACS Nano 8, 6372-6381 (2014).
Baffou, et al., "Nanoscale Control of Optical Heating in Complex Plasmonic Systems.", ACS Nano 2010, 4(2), 709-716.
Baffou, et al., "Photoinduced Heating of Nanoparticle Arrays.", ACS Nano 2013, 7(8), 6478-6488.
Baffou, et al., "Super-Heating and Micro-Bubble Generation around Plasmonic Nanoparticles under cw Illumination", J Phys Chem C 2014, 118(9), 4890-4898.
Baffou, et al., "Thermo-plasmonics: Using metallic nanostructures as nano-sources of heat", Laser Photonics Rev. 7, 171-187 (2013).
Bao, et al., "Optical Printing of Electrodynamically Coupled Metallic Nanoparticle Arrays", J. Phys. Chem. C 2014, 118, 19315-19321.
Bendix, et al., "Optical trapping of nanoparticles and quantum dots", IEEE J. Sel. Top. Quantum Electron. 20, 15-26 (2014).,.
Berthelot, et al., "Three-dimensional manipulation with scanning near-field optical nanotweezers", Nat Nano 2014, 9(4): 295-299.
Blattmann, et al., "Plasmonic coupling dynamics of silver nanoparticles in an optical trap", Nano Lett. 15, 7816-7821 (2015).
Boltasseva, et al., "Low-loss plasmonic metamaterials", Science 331, 290-291 (2011).
Bosanac, et al., "Efficient optical trapping and visualization of silver nanoparticles", Nano Lett. 8, 1486-1491 (2008).
Bradley, et al., "Clickable janus particles", J. Am. Chem. Soc. 138, 11437-11440 (2016).
Braun, et al., "Optically Controlled Thermophoretic Trapping of Single Nano-Objects", ACS Nano 2013, 7(12): 11200-11208.
Braun, et al., "Single molecules trapped by dynamic inhomogeneous temperature fields", Nano Lett. 15, 5499-5505 (2015).
Braun, et al., "Trapping of Single Nano-Objects in Dynamic Temperature Fields", Phys. Chem. Chem. Phys. 2014, 16, 15207-15213.
Bregulla, et al., "Thermo-osmotic flow in thin films", Phys. Rev. Lett. 116, 188303 (2016).
Cheng, et al., "Light-triggered assembly of gold nanoparticles for photothermal therapy and photoacoustic imaging of tumors in vivo", Adv. Mater. 29, 1604894 (2017).
Coskun, et al., "Polyol synthesis of silver nanowires: An extensive parametric study", Cryst. Growth Des. 11, 4963-4969 (2011).
Ditlbacher, et al., "Silver nanowires as surface plasmon resonators", Phys. Rev. Lett. 95, 257403 (2005). 1-4 pages.
Eastman, Ed, "Theory of the soret effect", J. Am. Chem. Soc. 50, 283-291 (1928).
Hildebrandt, et al., "Surface-Enhanced Resonance Raman Spectroscopy of Rhodamine 6G Adsorbed on Colloidal Silver", J. Phys. Chem. 1984, 88, 5935-5944.
Huang, et al., "Reversal of the optical force in a plasmonic trap", Opt. Lett. 33, 3001-3003 (2008).
Ilic, et al., "Exploiting Optical Asymmetry for Controlled Guiding of Particles with Light", ACS Photonics 2016, 3, 197-202.
Iracki, et al., "Charged Micelle Depletion Attraction and Interfacial Colloidal Phase Behavior", Langmuir 2010, 26(24): 18710-18717.
Jamshidi, et al., "NanoPen: Dynamic, Low-Power, and Light-Actuated Patterning of Nanoparticles", Nano Lett. 2009, 9, 2921-2925.
Jensen, et al., "Optical trapping and two-photon excitation of colloidal quantum dots using bowtie apertures", ACS Photonics, 2016, 3(3), 423-427.
Jin, et al., "Photoinduced Conversion of Silver Nanospheres to Nanoprisms", Science 2001, 294, 1901-1903.
Juan, et al., "Plasmon nano-optical tweezers", Nat. Photonics 2011, 5(6): 349-356.
Juan, et al., "Self-induced back-action optical trapping of dielectric nanoparticles", Nat. Phys. 5, 915-919 (2009).
Klajn, et al., "Light-Controlled Self-Assembly of Reversible and Irreversible Nanoparticle Suprastructures", Proc. Natl. Acad. Sci. 2007, 104, 10305-10309.
Kramer, et al., "Plasmonic properties of silicon nanocrystals doped with boron and phosphorus", Nano Lett. 15, 5597-5603 (2015).
Kundu, et al., "Light-Controlled Self-Assembly of Non-Photoresponsive Nanoparticles", Nat. Chem 2015, 7, 646-652.
Lehmuskero, et al., "Laser trapping of colloidal metal nanoparticles", ACS Nano 9, 3453-3469 (2015).
Li, et al., "Absorption spectroscopy of single optically trapped gold nanorods", Nano Lett. 15, 7731-7735 (2015).
Li, et al., "Ph-Programmable Self-Assembly of Plasmonic Nanoparticles: Hydrophobic Interaction Versus Electrostatic Repulsion", Nanoscale 2015, 7, 956-964. Nov. 2014.
Li, et al., "Reversible Plasmonic Circular Dichroism of Au Nanorod and DNA Assemblies", J. Am. Chem. Soc. 2012, 134, 3322-3325.
Lin, et al., "Bubble-Pen Lithography", Nano Lett 2016, 16(1), 701-708.

(56) References Cited

OTHER PUBLICATIONS

Lin, et al., "Light-directed reversible assembly of plasmonic nanoparticles using plasmon-enhanced thermophoresis", ACS Nano 10, 9659-9668 (2016).
Liu, et al., "Thermoresponsive Assembly of Charged Gold Nanoparticles and Their Reversible Tuning of Plasmon Coupling", Chem. Int. Ed. 2012, 51, 6373-6377.
Messina, et al., "Manipulation and Raman Spectroscopy with Optically Trapped Metal Nanoparticles Obtained by Pulsed Laser Ablation in Liquids", J. Phys. Chem. C 2011, 115, 5115-5122.
Min, et al., "Focused plasmonic trapping of metallic particles", Nat Commun 2013, 4, 3891, 7 pages.
Ndukaife, et al., "Long-range and rapid transport of individual nano-objects by a hybrid electrothermoplasmonic nanotweezer", Nat Nano 2016, 11(1): 53-59. Nov. 2015.
Nedev, et al., "Optical Force Stamping Lithography", Nano Lett. 2011, 11, 5066-5070.
Ohlinger, et al., "Optothermal escape of plasmonically coupled silver nanoparticles from a three-dimensional optical trap", Nano Lett. 11, 1770-1774 (2011).
Patra, et al., "Plasmofluidic Single-Molecule Surface-Enhanced Raman Scattering from Dynamic Assembly of Plasmonic Nanoparticles", Nat. Commun. 2014, 5, 4357. 8 pages.
Pelton, et al., "Optical trapping and alignment of single gold nanorods by using plasmon resonances", Opt. Lett. 31, 2075-2077 (2006). Proc. of SPIE, vol. 6323.
Piazza, et al., "Thermophoresis in colloidal suspensions", J. Phys.: Condens. Matter 20, 153102 (2008). 18 pages.
Pietryga, et al., "Spectroscopic and Device Aspects of Nanocrystal Quantum Dots", Chem Rev 2016, 116(18), 10513-10622.
Pignolet, et al., "Electrodeposition of latex particles in the presence of surfactant: Investigation of deposit morphology", J Colloid Interface Sci 2010, 349(1): 41-48.
Pinchuk, et al., "Size-dependent Hamaker constants for silver and gold nanoparticles"[P], roc. SPIE 9549, Physical Chemistry of Interfaces and Nanomaterials XIV, 95491J, 2015, p. 1-7.
Prikulis, et al., "Optical spectroscopy of single trapped metal nanoparticles in solution", Nano Lett. 4, 115-118 (2004).
Regmi, et al., "All-dielectric silicon nanogap antennas to enhance the fluorescence of single molecules", Nano Lett. 16, 5143-5151 (2016).
Reichl, et al., "Why charged molecules move across a temperature gradient: The role of electric fields", Phys. Rev. Lett. 112, 198101 (2014).
Righini, et al., "Parallel and selective trapping in a patterned plasmonic landscape", Nat Phys 2007, 3(7): 477-480.
Roelants, et al., "Parameters affecting aqueous micelles of CTAC, TTAC, and DTAC probed by fluorescence quenching", Langmuir 1987, 3(2): 209-214.
Roy, et al., "Self-Assembly of Mesoscopic Materials to Form Controlled and Continuous Patterns by Thermo-Optically Manipulated Laser Induced Microbubbles", Langmuir, 2013m 29(47), 14733-14742.
Ruijgrok, et al., "Brownian fluctuations and heating of an optically aligned gold nanorod", Phys. Rev. Lett. 107, 037401 (2011).
Scarabelli, et al., "Monodisperse Gold Nanotriangles: Size Control, Large-Scale Self-Assembly, and Performance in Surface-Enhanced Raman Scattering", ACS Nano 2014, 8, 5833-5842.
Selhuber-Unkel, et al., "Quantitative optical trapping of single gold nanorods", Nano Lett. 8, 2998-3003 (2008).
Shao, et al., "Gold nanorod rotary motors driven by resonant light scattering", ACS Nano 9, 12542-12551 (2015).
Si, et al., "Reversible Self-Assembly of Carboxylated Peptide-Functionalized Gold Nanoparticles Driven by Metal-Ion Coordination", ChemPhysChem 2008, 9, 1578-1584.
Stetciura, et al., "Composite SERS-Based Satellites Navigated by Optical Tweezers for Single Cell Analysis", Analyst 2015, 140, 4981-4986.
Svedberg, et al., "Creating Hot Nanoparticle Pairs for Surface-Enhanced Raman Spectroscopy through Optical Manipulation", Nano Lett. 2006, 6, 2639-2641.
Taladriz-Blanco, et al., "Reversible Assembly of Metal Nanoparticles Induced by Penicillamine", Dynamic Formation of SERS Hot Spots. J. Mater. Chem. 2011, 21, 16880-16887.
Tanaka, et al., "Nanostructured potential of optical trapping using a plasmonic nanoblock pair", Nano Lett. 13, 2146-2150 (2013).
Thamdrup, et al., "Light-Induced Local Heating for Thermophoretic Manipulation of DNA in Polymer Micro- and Nanochannels", Nano Lett. 10, 826-832 (2010).
Tong, et al., "Alignment, rotation, and spinning of single plasmonic nanoparticles and nanowires using polarization dependent optical forces", Nano Lett. 10, 268-273 (2010).,.
Tong, et al., "Optical Aggregation of Metal Nanoparticles in a Microfluidic Channel for Surface-Enhanced Raman Scattering Analysis", Lab Chip 2009, 9, 193-195.
Tong, et al., "Plasmon hybridization reveals the interaction between individual colloidal gold nanoparticles confined in an optical potential well", Nano Lett. 11, 4505-4508 (2011).
Tulpar, et al., "Decay Lengths of Double-Layer Forces in Solutions of Partly Associated Ions", Langmuir 2001, 17(26): 8451-8454.
Urban, et al., "Laser Printing Single Gold Nanoparticles", Nano Lett. 2010, 10, 4794-4798.
Vigolo, et al., "Thermophoresis and thermoelectricity in surfactant solutions", Langmuir 26, 7792-7801 (2010).
Wang, et al., "Plasmonic trapping with a gold nanopillar", ChemPhysChem 2012, 13, 2639-2648.
Wu, MC, "Optoelectronic tweezers", Nat. Photonics 2011, 5(6): 322-324.
Würger, A, "Hydrodynamic Boundary Effects on Thermophoresis of Confined Colloids", Phys. Rev. Lett. 2016, 116, 138302.
Würger, A, "Thermal non-equilibrium transport in colloids", Rep. Prog. Phys. 73, 126601 (2010).
Wuürger, A, "Thermophoresis in Colloidal Suspensions Driven by Marangoni Forces", Phys. Rev. Lett. 2007, 98(13): 138301.
Wuürger, A, "Transport in Charged Colloids Driven by Thermo-electricity", Phys. Rev. Lett. 2008, 101, 108302.
Yan, et al., "Controlling the position and orientation of single silver nanowires on a surface using structured optical fields", ACS Nano 6, 8144-8155 (2012).
Yan, et al., "Fabrication of a Material Assembly of Silver Nanoparticles Using the Phase Gradients of Optical Tweezers", Phys. Rev. Lett. 114, 143901 (2015). p. 1-5.
Yan, et al., "Why single-beam optical tweezers trap gold nanowires in three dimensions", ACS Nano 7, 8794-8800 (2013).
Yoshikawa, et al., "Reversible Assembly of Gold Nanoparticles Confined in an Optical Microcage", Phys. Rev. E 2004, 70, 061406. p. 1-6.
Zhang, et al., "Trapping and sensing 10 nm metal nanoparticles using plasmonic dipole antennas", Nano Lett. 10, 1006-1011 (2010).
Zheng, et al., "Nano-Optical Conveyor Belt, Part II: Demonstration of Handoff Between Near-Field Optical Traps.", Nano Lett. 14, 2971-2976 (2014).,.
Edwards, et al., "Depletion-Mediated Potentials and Phase Behavior for Micelles, Macromolecules, Nanoparticles, and Hydrogel Particles", Langmuir 2012, 28(39): 13816-13823.
Fazio, et al., "SERS Detection of Biomolecules at Physiological Ph Via Aggregation of Gold Nanorods Mediated by Optical Forces and Plasmonic Heating", Sci. Rep. 2016, 6, 26952.
Govorov, et al., "Generating heat with metal nanoparticles", Nano Today 2, 30-38 (2007).
Grigorenko, et al., "Nanometric Optical Tweezers Based on Nanostructured Substrates", Nat. Photonics 2008, 2, 365-370.
Gu, et al., "Tweezing and Manipulating Micro- and Nanoparticles by Optical Nonlinear Endoscopy", Light Sci Appl 2014, 3, e126.
Guffey, et al., "All-Optical Patterning of Au Nanoparticles on Surfaces Using Optical Traps", Nano Lett. 2010, 10, 4302-4308.
Hansen, et al., "Expanding the optical trapping range of gold nanoparticles", Nano Lett. 5, 1937-1942 (2005).

(56) References Cited

OTHER PUBLICATIONS

Hernandez-Santana, et al., "Nanolithography: Written with Light", Nature Nanotechnol. 2010, 5, 629-630.

\* cited by examiner

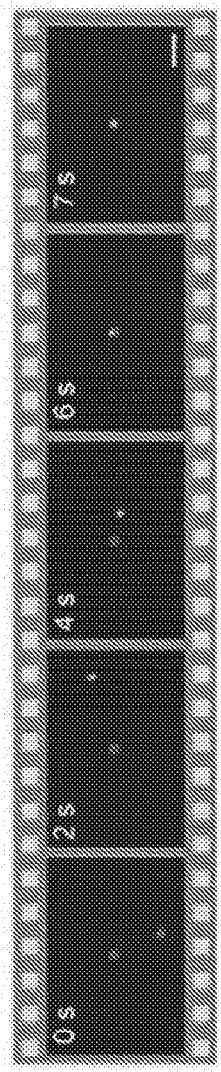
*FIG. 47*
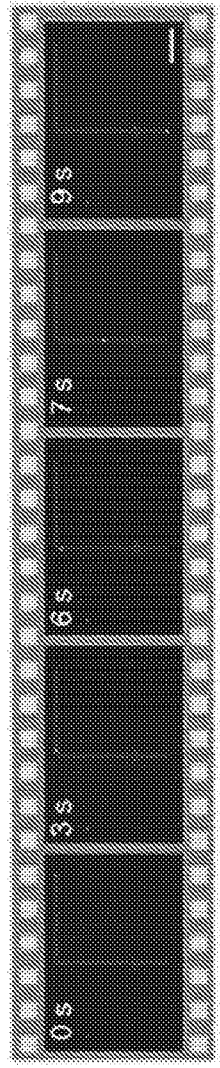
*FIG. 48*
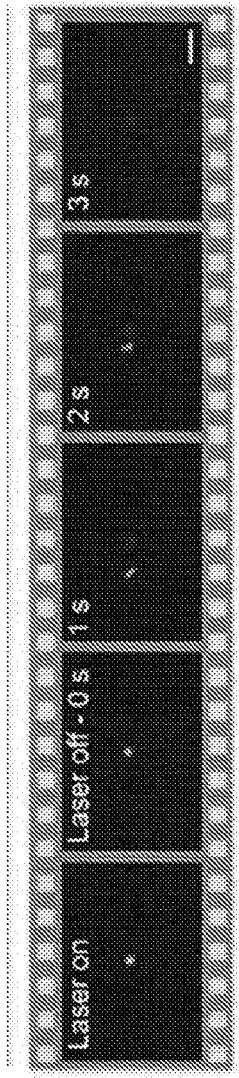
*FIG. 49*
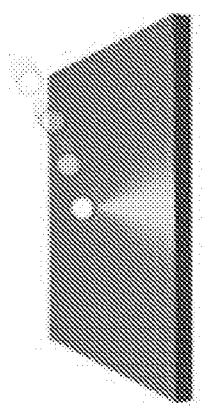
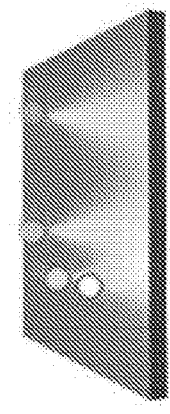
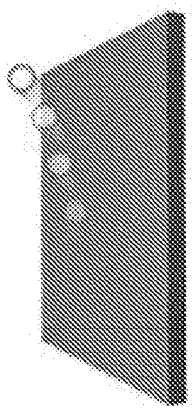

METHODS AND SYSTEMS FOR OPTICAL CONTROL OF METAL PARTICLES WITH THERMOPHORESIS

CROSS-REFERENCE TO RELATED APPLICATIONS

This application is a national stage application filed under 35 U.S.C. § 371 of PCT/US2017/050605 filed Sep. 8, 2017, which claims the benefit of U.S. Provisional Application No. 62/385,454, filed Sep. 9, 2016, both of which are hereby incorporated herein by reference in their entireties.

BACKGROUND

Associated with the excitation of surface plasmons, metallic nanoparticles can manipulate light at the subwavelength scale where the intensive localized electromagnetic field strongly couples with nanoscale matters for new physical phenomena and applications. Optical and electrical properties of the plasmonic nanoparticles depend on the particle compositions, sizes, shapes, and the inter-particle interactions. Plasmonic nanoparticle assemblies that feature high particle density and small inter-particle distance are of importance for many applications that utilize the multiple and intensive electromagnetic "hot spots" in the assemblies. The capability of reversibly controlling the particle assemblies with external stimuli enables the dynamically tunable plasmonic coupling for advanced applications. Reversible assembly of functionalized metallic nanoparticles driven by pH of the solution (Taladriz-Blanco P et al. *J. Mater. Chem.* 2011, 21, 16880-16887; Li W et al. *Nanoscale* 2015, 7, 956-964), environmental temperature (Li Z et al. *J. Am. Chem. Soc.* 2012, 134, 3322-3325; Liu Y et al. *Angew. Chem. Int. Ed.* 2012, 51, 6373-6377), metal-ion coordination (Si S et al. *ChemPhysChem* 2008, 9, 1578-1584), voltage (Su B et al. *J. Am. Chem. Soc.* 2004, 126, 915-919), and light (Klajn R et al. *Proc. Natl. Acad. Sci.* 2007, 104, 10305-10309; Kundu P K et al. *Nat. Chem* 2015, 7, 646-652) has been demonstrated.

Optical manipulation of plasmonic nanoparticles has advantages for applications such as nanofabrication, drug delivery and bio-sensing. Optical tweezers, which provide remote, real-time and versatile manipulation of colloidal particles in solutions, have proven effective in the reversible assembly of plasmonic nanoparticles (Tong L et al. *Lab Chip* 2009, 9, 193-195; Messina E et al. *J. Phys. Chem. C* 2011, 115, 5115-5122; Stetciura I Y et al. *Analyst* 2015, 140, 4981-4986; Svedberg F et al. *Nano Lett.* 2006, 6, 2639-2641; Yoshikawa H et al. *Phys. Rev. E* 2004, 70, 061406). In optical tweezers, the optical forces assemble the nanoparticles into aggregates. When the working light is turned off, the assemblies can re-disperse into solution due to repulsive electrostatic interaction among the nanoparticles that have charges of the same sign. However, due to the strong light scattering from plasmonic nanoparticles, optical tweezers demand tightly focused laser beam of high power intensity (10-100 mW/$\mu m^2$) in order to generate a strong optical gradient force for the assembly of the nanoparticles. The requirements of high optical power and sophisticated optics for beam control of optical tweezers have limited the applications of these nanoparticle assemblies. For example, unexpected photochemical or thermal reactions (or damages) can occur to molecular analytes at the assemblies under the high-power laser illumination. Due to their enhanced local electromagnetic field and optical force, surface plasmon polaritons (SPPs) on a metallic thin film have been harnessed to reduce the power requirement for optical assembly of nanoparticles over the film (Patra P P et al. *Nat. Commun.* 2014, 5, 4357). However, there are a couple of limitations in exploiting the plasmon-enhanced optical force for the assembly of plasmonic nanoparticles. One is that the high sensitivity of optical force to plasmon resonances requires strict matching between the plasmon resonant wavelength of nanoparticles and the working wavelength of laser beam, meaning that a certain laser beam can only work well for limited types of nanoparticles with specific plasmon resonances. Another limitation is that, despite the rapid and even ultrafast optical responses, it takes a relatively long time (~10 min) to achieve the assembly of nanoparticles in solutions because the near-field optical trapping on a plasmonic substrate relies on diffusion to bring nanoparticles into the working regime. Methods for the non-invasive and versatile manipulation of general particles with low optical power are still needed. The methods and systems discussed herein addresses these and other needs.

SUMMARY

In accordance with the purposes of the disclosed systems and methods, as embodied and broadly described herein, the disclosed subject matter relates to systems and methods for optical control of metal particles with thermophoresis.

Disclosed herein are methods comprising illuminating a first location of a plasmonic substrate with electromagnetic radiation, wherein the electromagnetic radiation comprises a wavelength that overlaps with at least a portion of the plasmon resonance energy of the plasmonic substrate. In some examples, the power density of the electromagnetic radiation can be 0.1 mW/$\mu m^2$ or less (e.g., 0.05 mW/$\mu m^2$ or less). The electromagnetic radiation can, for example, be provided by a light source. Examples of suitable light sources include artificial light sources, such as a laser.

In some examples, the light source is configured to illuminate a mirror, the mirror being configured to reflect the electromagnetic radiation from the light source to illuminate the first location of the plasmonic substrate. In some examples, the mirror can comprise a plurality of mirrors, such as an array of micromirrors (e.g., a digital micromirror device).

The plasmonic substrate can, in some examples, comprise a plurality of plasmonic particles. In some examples, the plurality of plasmonic particles can comprise a plurality of metal particles. The plurality of metal particles can, for example, comprise a metal selected from the group consisting of Au, Ag, Al, and combinations thereof. The plurality of plasmonic particles can have an average particle size of from 10 nm to 500 nm. In some examples, the plurality of plasmonic particles are substantially spherical. In some examples, each plasmonic particle within the plurality of plasmonic particles on the substrate is separated from its neighboring plasmonic particles by an average distance of from 3 nm to 1500 nm. The density of the plurality of plasmonic particles on the plasmonic substrate can, for example, be $10^{11}$ particles/$cm^2$ or less.

The methods can further comprise, for example, making the plasmonic substrate by depositing the plurality of plasmonic particles on a substrate. Depositing the plurality of plasmonic particles can comprise, for example, printing, lithographic deposition, electron beam deposition, thermal deposition, spin coating, drop-casting, zone casting, dip coating, blade coating, spraying, vacuum filtration, or combinations thereof.

The methods can further comprise, for example, making the plasmonic substrate by thermally annealing a film of a plasmonic metal deposited on a substrate, thereby forming the plurality of plasmonic particles on the substrate. In some examples, the methods can further comprise depositing the film of the plasmonic metal on the substrate. In some examples, the film of the plasmonic metal can have a thickness of from 2 nm to 10 nm. Thermally annealing the film can, for example, comprise heating the film at a temperature of from 400° C. to 600° C. (e.g., at a temperature of 550° C.). In some examples, the film can be thermally annealed for from 1 hour to 12 hours (e.g., for 2 hours).

The plasmonic substrate can be, for example, in thermal contact with a liquid sample comprising a plurality of metal particles and a surfactant, the liquid sample having a first temperature. The liquid sample can further comprise, for example, an aqueous solvent. The first temperature can be, for example, from 273 K to 343.

The surfactant can, for example, comprise a cationic surfactant or an anionic surfactant. In some examples, the surfactant can comprise cetrimonium bromide (CTAB), cetrimonium chloride (CTAC), sodium dodecyl sulfate (SDS), or a combination thereof. The concentration of the surfactant in the liquid sample can be from 1 mM to 75 mM. In some examples, the concentration of the surfactant in the liquid sample is above the critical micelle concentration of the surfactant, such that the surfactant forms a plurality of surfactant micelles in the liquid sample.

The concentration of the plurality of metal particles in the liquid sample can be, for example, from $10^{10}$ particle/mm$^3$ to $10^{12}$ particles/mm$^3$. The plurality of metal particles in the liquid sample can have, for example, an average particle size of from 60 nm to 1 µm. In some examples, the plurality of metal particles in the liquid sample can comprise a metal selected from the group consisting of Al, Ag, Au, and combinations thereof. In some examples, the plurality of metal particles can comprise a plurality of plasmonic particles.

The plurality of metal particles can, for example, further comprise a capping layer comprising a capping material such that the plurality of metal particles comprise a plurality of capped metal particles. In some examples, the capping material is selected from the group consisting of cetrimonium bromide (CTAB), cetrimonium chloride (CTAC), sodium dodecyl sulfate (SDS), and combinations thereof. In some examples, the capping material and the surfactant are the same material.

The methods can further comprise, for example, generating a confinement region at a location in the liquid sample proximate to the first location of the plasmonic substrate, wherein at least a portion of the confinement region has a second temperature that is greater than the first temperature such that the confinement region is bound by a temperature gradient. In some examples, the method further comprises repulsing at least a portion of the surfactant from the confinement region such that the concentration of the surfactant within the confinement region is lower than the concentration of the surfactant outside the confinement region.

The second temperature can be, for example, from 273 K to 363 K. In some examples, the second temperature can be greater than the first temperature by from 3 K to 10 K.

In some examples, the confinement region is generated by plasmon-enhanced photothermal effects. The confinement region can, for example, have a diameter of from 500 nm to 10 µm.

The methods can further comprise, for example, trapping at least a portion of the plurality of metal particles within the confinement region. The portion of the plurality of metal particles trapped within the confinement region can be trapped, for example, by an electrostatic force, a thermophoretic force, van der Waals force, or combinations thereof. In some examples, the portion of the plurality of metal particles are not damaged during the trapping. In some examples, the portion of the plurality of metal particles trapped is one metal particle. In other words, also disclosed herein are methods for single-particle trapping.

The methods can further comprise, for example, illuminating a second location of the plasmonic substrate thereby: generating a second confinement region at a location in the liquid sample proximate to the second location of the plasmonic substrate, wherein at least a portion of the second confinement region has a third temperature that is greater than the first temperature such that the second confinement region is bound by a temperature gradient; and translocating the trapped portion of the plurality of metal particles from the first confinement region to the second confinement region, trapping at least a second portion of the plurality of metal particles within the second confinement region, or a combination thereof. In some examples, the plasmonic substrate, the light source, the mirror, or a combination thereof can be translocated to illuminate the second location.

In some examples, the plasmonic substrate comprises a portion of a substrate, the substrate further comprising a non-plasmonic portion and wherein the substrate is in thermal contact with the liquid sample. In some examples, the non-plasmonic portion of the substrate can comprise glass, quartz, silicon dioxide, a polymer, and combinations thereof.

In certain examples, wherein the plasmonic substrate comprises a portion of a substrate, the substrate further comprising a non-plasmonic portion and wherein the substrate is in thermal contact with the liquid sample, the methods can further comprise illuminating a location of the non-plasmonic portion of the substrate, thereby: generating a second confinement region at a location in the liquid sample proximate to the location of the non-plasmonic portion of the substrate, wherein at least a portion of the second confinement region has a third temperature that is greater than the first temperature such that the second confinement region is bound by a temperature gradient; and translocating the trapped portion of the plurality of metal particles from the first confinement region to the second confinement region. In some examples, the substrate can be translocated to illuminate the location of the non-plasmonic portion of the substrate. In some examples, wherein the electromagnetic radiation is provided by a light source, the light source can be translocated to illuminate the location of the non-plasmonic portion of the substrate. In some examples, wherein the electromagnetic radiation is provided by a light source, the light source being configured to illuminate a mirror and the mirror is configured to reflect the electromagnetic radiation from the artificial light source to illuminate the substrate, the mirror can be translocated to illuminate the location of the non-plasmonic portion of the substrate.

Also disclosed herein are patterned sample made using the methods described herein. Also disclosed herein are methods of use of patterned sample made using the methods described herein, for example using the patterned samples for single-particle sensing, functional optical devices, or combinations thereof. In some examples, the patterned sample can be used for surface-enhanced Raman spectroscopy (SERS).

Also disclosed herein are systems for performing the methods described herein. The systems can comprise a plasmonic substrate in thermal contact with a liquid sample comprising a plurality of metal particles and a surfactant; and a light source configured to illuminate the plasmonic substrate at a first location. In some examples, the system can include a single light source. In some examples, the systems can further comprise a means for translocating the plasmonic substrate and/or the light source.

The system can, in some examples, further comprise a mirror, wherein the system can be aligned such that the light source is configured to illuminate the mirror and the mirror is configured to reflect the electromagnetic radiation from the light source to illuminate the first location of the plasmonic substrate. In some examples, the systems can further comprise a means for translocating the mirror.

The system can, in some examples, further comprise an instrument configured to capture an electromagnetic signal from the plasmonic substrate. The instrument can comprise, for example, Raman spectrometers, UV-vis absorption spectrometers, IR absorption spectrometers, fluorescence spectrometers, and combinations thereof. In some examples, the systems can further comprise a computing device configured to receive and process electromagnetic signals from the instrument.

In some examples, the system can further comprise a first lens. In some examples, the system can be configured such that the light source is below the first lens and the plasmonic substrate is above the first lens. In some examples, the system can further comprise a second lens. In some examples, the system is aligned such that the light source is below the first lens, the plasmonic substrate is above the first lens, the second lens is above the plasmonic substrate, and the instrument is above the second lens.

Additional advantages of the disclosed systems and methods will be set forth in part in the description which follows, and in part will be obvious from the description. The advantages of the disclosed systems and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

FIG. 47 is a schematic illustration and successive optical images showing trapping of a single 100 nm Ag nanosphere (AgNS). The grey disks in the optical images indicate that the laser is on. The optical power was 0.4 mW. Scale bar: 10 μm.

FIG. 48 is a schematic illustration and successive optical images showing dynamic manipulation of a single 100 nm Ag nanosphere (AgNS). The grey lines in the optical images show the manipulation trajectory of the trapped Ag nanosphere. The optical power was 0.4 mW. Scale bar: 20 μm.

FIG. 49 is a schematic illustration and successive optical images showing release of a single 100 nm Ag nanosphere (AgNS). The central disks in the optical images mean that the laser is turned off. The optical power was 0.4 mW. Scale bar: 10 μm.

DETAILED DESCRIPTION

Figure 1:
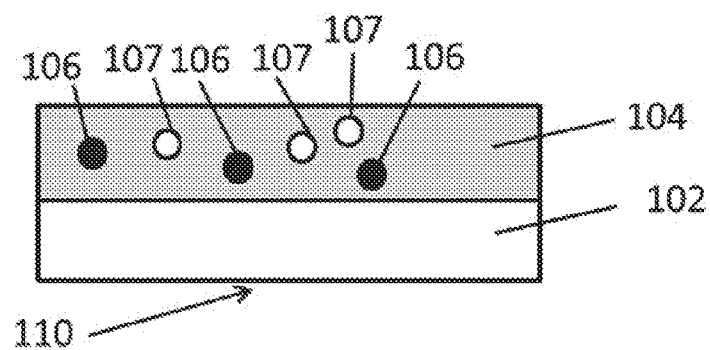
FIG. 1 is a schematic of an exemplary system as disclosed herein.

The systems and methods described herein may be understood more readily by reference to the following detailed description of specific aspects of the disclosed subject matter and the Examples included therein.

Before the present systems and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Disclosed herein are systems and methods, for example, for dynamically controlling colloidal particles and/or biological cells using thermally controlled confinement regions. In some examples, the methods and systems can comprise locally exposing a substrate to an optical signal according to a desired pattern to thereby confine the colloidal particles and/or biological cells within said pattern.

Disclosed herein are methods comprising illuminating a first location of a plasmonic substrate with electromagnetic radiation, wherein the electromagnetic radiation comprises a wavelength that overlaps with at least a portion of the plasmon resonance energy of the plasmonic substrate. As used herein, "a first location" and "the first location" are meant to include any number of locations in any arrangement on the plasmonic substrate. Thus, for example "a first location" includes one or more first locations. In some embodiments, the first location can comprise a plurality of locations. In some embodiments, the first locations can comprise a plurality of locations arranged in an ordered array.

In some examples, the power density of the electromagnetic radiation can be 0.1 mW/µm$^2$ or less (e.g., 0.09 mW/µm$^2$ or less, 0.08 mW/µm$^2$ or less, 0.07 mW/µm$^2$ or less, 0.06 mW/µm$^2$ or less, 0.05 mW/µm$^2$ or less, 0.04 mW/µm$^2$ or less, 0.03 mW/µm$^2$ or less, 0.02 mW/µm$^2$ or less, 0.01 mW/µm$^2$ or less, 0.009 mW/µm$^2$ or less, 0.008 mW/µm$^2$ or less, 0.007 mW/µm$^2$ or less, or 0.006 mW/µm$^2$ or less). In some examples, the power density of the electromagnetic radiation can be 0.005 mW/µm$^2$ or more (e.g., 0.006 mW/µm$^2$ or more, 0.007 mW/µm$^2$ or more, 0.008 mW/µm$^2$ or more, 0.009 mW/µm$^2$ or more, 0.01 mW/µm$^2$ or more, 0.02 mW/µm$^2$ or more, 0.03 mW/µm$^2$ or more, 0.04 mW/µm$^2$ or more, 0.05 mW/µm$^2$ or more, 0.06 mW/µm$^2$ or more, 0.07 mW/µm$^2$ or more, 0.08 mW/µm$^2$ or more, or 0.09 mW/µm$^2$ or more). The power density of the electromagnetic radiation can range from any of the minimum values described above to any of the maximum values described above. For example, the power density of the electromagnetic radiation can range from 0.005 mW/µm$^2$ to 0.1 mW/µm$^2$ (e.g., from 0.005 mW/µm$^2$ to 0.05 mW/µm$^2$, from 0.05 mW/µm$^2$ to 0.1 mW/µm$^2$, from 0.005 mW/µm$^2$ to 0.01 mW/µm$^2$, from 0.01 mW/µm$^2$ to 0.05 mW/µm$^2$, from 0.05 mW/µm$^2$ to 0.1 mW/µm$^2$, or from 0.01 mW/µm$^2$ to 0.09 mW/µm$^2$).

The electromagnetic radiation can, for example, be provided by a light source. The light source can be any type of light source. Examples of suitable light sources include natural light sources (e.g., sunlight) and artificial light sources (e.g., incandescent light bulbs, light emitting diodes, gas discharge lamps, arc lamps, lasers, etc.). In some examples, the light source is a laser.

In some examples, the light source is configured to illuminate a mirror, the mirror being configured to reflect the electromagnetic radiation from the light source to illuminate the first location of the plasmonic substrate. In some examples, the mirror can comprise a plurality of mirrors, such as an array of micromirrors (e.g., a digital micromirror device).

The plasmonic substrate can, in some examples, comprise a plurality of plasmonic particles. In some examples, the plurality of plasmonic particles can comprise a plurality of metal particles. The plurality of metal particles can, for example, comprise a metal selected from the group consisting of Au, Ag, Al, and combinations thereof. In some examples, the plurality of plasmonic particles can comprise a plurality of gold particles, a plurality of silver particles, or a combination thereof.

The plurality of plasmonic particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

The plurality of plasmonic particles have, for example, an average particle size of 10 nm or more (e.g., 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, 100 nm or more, 110 nm or more, 120 nm or more, 130 nm or more, 140 nm or more, 150 nm or more, 160 nm or more, 170 nm or more, 180 nm or more, 190 nm or more, 200 nm or more, 210 nm or more, 220 nm or more, 230 nm or more, 240 nm or more, 250 nm or more, 275 nm or more, 300 nm or more, 325 nm or more, 350 nm or more, 375 nm or more, 400 nm or more, 425 nm or more, 450 nm or more, or 475 nm or more).

In some examples, the plurality of plasmonic particles can have an average particle size of 500 nm or less (e.g., 475 nm or less, 450 nm or less, 425 nm or less, 400 nm or less, 375 nm or less, 350 nm or less, 325 nm or less, 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, 160 nm or less, 150 nm or less, 140 nm or less, 130 nm or less, 120 nm or less, 110 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, or 15 nm or less).

The average particle size of the plurality of plasmonic particles can range from any of the minimum values described above to any of the maximum values described above. For example, the plurality of plasmonic particles can have an average particle size of from 10 nm to 500 nm (e.g., from 10 nm to 250 nm, from 250 nm to 500 nm, from 10 nm to 100 nm, from 100 nm to 200 nm, from 200 nm to 300 nm, from 300 nm to 400 nm, from 400 nm to 500 nm, or from 10 nm to 300 nm).

In some examples, the plurality of plasmonic particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

The plurality of plasmonic particles can comprise particles of any shape (e.g., a sphere, a rod, a quadrilateral, an ellipse, a triangle, a polygon, etc.). In some examples, the plurality of plasmonic particles can have an isotropic shape. In some examples, the plurality of plasmonic particles can have an anisotropic shape. In some examples, the plurality of plasmonic particles are substantially spherical.

In some examples, each plasmonic particle within the plurality of plasmonic particles on the substrate is separated from its neighboring plasmonic particles by an average distance of 3 nm or more (e.g., 4 nm or more, 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, 100 nm or more, 125 nm or more, 150 nm or more, 175 nm or more, 200 nm or more, 225 nm or more, 250 nm or more, 275 nm or more, 300 nm or more, 325 nm or more, 350 nm or more, 375 nm or more, 400 nm or more, 425 nm or more, 450 nm or more, 475 nm or more, 500 nm or more, 550 nm or more, 600 nm or more, 650 nm or more, 700 nm or more, 750 nm or more, 800 nm or more, 850 nm or more, 900 nm or more, 950 nm or more, 1000 nm or more, 1100 nm or more, 1200 nm or more, 1300 nm or more, or 1400 nm or more).

In some examples, each plasmonic particle within the plurality of plasmonic particles on the substrate is separated from its neighboring plasmonic particles by an average distance of 1500 nm or less (e.g., 1400 nm or less, 1300 nm or less, 1200 nm or less, 1100 nm or less, 1000 nm or less, 950 nm or less, 900 nm or less, 850 nm or less, 800 nm or less, 750 nm or less, 700 nm or less, 650 nm or less, 600 nm or less, 550 nm or less, 500 nm or less, 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 175 nm or less, 150 nm or less, 125 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, 6 nm or less, 5 nm or less, or 4 nm or less).

The average distance that each plasmonic particle within the plurality of plasmonic particles on the substrate is separated from its neighboring plasmonic particles can range from any of the minimum values described above to any of the maximum values described above. For example, each plasmonic particle within the plurality of plasmonic particles on the substrate is separated from its neighboring plasmonic particles by an average distance of from 3 nm to 1500 nm (e.g., from 3 nm to 750 nm, from 750 nm to 1500 nm, from 3 nm to 500 nm, from 500 nm to 1000 nm, from 1000 nm to 1500 nm, or from 5 nm to 1000 nm).

The density of the plurality of plasmonic particles on the plasmonic substrate can, for example, be $10^7$ particles/cm$^2$ or more (e.g., $2.5 \times 10^7$ particles/cm$^2$ or more, $5 \times 10^7$ particles/cm$^2$ or more, $7.5 \times 10^7$ particles/cm$^2$ or more, $1 \times 10^8$ particles/cm$^2$ or more, $2.5 \times 10^8$ particles/cm$^2$ or more, $5 \times 10^8$ particles/cm$^2$ or more, $7.5 \times 10^8$ particles/cm$^2$ or more, $1 \times 10^9$ particles/cm$^2$ or more, $2.5 \times 10^9$ particles/cm$^2$ or more, $5 \times 10^9$ particles/cm$^2$ or more, $7.5 \times 10^9$ particles/cm$^2$ or more, $1 \times 10^{10}$ particles/cm$^2$ or more, $2.5 \times 10^{10}$ particles/cm$^2$ or more, $5 \times 10^{10}$ particles/cm$^2$ or more, or $7.5 \times 10^{10}$ particles/cm$^2$ or more). In some examples, the density of the plurality of plasmonic particles on the plasmonic substrate can be $10^{11}$ particles/cm$^2$ or less (e.g., $7.5 \times 10^{10}$ particles/cm$^2$ or less, $5 \times 10^{10}$ particles/cm$^2$ or less, $2.5 \times 10^{10}$ particles/cm$^2$ or less, $1 \times 10^{10}$ particles/cm$^2$ or less, $7.5 \times 10^9$ particles/cm$^2$ or less, $5 \times 10^9$ particles/cm$^2$ or less, $2.5 \times 10^9$ particles/cm$^2$ or less, $1 \times 10^9$ particles/cm$^2$ or less, $7.5 \times 10^8$ particles/cm$^2$ or less, $5 \times 10^8$ particles/cm$^2$ or less, $2.5 \times 10^8$ particles/cm$^2$ or less, $1 \times 10^8$ particles/cm$^2$ or less, $7.5 \times 10^7$ particles/cm$^2$ or less, $5 \times 10^7$ particles/cm$^2$ or less, or $2.5 \times 10^7$ particles/cm$^2$ or less). The density of the plasmonic particles on the plasmonic substrate can range from any of the minimum values described above to any of the maximum values described above. For example, the density of the plurality of plasmonic particles on the plasmonic substrate can be from $10^7$ particles/cm$^2$ to $10^{11}$ particles/cm$^2$ (e.g., from $1 \times 10^7$ particles/cm$^2$ to $1 \times 10^9$ particles/cm$^2$, from $1 \times 10^9$ particles/cm$^2$ to $1 \times 10^{11}$ particles/cm$^2$, from $1 \times 10^7$ particles/cm$^2$ to $1 \times 10^8$ particles/cm$^2$, from $1 \times 10^8$ particles/cm$^2$ to $1 \times 10^9$ particles/cm$^2$, from $1 \times 10^9$ particles/cm$^2$ to $1 \times 10^{10}$ particles/cm$^2$, from $1 \times 10^{10}$ particles/cm$^2$ to $1 \times 10^{11}$ particles/cm$^2$, or from $2.5 \times 10^7$ particles/cm$^2$ to $7.5 \times 10^{10}$ particles/cm$^2$).

The size, shape, and/or composition of the plurality of plasmonic particles; the separation between each particle within the plurality of plasmonic particles; the density of the plasmonic particles on the substrate; or combinations thereof can be selected in view of a variety of factors. In some examples, the size, shape, and/or composition of the plurality of plasmonic particles can be selected to maximize the electromagnetic field enhancement. For example, the size, shape, and/or composition of the plurality of plasmonic particles; the separation between each particle within the plurality of plasmonic particles; the density of the plasmonic particles on the substrate; or combinations thereof can be selected such that the intensity of an incident electromagnetic field is enhanced by a factor of 5 or more by the plurality of plasmonic particles (e.g., 10 or more, 20 or more, 30 or more, 40 or more, 50 or more, 60 or more 70 or more, 80 or more, 90 or more, or 100 or more). In some examples, the size, shape, and/or composition of the plurality of plasmonic particles; the separation between each particle within the plurality of plasmonic particles; the density of the plasmonic particles on the substrate; or combinations thereof can be selected such that the plasmon resonance energy of the plasmonic substrate overlaps with at least a portion of the electromagnetic radiation used to illuminate the plasmonic substrate.

The methods can further comprise, for example, making the plasmonic substrate by depositing the plurality of plasmonic particles on a substrate. Depositing the plurality of plasmonic particles can comprise, for example, printing, lithographic deposition, electron beam deposition, thermal deposition, spin coating, drop-casting, zone casting, dip coating, blade coating, spraying, vacuum filtration, or combinations thereof.

The methods can further comprise, for example, making the plasmonic substrate by thermally annealing a film of a plasmonic metal deposited on a substrate, thereby forming the plurality of plasmonic particles on the substrate. In some examples, the methods can further comprise depositing the film of the plasmonic metal on the substrate. The film of plasmonic metal can be deposited on the substrate, for example, by thin film processing techniques, such as sputtering, pulsed layer deposition, molecular beam epitaxy, evaporation, atomic layer deposition, or combinations thereof. In some examples, the film of the plasmonic metal can have a thickness of 2 nm or more (e.g., 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, 8.5 nm or more, 9 nm or more, or 9.5 nm or more). In some examples, the film of the plasmonic metal can have a thickness of 10 nm or less (e.g., 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, or 2.5 nm or less). The thickness of the film of the plasmonic metal can range from any of the minimum values described above to any of the maximum values described above. For example, the film of the plasmonic metal can have a thickness of from 2 nm to 10 nm (e.g., from 2 nm to 5 nm, from 5 nm to 10 nm, from 2 nm to 4 nm, from 4 nm to 6 nm, from 6 nm to 8 nm, from 8 nm to 10 nm, or from 3 nm to 9 nm).

Thermally annealing the film can, for example, comprise heating the film at a temperature of 400° C. or more (e.g., 410° C. or more, 420° C. or more, 430° C. or more, 440° C. or more, 450° C. or more, 460° C. or more, 470° C. or more, 480° C. or more, 490° C. or more, 500° C. or more, 510° C. or more, 520° C. or more, 530° C. or more, 540° C. or more, 550° C. or more, 560° C. or more, 570° C. or more, 580° C. or more, or 590° C. or more). In some examples, thermally annealing the film can comprise heating the film at a temperature of 600° C. or less (e.g., 590° C. or less, 580° C. or less, 570° C. or less, 560° C. or less, 550° C. or less, 540° C. or less, 530° C. or less, 520° C. or less, 510° C. or less, 500° C. or less, 490° C. or less, 480° C. or less, 470° C. or less, 460° C. or less, 450° C. or less, 440° C. or less, 430° C. or less, 420° C. or less, or 410° C. or less). The temperature at which the film is heated during thermal annealing can range from any of the minimum values described above to any of the maximum values described above. For example, thermally annealing the film can comprise heating the film at a temperature of from 400° C. to 600° C. (e.g., from 400° C. to 500° C., from 500° C. to 600° C., from 400° C. to 450° C., from 450° C. to 500° C., from 500° C. to 550° C., from 550° C. to 600° C., from 450° C. to 550° C., or from 520° C. to 580° C.). In some examples, thermally annealing the film can comprise heating the film at a temperature of 550° C.

In some examples, the film can be thermally annealed for 1 hour or more (e.g., 1.5 hours or more, 2 hours or more, 2.5 hours or more, 3 hours or more, 3.5 hours or more, 4 hours or more, 4.5 hours or more, 5 hours or more, 5.5 hours or more, 6 hours or more, 6.5 hours or more, 7 hours or more, 7.5 hours or more, 8 hours or more, 8.5 hours or more, 9 hours or more, 9.5 hours or more, 10 hours or more, 10.5 hours or more, 11 hours or more, or 11.5 hours or more). In some examples, the film can be thermally annealed for 12 hours or less (e.g., 11.5 hours or less, 11 hours or less, 10.5 hours or less, 10 hours or less, 9.5 hours or less, 9 hours or less, 8.5 hours or less, 8 hours or less, 7.5 hours or less, 7 hours or less, 6.5 hours or less, 6 hours or less, 5.5 hours or less, 5 hours or less, 4.5 hours or less, 4 hours or less, 3.5 hours or less, 3 hours or less, 2.5 hours or less, 2 hours or less, or 1.5 hours or less). The time for which the film can be thermally annealed can range from any of the minimum values described above to any of the maximum values described above. For example, the film can be thermally annealed for from 1 hour to 12 hours (e.g., from 1 hour to 6 hours, from 6 hours to 12 hours, from 1 hour to 4 hours, from 4 hours to 8 hours, from 8 hours to 12 hours, from 1 hour to 10 hours, or from 1 hour to 3 hours). In some examples, the film can be thermally annealed for 2 hours.

The plasmonic substrate can be, for example, in thermal contact with a liquid sample comprising a plurality of metal particles and a surfactant, the liquid sample having a first temperature. The liquid sample can further comprise, for example, an aqueous solvent. The first temperature can be, for example, 273 K or more (e.g., 275 K or more, 280 K or more, 285 K or more, 290 K or more, 295 K or more, 300 K or more, 305 K or more, 310 K or more, 315 K or more, 320 K or more, 325 K or more, 330 K or more, 335 K or more, or 340 K or more). In some examples, the first temperature can be 343 K or less (e.g., 340 K or less, 335 K or less, 330 K or less, 325 K or less, 320 K or less, 315 K or less, 310 K or less, 305 K or less, 300 K or less, 295 K or less, 290 K or less, 285 K or less, 280 K or less, or 275 K or less). The first temperature can range from any of the minimum values described above to any of the maximum values described above. For example, the first temperature can be from 273 K to 343 K (e.g., from 273 K to 305 K, from 305 K to 343 K, from 273 K to 285 K, from 285 K to 300 K, from 300 K to 315 K, from 315 K to 330 K, from 330 K to 434 K, or from 275 K to 340 K).

The surfactant can, for example, be a non-photoresponsive surfactant. In some examples, the surfactant can comprise a cationic surfactant or an anionic surfactant. Examples of cationic surfactants include, but are not limited to, cetrimonium bromide (CTAB), cetrimonium chloride (CTAC), benzalkonium chloride, benzethonium chloride, bronidox, distearyldimethylammonium chloride, tetramethylammonium hydroxide, and combinations thereof. Examples of anionic surfactants include, but are not limited to, ammonium lauryl sulfate, ammonium perfluorononanoate, docusate, perfluorobutanesulfonic acid, perfluorononanoic acid, perfluorooctanesulfonic acid, perfluorooctanoic acid, phospholipid, potassium lauryl sulfate, sodium dodecyl sulfate (SDS), sodium dodecylbenzenesulfonate, sodium laurate, sodium laureth sulfate, sodium lauroyl sarcosinate, sodium myreth sulfate, sodium pareth sulfate, sodium stearate, and combinations thereof. In some examples, the surfactant can comprise cetrimonium bromide (CTAB), cetrimonium chloride (CTAC), sodium dodecyl sulfate (SDS), or a combination thereof.

The concentration of the surfactant in the liquid sample is 1 mM or more (e.g., 5 mM or more, 10 mM or more, 15 mM or more, 20 mM or more, 25 mM or more, 30 mM or more, 35 mM or more, 40 mM or more, 45 mM or more, 50 mM or more, 55 mM or more, 60 mM or more, 65 mM or more, or 70 mM or more). In some examples, the concentration of the surfactant in the liquid sample is 75 mM or less (e.g., 70 mM or less, 65 mM or less, 60 mM or less, 55 mM or less, 50 mM or less, 45 mM or less, 40 mM or less, 35 mM or less, 30 mM or less, 25 mM or less, 20 mM or less, 15 mM or less, 10 mM or less, or 5 mM or less). The concentration of the surfactant in the liquid sample can range from any of the minimum values described above to any of the maximum values described above. For example, the concentration of the surfactant in the liquid sample can be from 1 mM to 75 mM (e.g., from 1 mM to 35 mM, from 35 mM to 75 mM, from 1 mM to 25 mM, from 25 mM to 50 mM, from 50 mM to 75 mM, or from 5 mM to 70 mM). In some examples, the concentration of the surfactant in the liquid sample is above the critical micelle concentration of the surfactant, such that the surfactant forms a plurality of surfactant micelles in the liquid sample.

The concentration of the plurality of metal particles in the liquid sample can be, for example, $10^{10}$ particle/mm$^3$ or more (e.g., $2\times10^{10}$ particles/mm$^3$ or more, $3\times10^{10}$ particles/mm$^3$ or more, $4\times10^{10}$ particles/mm$^3$ or more, $5\times10^{10}$ particles/mm$^3$ or more, $6\times10^{10}$ particles/mm$^3$ or more, $7\times10^{10}$ particles/mm$^3$ or more, $8\times10^{10}$ particles/mm$^3$ or more, $9\times10^{10}$ particles/mm$^3$ or more, $1\times10^{11}$ particles/mm$^3$ or more, $2\times10^{11}$ particles/mm$^3$ or more, $3\times10^{11}$ particles/mm$^3$ or more, $4\times10^{11}$ particles/mm$^3$ or more, $5\times10^{11}$ particles/mm$^3$ or more, $6\times10^{11}$ particles/mm$^3$ or more, $7\times10^{11}$ particles/mm$^3$ or more, $8\times10^{11}$ particles/mm$^3$ or more, or $9\times10^{11}$ particles/mm$^3$ or more). In some examples, the concentration of the plurality of metal particles can be $10^{12}$ particles/mm$^3$ or less (e.g., $9\times10^{11}$ particles/mm$^3$ or less, $8\times10^{11}$ particles/mm$^3$ or less, $7\times10^{11}$ particles/mm$^3$ or less, $6\times10^{11}$ particles/mm$^3$ or less, $5\times10^{11}$ particles/mm$^3$ or less, $4\times10^{11}$ particles/mm$^3$ or less, $3\times10^{11}$ particles/mm$^3$ or less, $2\times10^{11}$ particles/mm$^3$ or less, $1\times10^{11}$ particles/mm$^3$ or less, $9\times10^{10}$ particles/mm$^3$ or less, $8\times10^{10}$ particles/mm$^3$ or less, $7\times10^{10}$ particles/mm$^3$ or less, $6\times10^{10}$ particles/mm$^3$ or less, $5\times10^{10}$ particles/mm$^3$ or less, $4\times10^{10}$ particles/mm$^3$ or less, $3\times10^{10}$ particles/mm$^3$ or less, or $2\times10^{10}$ particles/mm$^3$ or less).

The concentration of the plurality of metal particles in the liquid sample can range from any of the minimum values described above to any of the maximum values described above. For example, the concentration of the plurality of metal particles in the liquid sample can be from $10^{10}$ particle/mm$^3$ to $10^{12}$ particles/mm$^3$ (e.g., from $10^{10}$ particle/mm$^3$ to $10^{11}$ particles/mm$^3$, from $10^{11}$ particles/mm$^3$ to $10^{12}$ particles/mm$^3$, from $1\times10^{10}$ particle/mm$^3$ to $5\times10^{10}$ particles/mm$^3$, from $5\times10^{10}$ particles/mm$^3$ to $1\times10^{11}$ particles/mm$^3$, from $1\times10^{11}$ particles/mm$^3$ to $5\times10^{11}$ particles/mm$^3$, from $5\times10^{11}$ particles/mm$^3$ to $1\times10^{12}$ particles/mm$^3$, or from $2\times10^{10}$ particles/mm$^3$ to $9\times10^{11}$ particles/mm$^3$).

The plurality of metal particles in the liquid sample can have, for example, an average particle size of 60 nm or more (e.g., 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 325 nm or more, 350 nm or more, 375 nm or more, 400 nm or more, 425 nm or more, 450 nm or more, 475 nm or more, 500 nm or more, 550 nm or more, 600 nm or more, 650 nm or more, 700 nm or more, 750 nm or more, 800 nm or more, 850 nm or more, 900 nm or more, or 950 nm or more).

In some examples, the plurality of metal particles in the liquid sample can have an average particle diameter of 1 µm or less (e.g., 950 nm or less, 900 nm or less, 850 nm or less, 800 nm or less, 750 nm or less, 700 nm or less, 650 nm or less, 600 nm or less, 550 nm or less, 500 nm or less, 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 175 nm or less, 150 nm or less, 125 nm or less, 100 nm or less, 90 nm or less, 80 nm or less, or 70 nm or less).

The average particle size of the plurality of metal particles in the liquid sample can range from any of the minimum values described above to any of the maximum values described above. For example the plurality of metal particles in the liquid sample can have an average particle size of from 60 nm to 1 µm (e.g., from 60 nm to 500 nm, from 500 nm to 1 µm, from 60 nm to 300 nm, from 300 nm to 550 nm, from 550 nm to 800 nm, from 800 nm to 1 µm, from 60 nm to 800 nm, from 60 nm to 600 nm, from 60 nm to 400 nm, from 60 nm to 200 nm, from 70 nm to 180 nm, from 80 nm to 170 nm, from 90 nm to 160 nm, or from 100 nm to 150 nm).

In some examples, the plurality of metal particles in the liquid sample can comprise a metal selected from the group consisting of Al, Ag, Au, and combinations thereof. In some examples, the plurality of metal particles can comprise a plurality of plasmonic particles.

The plurality of metal particles can, for example, further comprise a capping layer comprising a capping material such that the plurality of metal particles comprise a plurality of capped metal particles. Suitable capping materials for capping layers for metal particles are known in the art. "Capping" refers to the formation of an ionic or covalent bond of molecules to the surface atoms of a particle, this molecule is referred to as a capping agent. "Capping material" refers to a molecule possessing a functional group capable of binding to the surface atoms of a particle by ionic or covalent bond. Such capping materials usually contain functional groups such as thiol (—SH), carboxyl (—COOH), or amine (—NH) groups. The capping materials can uniformly cover the surface of each of the plurality of metal particles, thereby forming the capping layer on the surface of each of the plurality of metal particles to form the plurality of capped metal particles. The capping material can be used to stabilize the plurality of metal particles. The capping material can, for example, prevent the oxidation on the surface of the plurality of metal particles and/or to increase the dispersibility of the plurality of metal particles.

In some examples, the capping material can be attached to the surface of each of the plurality of metal particles, for example, by coordination bonds. The capping material can also be associated with the plurality of metal particles via non-covalent interactions. In some examples, the capping material can individually be selected to be a hydrophilic, hydrophobic, or amphiphilic. In addition, the capping material can, in combination, be selected so as to provide a shell surrounding each of the plurality of metal particles which is hydrophilic, hydrophobic, or amphiphilic.

Examples of capping materials include, but are not limited to, citrate, tannic acid, lipoic acid, dodecane thiol, cetrimonium bromide (CTAB), cetrimonium chloride (CTAC), branched polyethylenimine (BPEI), polyethylene glycol (PEG), polyvinylpyrrolidone (PVP), sodium dodecyl sulfate (SDS), or combinations thereof. In some examples, the capping material is selected from the group consisting of cetrimonium bromide (CTAB), cetrimonium chloride (CTAC), sodium dodecyl sulfate (SDS), and combinations thereof. In some examples, the capping materials and the surfactant are the same material.

The methods can further comprise, for example, generating a confinement region at a location in the liquid sample proximate to the first location of the plasmonic substrate, wherein at least a portion of the confinement region has a second temperature that is greater than the first temperature such that the confinement region is bound by a temperature gradient. For example, the confinement region is located within at least a portion of the three-dimensional area within the liquid sample defined by the temperature gradient (e.g., the boundary of the confinement region can be defined by the temperature gradient). The confinement region can comprise a three dimensional area within the liquid sample where the balance of forces acting on the portion of the plurality of metal particles substantially localizes the portion of the plurality of metal particles. In some examples, the method further comprises repulsing at least a portion of the surfactant from the confinement region such that the concentration of the surfactant within the confinement region is lower than the concentration of the surfactant outside the confinement region. In some examples, the method further comprises repulsing at least a portion of the plurality of surfactant micelles from the confinement region such that the concentration of the plurality of surfactant micelles within the confinement region is lower than the concentration of the plurality of surfactant micelles outside the confinement region.

The second temperature can be, for example, of 273 K or more (e.g., 275 K or more, 280 K or more, 285 K or more, 290 K or more, 295 K or more, 300 K or more, 305 K or more, 310 K or more, 315 K or more, 320 K or more, 325 K or more, 330 K or more, 335 K or more, 340 K or more, 345 K or more, 350 K or more, 355 K or more, or 360 K or more). In some examples, the second temperature can be 363 K or less (e.g., 360 K or less, 355 K or less, 350 K or less, 345 K or less, 340 K or less, 335 K or less, 330 K or less, 325 K or less, 320 K or less, 315 K or less, 310 K or less, 305 K or less, 300 K or less, 295 K or less, 290 K or less, 285 K or less, 280 K or less, or 275 K or less). The second temperature can range from any of the minimum values described above to any of the maximum values described above. For example, the second temperature can be from 273 K to 363 K (e.g., from 273 K to 315 K, from 315 K to 363 K, from 273 K to 290 K, from 290 K to 310 K, from 310 K to 330 K, from 330 K to 350 K, from 350 K to 363 K, or from 275 to 360 K).

In some examples, the second temperature can be greater than the first temperature by 3 K or more (e.g., 3.5 K or more, 4 K or more, 4.5 K or more, 5 K or more, 5.5 K or more, 6 K or more, 6.5 K or more, 7 K or more, 7.5 K or more, 8 K or more, 8.5 K or more, 9 K or more, or 9.5 K or more). In some examples, the second temperature can be greater than the first temperature by 10 K or less (e.g., 9.5 K or less, 9 K or less, 8.5 K or less, 8 K or less, 7.5 K or less, 7 K or less, 6.5 K or less, 6 K or less, 5.5 K or less, 5 K or less, 4.5 K or less, 4 K or less, or 3.5 K or less). The amount that the second temperature is greater than the first temperature by can range from any of the minimum values described above to any of the maximum values described above. For example, the second temperature can be greater than the first temperature by from 3 K to 10 K (e.g., from 3 K to 6.5 K, from 6.5 K to 10 K, from 3 K to 5 K, from 5 K to 7 K, from 7 K to 10 K, or from 4 K to 9 K).

In some examples, the confinement region is generated by plasmon-enhanced photothermal effects. The confinement region can, for example, have a diameter of 500 nm or more (e.g., 550 nm or more, 600 nm or more, 650 nm or more, 700 nm or more, 750 nm or more, 800 nm or more, 850 nm or more, 900 nm or more, 950 nm or more, 1 µm or more, 2 µm or more, 3 µm or more, 4 µm or more, 5 µm or more, 6 µm or more, 7 µm or more, 8 µm or more, or 9 µm or more). In some examples, the confinement region can have a diameter of 10 µm or less (e.g., 9 µm or less, 8 µm or less, 7 µm or less, 6 µm or less, 5 µm or less, 4 µm or less, 3 µm or less, 2 µm or less, 1 µm or less, 950 nm or less, 900 nm or less, 850 nm or less, 800 nm or less, 750 nm or less, 700 nm or less, 650 nm or less, 600 nm or less, or 550 nm or less). The diameter of the confinement region can range from any of the minimum values described above to any of the maximum values described above. For example, the confinement region can have a diameter of from 500 nm to 10 µm (e.g., from 500 nm to 5 µm, from 5 µm to 10 µm, from 500 nm to 2 µm, from 2 µm to 4 µm, from 4 µm to 6 µm, from 6 µm to 8 µm, from 8 µm to 10 µm, or from 600 nm to 9 µm). The diameter of the confinement region can, for example, be controlled by the power density of the electromagnetic radiation used to illuminate the plasmonic substrate. The diameter of the confinement region can be selected in view of a number of factors. In some examples, the diameter of the confinement region can be selected relative to the average particle size of the plurality of metal particles in the liquid sample.

The methods can further comprise, for example, trapping at least a portion of the plurality of metal particles within the confinement region. The portion of the plurality of metal particles trapped within the confinement region can be trapped, for example, by an electrostatic force, a thermophoretic force, van der Waals force, or combinations thereof. In some examples, the portion of the plurality of metal particles are not damaged during the trapping. In some examples, the portion of the plurality of metal particles trapped is one metal particle. In other words, also disclosed herein are methods for single-particle trapping.

The portion of the plurality of metal particles can be trapped, for example, at a trapping speed of 200 nm/s or more (e.g., 300 nm/s or more, 400 nm/s or more, 500 nm/s or more, 600 nm/s or more, 700 nm/s or more, 800 nm/s or more, 900 nm/s or more, 1 µm/s or more, 2 µm/s or more, 3 µm/s or more, 4 µm/s or more, 5 µm/s or more, 6 µm/s or more, 7 µm/s or more, 8 µm/s or more, 9 µm/s or more, 10 µm/s or more, 15 µm/s or more, 20 µm/s or more, 25 µm/s or more, 30 µm/s or more, 35 µm/s or more, 40 µm/s or more, or 45 µm/s or more). In some examples, the portion of the plurality of metal particles can be trapped at a trapping speed of 50 µm/s or less (e.g., 45 µm/s or less, 40 µm/s or less, 35 µm/s or less, 30 µm/s or less, 25 µm/s or less, 20 µm/s or less, 15 µm/s or less, 10 µm/s or less, 9 µm/s or less, 8 µm/s or less, 7 µm/s or less, 6 µm/s or less, 5 µm/s or less, 4 µm/s or less, 3 µm/s or less, 2 µm/s or less, 1 µm/s or less, 900 nm/s or less, 800 nm/s or less, 700 nm/s or less, 600 nm/s or less, 500 nm/s or less, 400 nm/s or less, or 300 nm/s or less). The trapping speed at which the portion of the plurality of metal particles is trapped can range from any of the minimum values described above to any of the maximum values described above. For example, the portion of the plurality of metal particles can be trapped at a trapping speed of from 200 nm/s to 50 µm/s (e.g., from 200 nm/s to 25 µm/s, from 25 µm/s to 50 µm/s, from 200 nm/s to 10 µm/s, from 10 µm/s to 20 µm/s, from 20 µm/s to 30 µm/s, from 30 µm/s to 40 µm/s, from 40 µm/s to 50 µm/s, or from 300 nm/s to 45 µm/s).

The methods can further comprise, for example, illuminating a second location of the plasmonic substrate thereby: generating a second confinement region at a location in the liquid sample proximate to the second location of the plasmonic substrate, wherein at least a portion of the second confinement region has a third temperature that is greater than the first temperature such that the second confinement region is bound by a temperature gradient; and translocating the trapped portion of the plurality of metal particles from the first confinement region to the second confinement region, trapping at least a second portion of the plurality of metal particles within the second confinement region, or a combination thereof. As used herein, "a second location" and "the second location" are meant to include any number of locations in any arrangement on the plasmonic substrate. Thus, for example "a second location" includes one or more second locations. In some embodiments, the second location can comprise a plurality of locations. In some embodiments, the second location can comprise a plurality of locations arranged in an ordered array. In some examples, the plasmonic substrate, the light source, the mirror, or a combination thereof can be translocated to illuminate the second location. As used herein translocating refers to any type of movement about any axis (e.g., rotation, translation, etc.) In other words, as used herein, translocation refers to a change in position and/or orientation.

In some examples, the plasmonic substrate comprises a portion of a substrate, the substrate further comprising a non-plasmonic portion and wherein the substrate is in thermal contact with the liquid sample. The non-plasmonic portion of the substrate can, for example, comprise a transparent non-plasmonic material. As used herein, a "transparent non-plasmonic material" is meant to include any material that is not plasmonic and is transparent at the wavelength or wavelength region of interest. In some examples, the non-plasmonic portion of the substrate can comprise glass, quartz, silicon dioxide, a polymer, and combinations thereof.

In certain examples, wherein the plasmonic substrate comprises a portion of a substrate, the substrate further comprising a non-plasmonic portion and wherein the substrate is in thermal contact with the liquid sample, the methods can further comprise illuminating a location of the non-plasmonic portion of the substrate, thereby: generating a second confinement region at a location in the liquid sample proximate to the location of the non-plasmonic portion of the substrate, wherein at least a portion of the second confinement region has a third temperature that is greater than the first temperature such that the second confinement region is bound by a temperature gradient; and translocating the trapped portion of the plurality of metal particles from the first confinement region to the second confinement region. In some examples, the substrate can be translocated to illuminate the location of the non-plasmonic portion of the substrate. In some examples, wherein the electromagnetic radiation is provided by a light source, the light source can be translocated to illuminate the location of the non-plasmonic portion of the substrate. In some examples, wherein the electromagnetic radiation is provided by a light source, the light source being configured to illuminate a mirror and the mirror is configured to reflect the electromagnetic radiation from the artificial light source to illuminate the substrate, the mirror can be translocated to illuminate the location of the non-plasmonic portion of the substrate.

Also disclosed herein are patterned sample made using the methods described herein. Also disclosed herein are methods of use of patterned sample made using the methods described herein, for example using the patterned samples for single-particle sensing, functional optical devices, or combinations thereof. In some examples, the patterned sample can be used for surface-enhanced Raman spectroscopy (SERS).

Also disclosed herein are systems for performing the methods described herein. Referring now to FIG. 1, the systems 100 can comprise a plasmonic substrate 102 in thermal contact with a liquid sample 104 comprising a plurality of metal particles 106 and a surfactant 107; and a light source 108 configured to illuminate the plasmonic substrate 102 at a first location 110. In some examples, the system 100 can include a single light source 108. In other examples, more than one light source 108 can be included in the system 100.

In some examples, the systems 100 can further comprise a means for translocating the plasmonic substrate 102 and/or the light source 108.

Figure 2:
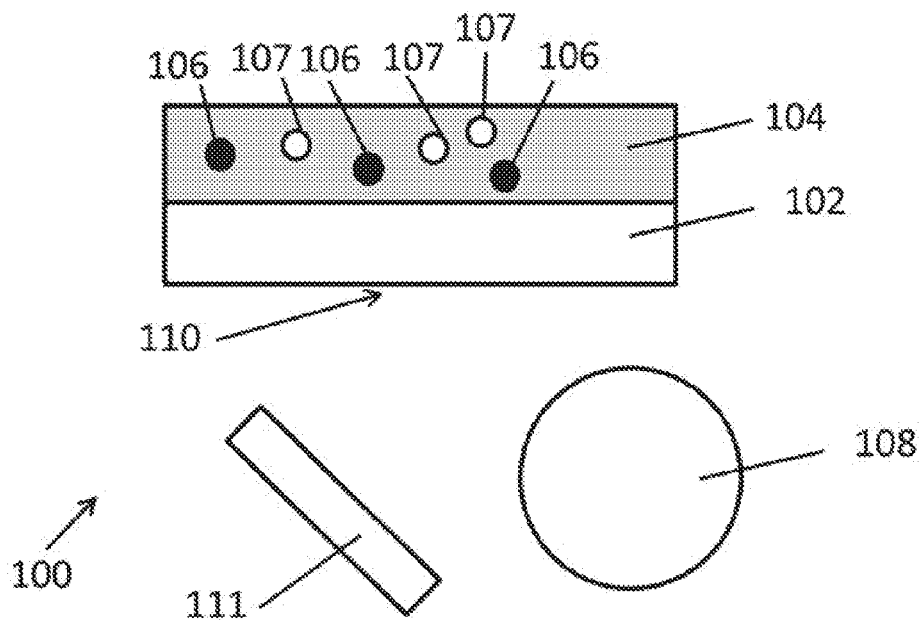
FIG. 2 is a schematic of an exemplary system as disclosed herein.

Referring now to FIG. 2, the system 110 can, in some examples, further comprise a mirror 111, wherein the system 110 can be aligned such that the light source 108 is configured to illuminate the mirror 111 and the mirror 111 is configured to reflect the electromagnetic radiation from the light source 108 to illuminate the first location 110 of the plasmonic substrate 102. In some examples, the systems 100 can further comprise a means for translocating the mirror 111.

Figure 3:
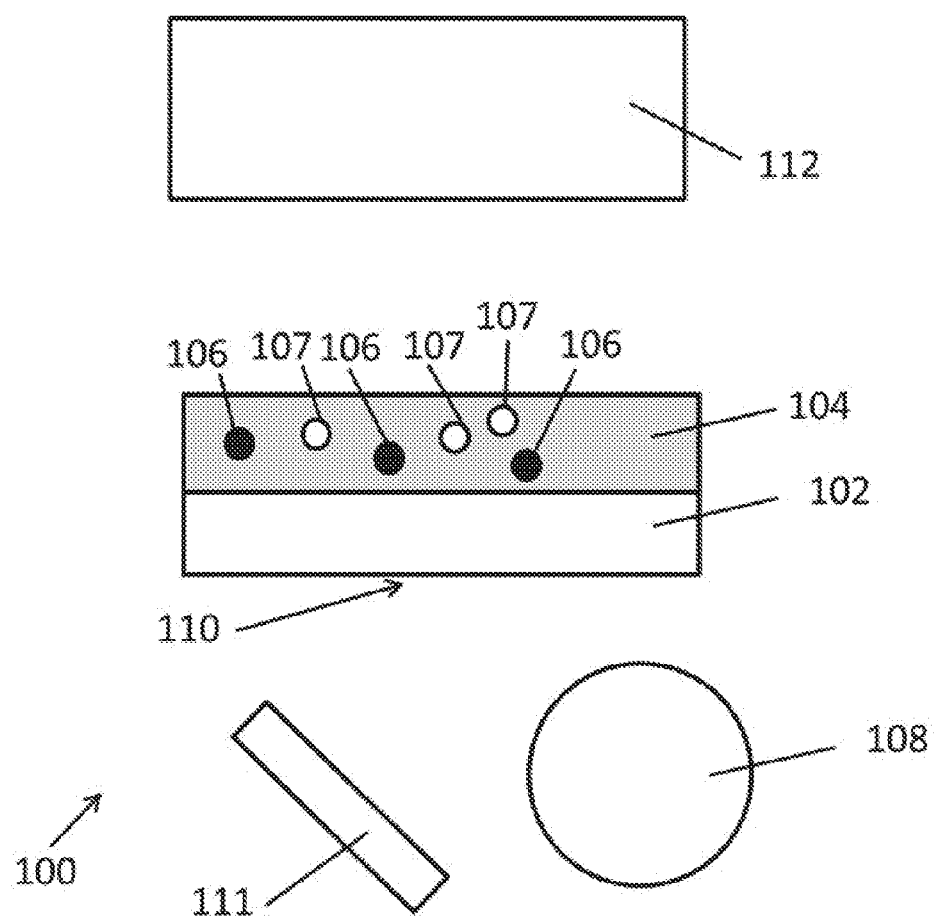
FIG. 3 is a schematic of an exemplary system as disclosed herein.

Referring now to FIG. 3, the system 110 can, in some examples, further comprise an instrument 112 configured to capture an electromagnetic signal from the plasmonic substrate 102.

In some examples, the system 110 can further comprise a first lens 114. In some examples, the system 110 can further comprise a second lens 116. The lenses may independently be any type of lens, such as a simple lens, a compound lens, a spherical lens, a toric lens, a biconvex lens, a plano-convex lens, a plano-concave lens, a negative meniscus lens, a positive meniscus lens, a biconcave lens, a converging lens, a diverging lens, a cylindrical lens, a Fresnel lens, a lenticular lens, or a gradient index lens.

Figure 4:
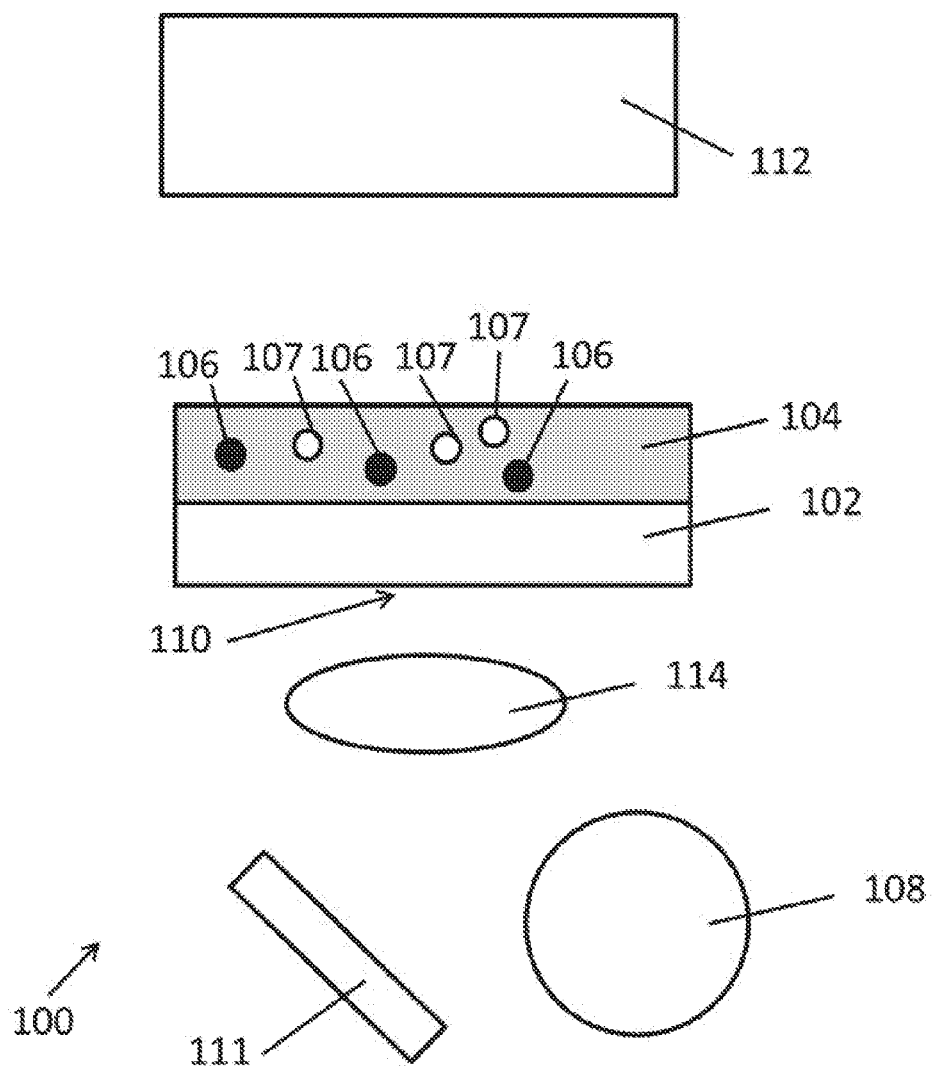
FIG. 4 is a schematic of an exemplary system as disclosed herein.

Referring now to FIG. 4, in some examples, the system 110 can be configured such that the light source 108 is below the first lens 114 and the plasmonic substrate 102 is above the first lens 114.

Figure 5:
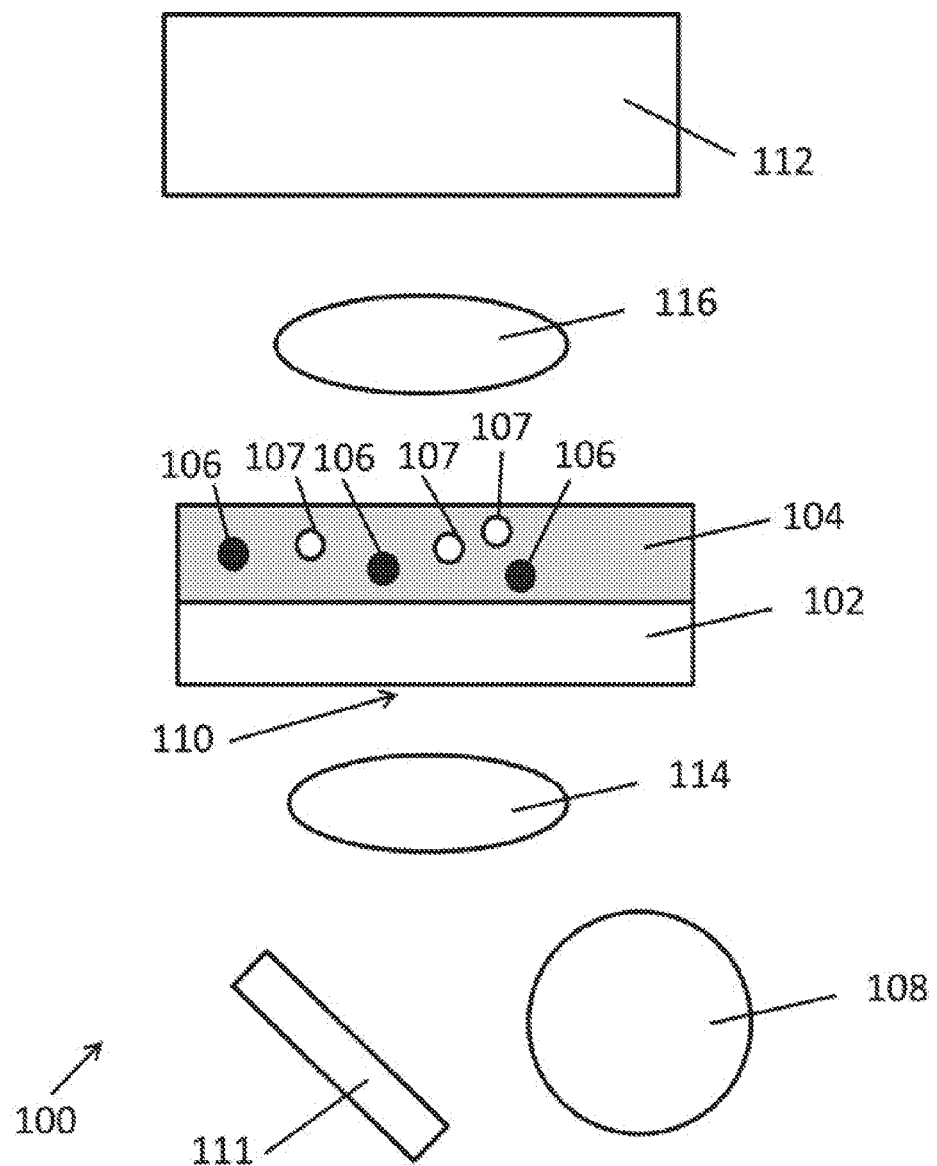
FIG. 5 is a schematic of an exemplary system as disclosed herein.

Referring now to FIG. 5, in some examples, the system 110 is aligned such that the light source 108 is below the first lens 114, the plasmonic substrate 102 is above the first lens 114, the second lens 116 is above the plasmonic substrate 102, and the instrument 112 is above the second lens 116.

Figure 6:
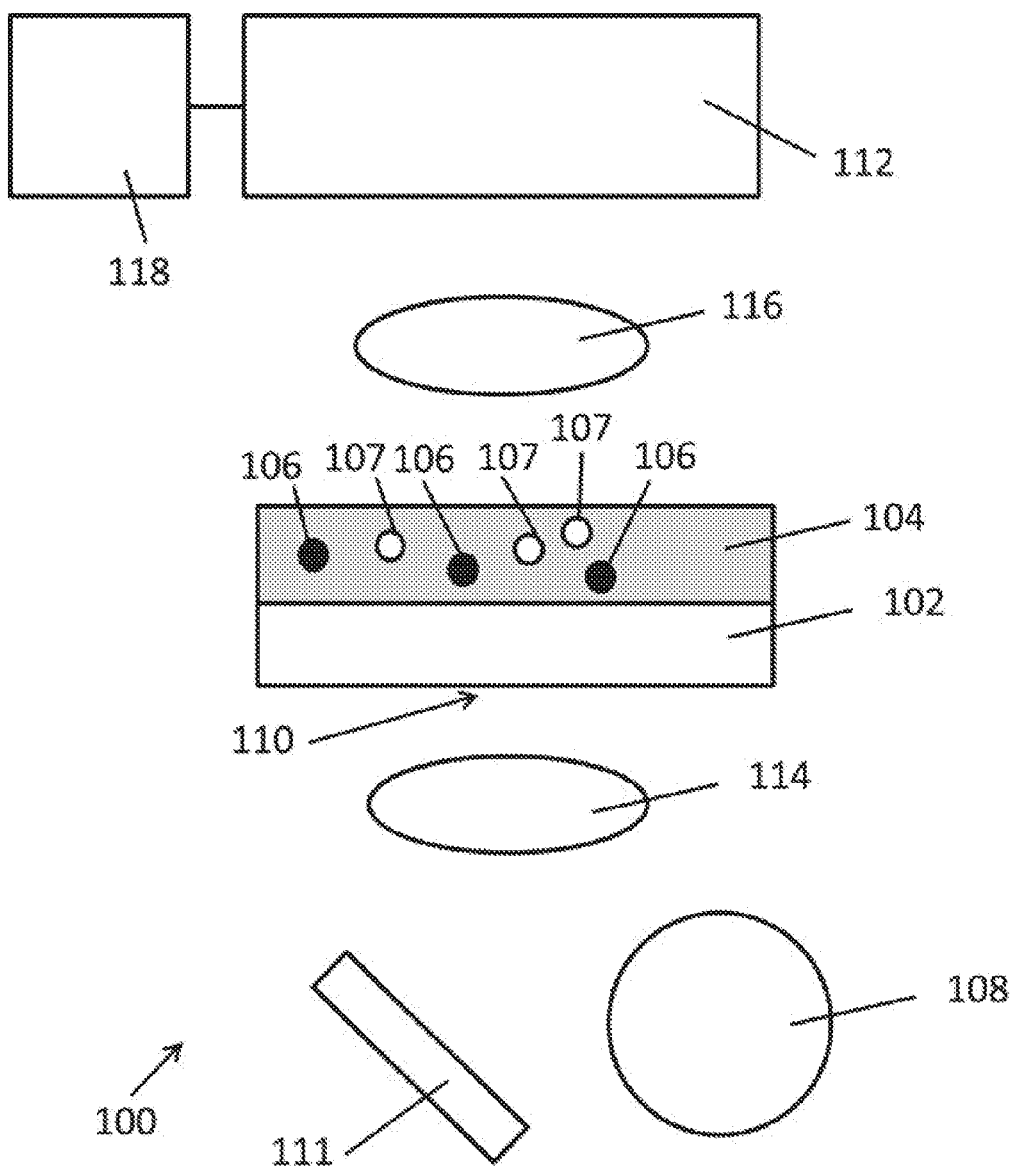
FIG. 6 is a schematic of an exemplary system as disclosed herein.

In some examples, the systems 110 can further comprise a computing device 118 configured to receive and process electromagnetic signals from the instrument 112, for example as shown in FIG. 6.

Figure 7:
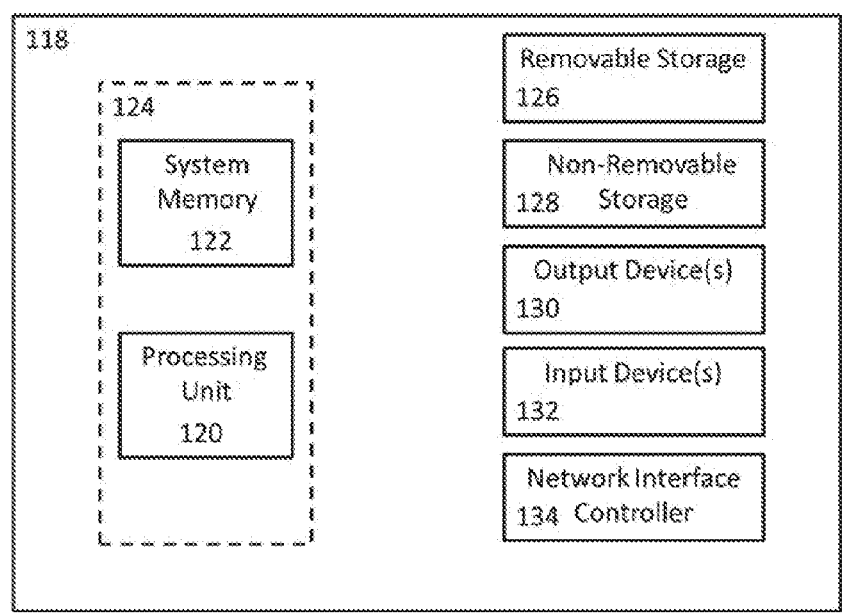
FIG. 7 is a schematic of an exemplary computing device.

FIG. 7 illustrates an example computing device 118 upon which examples disclosed herein may be implemented. The computing device 118 can include a bus or other communication mechanism for communicating information among various components of the computing device 118. In its most basic configuration, computing device 118 typically includes at least one processing unit 120 (a processor) and system memory 122. Depending on the exact configuration and type of computing device, system memory 122 may be volatile (such as random access memory (RAM)), non-volatile (such as read-only memory (ROM), flash memory, etc.), or some combination of the two. This most basic configuration is illustrated in FIG. 7 by a dashed line 124. The processing unit 120 may be a standard programmable processor that performs arithmetic and logic operations necessary for operation of the computing device 118.

The computing device 118 can have additional features/functionality. For example, computing device 118 may include additional storage such as removable storage 126 and non-removable storage 128 including, but not limited to, magnetic or optical disks or tapes. The computing device 118 can also contain network connection(s) 134 that allow the device to communicate with other devices. The computing device 118 can also have input device(s) 132 such as a keyboard, mouse, touch screen, antenna or other systems configured to communicate with the camera in the system described above, etc. Output device(s) 130 such as a display, speakers, printer, etc. may also be included. The additional devices can be connected to the bus in order to facilitate communication of data among the components of the computing device 118.

The processing unit 120 can be configured to execute program code encoded in tangible, computer-readable media. Computer-readable media refers to any media that is capable of providing data that causes the computing device 118 (i.e., a machine) to operate in a particular fashion. Various computer-readable media can be utilized to provide instructions to the processing unit 120 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 120 can execute program code stored in the system memory 122. For example, the bus can carry data to the system memory 122, from which the processing unit 120 receives and executes instructions. The data received by the system memory 122 can optionally be stored on the removable storage 126 or the non-removable storage 128 before or after execution by the processing unit 120.

The computing device 118 typically includes a variety of computer-readable media. Computer-readable media can be any available media that can be accessed by device 118 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 122, removable storage 126, and non-removable storage 128 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 118. Any such computer storage media can be part of computing device 118.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, system memory 122 comprises computer-executable instructions stored thereon that, when executed by the processor 120, cause the processor 120 to receive an electromagnetic signal from the instrument 112, process the electromagnetic signal to obtain a characteristic of the plasmonic substrate 102; and output the characteristic of the plasmonic substrate 102.

The analysis of signals captured by the instrument can be carried out in whole or in part on one or more computing device. For example, the system may comprise one or more additional computing device.

The instrument can comprise, for example, a camera, an optical microscope, an electron microscope, a spectrometer, or combinations thereof. Examples of spectrometers include, but are not limited to, Raman spectrometers, UV-vis absorption spectrometers, IR absorption spectrometers, fluorescence spectrometers, and combinations thereof.

In some examples, the electromagnetic signal received by the processor from the instrument can comprise an image, a spectrum (e.g., Raman, UV-vis, IR, fluorescence), a micrograph, or combinations thereof. The characteristic of the plasmonic substrate can comprise, for example, the presence, location, size, shape, and/or quantity of a portion of the plurality of metal particles trapped within the confinement region; the presence, location, composition, size, shape, and/or quantity of plasmonic particles comprising the plasmonic substrate; or combinations thereof. In some examples, the characteristic of the plasmonic substrate can be monitored over time, for example, to identify the effect of trapping the portion of the plurality of metal particles within the confinement region.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Reversible assembly of plasmonic nanoparticles can be associated with significant modulation of structural, electrical and optical properties. Despite their versatility in nanoparticle manipulation and assembly, current optical tweezers require tightly focused and high-power laser beams (10-100 mW/$\mu m^2$) with precise optical alignment, which has significantly limited their applications.

Based on the temperature-gradient field in solution, thermophoresis has proven effective in low-energy and non-invasive trapping of particles (Braun M et al. *ACS Nano* 2013, 7, 11200-11208; Braun M et al. *Phys. Chem. Chem. Phys.* 2014, 16, 15207-15213; Ilic O et al. *ACS Photonics* 2016, 3, 197-202) and biomolecules (e.g., DNA) (Thamdrup L H et al. *Nano Lett.* 2010, 10, 826-832; Reichl M et al. *Phys. Rev. Lett.* 2014, 112, 198101; Braun M et al. *Nano Lett.* 2015, 15, 5499-5505).

Herein, a versatile optical technique that uses the plasmon-enhanced thermophoresis for the light-directed assembly of general plasmonic nanoparticles with dynamic control of assembly sizes and patterns at a low optical power (e.g., power intensity lower than 0.1 mW/$\mu m^2$) is discussed. By introducing a non-photoresponsive cationic surfactant, e.g., cetrimonium chloride (CTAC), into the plasmonic nanoparticle suspension, the surface-modified positively charged nanoparticles can be directed towards the laser spot at the interface between a plasmonic substrate and suspension. The experiments and simulations discussed herein reveal that the low-power assembly is enabled by the thermophoretic migration of nanoparticles due to the plasmon-enhanced photothermal effect and the associated local electric field over a plasmonic substrate. By employing a holographic optical system to control the laser beam, the parallel and dynamic manipulation of multiple nanoparticle assemblies was achieved. The assemblies formed over plasmonic substrates can further be transported to non-plasmonic substrates. The nanoparticle assemblies with dynamically controlled electromagnetic "hot spots" were also employed for surface-enhanced Raman spectroscopy (SERS) with controlled sensitivity, which can analyze molecules in their native liquid environments. Using Rhodamine 6G and methyl orange as model molecules, the effects of nanoparticle compositions and geometries on the SERS performances was investigated. By taking advantage of the parallel manipulation of multiple nanoparticle assemblies, "multiplex" SERS with enhanced sensitivity was demonstrated. With the advantages of low-power reversible nanoparticle assembly, applicability to general nanoparticles and simple optics, the plasmon-enhanced thermophoretic technique discussed herein is paving a new way towards the further development and applications of dynamic nanoparticle assemblies, including biomolecular analysis in their native environments and smart drug delivery.

Figure 8:
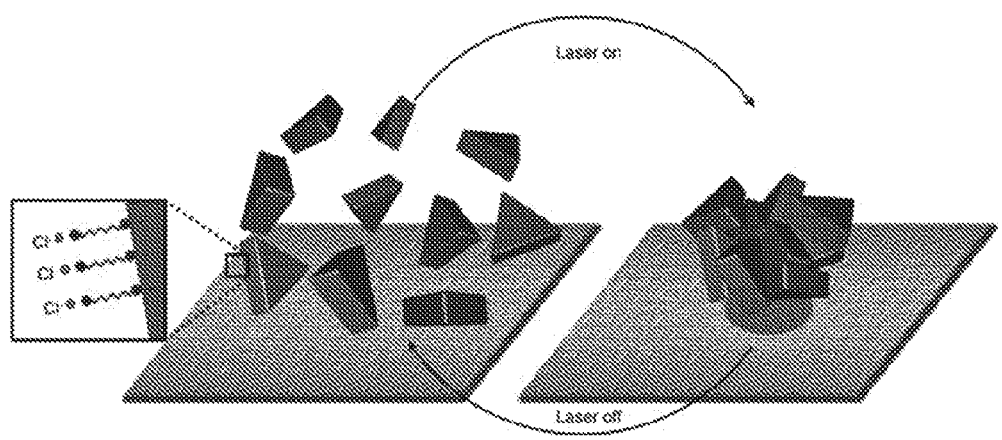
FIG. 8 is a schematic of the light-directed reversible assembly of Au nanotriangles that are surface-functionalized with CTAC based on the plasmon-enhanced thermophoresis light-directed reversible assembly of. The $CTA^+$ groups form double layers on the nanoparticle surfaces, which become positively charged and hydrophilic (inset).

FIG. 8 illustrates the basic concept of the light-directed reversible assembly of plasmonic nanoparticles based on the plasmon-enhanced thermophoresis. Herein, Au nanotriangles (AuNTs) are used as an illustrative example. Other nanoparticles such as Au nanospheres (AuNSs) and Ag nanospheres (AgNSs) have also been used to demonstrate the generality of this technique.

Figure 9:
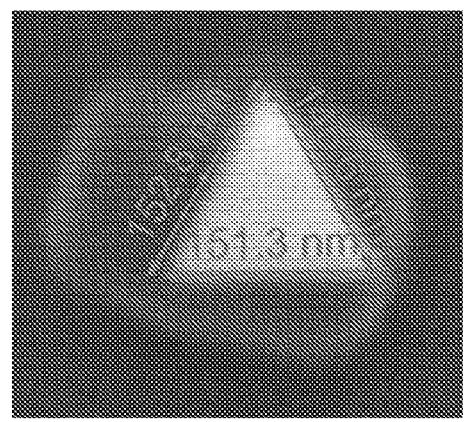
FIG. 9 is a scanning electron micrograph (SEM) of a single Au nanotriangle.

Au nanotriangles in a CTAC solution (10 mM in DI water) were prepared with previously established synthetic protocols (Nedev S et al. *Nano Lett.* 2011, 11, 5066-5070). The Au nanotriangles feature a side length of ~150 nm (FIG. 9) and plasmon resonance wavelength of 720 nm, which exhibit significantly enhanced electromagnetic fields at their tips (Scarabelli L et al. *ACS Nano* 2014, 8, 5833-5842; Jin R et al. *Science* 2001, 294, 1901-1903). Sixty microliters (60 µL) of the as-prepared Au nanotriangle solution was centrifuged for 10 min (4500 rpm) and the Au nanotriangles were re-dispersed in 20 µL CTAC solution (10 mM) with sonication for 10 min. As displayed in the inset of FIG. 8, the positive head group of CTAC is attached preferentially to the particle surface due to the electrostatic attraction (i.e., negative charge on the original Au surface). Above the critical micelle concentration (CMC, 0.13-0.16 mM) (Pignolet C et al. *J. Colloid Interface Sci.* 2010, 349, 41-48), a second layer of $CTA^+$ is formed on the particle surface with the head group pointing outward due to hydrophobic interaction between the tails of $CTA^+$ molecules, leading to a positive and hydrophilic surface of the nanoparticle that is surrounded by $Cl^-$ ions.

Au nanospheres 100 nm in diameter in PBS (0.1 mM) were purchased from Sigma-Aldrich. Sixty microliters (60 µL) of the as-purchased Au nanosphere solution (0.0389 mg/mL) was centrifuged for 10 min (4500 rpm) and the Au nanospheres were re-dispersed in 20 µL CTAC solutions with concentrations of 5, 10, 20, 50, 75, 100 and 150 mM, respectively.

Ag nanospheres 100 nm in diameter (0.02 mg/mL) with citrate-functionalized surfaces was purchased from nanoComposix. Two hundred microliters (200 µL) of the as-purchased Ag nanosphere solution was centrifuged for 10 min (4500 rpm) and the Ag nanospheres were re-dispersed in 20 µL CTAC solution (20 mM) with sonication for 10 min.

Figure 10:
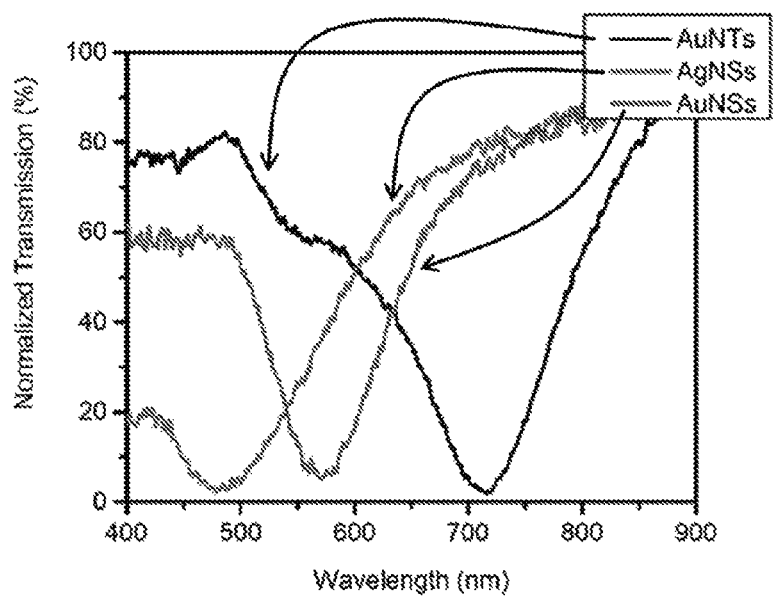
FIG. 10 shows the normalized optical transmission spectra of Au nanotriangles (AuNTs), Ag nanospheres (AgNSs), and Au nanospheres (AuNSs) in suspensions.

FIG. 10 shows the normalized optical transmission spectra of three types of plasmonic nanoparticle suspensions used in this work: Au nanotriangles (AuNTs), Ag nanospheres (AgNSs) and Au nanospheres (AuNSs). The Au nanospheres, Au nanotriangles and Ag nanospheres show plasmon resonance peaks at 570 nm, 720 nm and 480 nm, respectively. Optical transmission spectra of the plasmonic nanoparticle solutions were taken using an Ocean Optics spectrometer (HR4000CG-UV-NIR).

Figure 11:
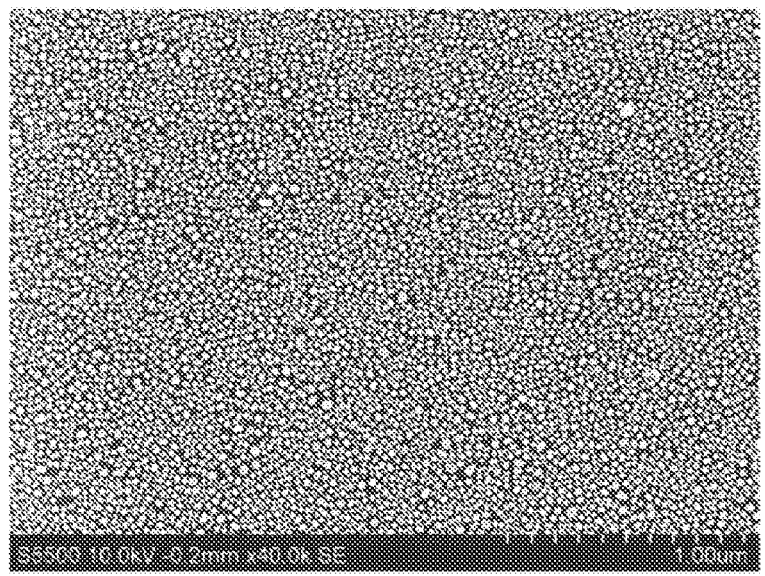
FIG. 11 is a scanning electron micrograph of the Au nanoislands as a plasmonic substrate.
Figure 12:
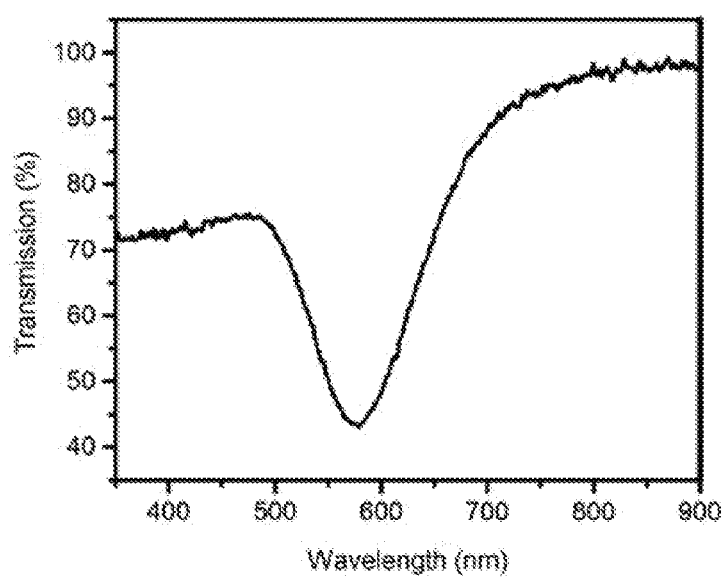
FIG. 12 is an optical transmission spectrum of the Au nanoislands as a plasmonic substrate.

A plasmonic substrate consisting of Au nanoislands (AuNIs) was employed to induce plasmon-enhanced photothermal effect. The Au nanoisland plasmonic substrate was prepared by depositing a 4.5 nm Au thin film on a glass coverslip with thermal evaporation (Denton thermal evaporator) at a base pressure of $9 \times 10^{-6}$ Torr. The Au thin film was annealed in air at 550° C. for 2 h to obtain the Au nanoislands on the coverslip. FIG. 11 shows a scanning electron microscopy (SEM) image of the Au nanoislands as a plasmonic substrate. The substrate features Au nanoislands with diameters of 20-40 nm and inter-particle distances of 5-10 nm. FIG. 12 shows an optical transmission spectrum of the Au nanoislands with a transmission dip at ~580 nm, which arises from the plasmon resonances of the Au nanoparticles. The transmission spectrum was taken with the substrate covered by water. Optical transmission spectra of the plasmonic substrates were taken using an Ocean Optics spectrometer (HR4000CG-UV-NIR).

Figure 13:
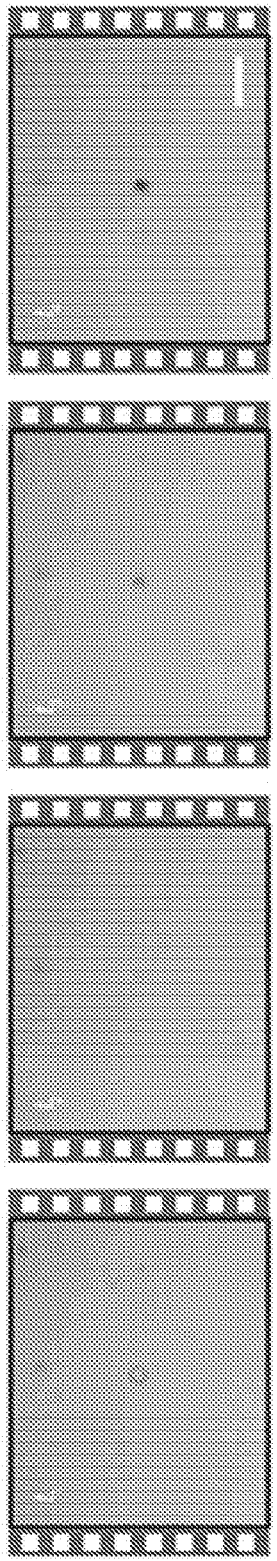
FIG. 13 shows successive optical images for the light-directed assembly of Au nanotriangles. The red and blue dot circles indicate that the laser is off and on, respectively. The scale bar is 10 µm.
Figure 14:
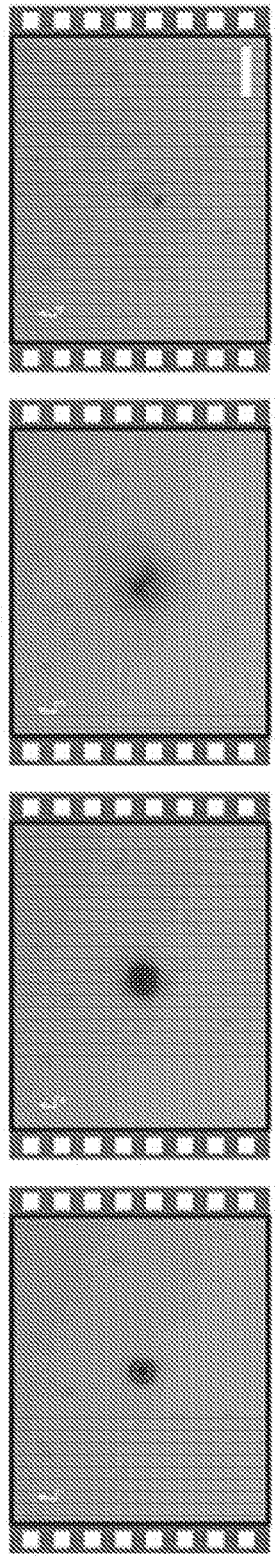
FIG. 14 shows successive optical images for the disassembly of an Au nanotriangle aggregate when the laser is off. The red and blue dot circles indicate that the laser is off and on, respectively. The scale bar is 10 µm.

The induced plasmon-enhanced photothermal effect from the Au nanoisland plasmonic substrate allows for the use of low optical power to create an appropriate temperature-gradient field for the thermophoretic assembly of nanoparticles. To optically assemble plasmonic nanoparticles, a 532 nm diode-pumped solid-state (DPSS) laser (Coherent, Genesis MX STM-1 W) was expanded with a 5× beam expander and focused onto the plasmonic substrate through a 60× objective (Newport, NA 0.85). When the plasmonic substrate is illuminated with the low-power laser beam, the plasmonic heating of the Au nanoislands on the substrate increases temperature of the surrounding nanoparticle suspensions. The thermophoresis that arises from the temperature gradient enables the rapid formation of the Au nanotriangle assembly at the laser spot near the substrate-solution interface (FIG. 13). The in-situ optical imaging was achieved through a customized upright Nikon microscope with 10× (NA: 0.30) and 100× (NA: 0.90) objectives. The successive optical images of the light-directed assembling process are shown in FIG. 13, which reveals that a stable Au nanotriangle assembly formed at $t_4$=10 s. The assembly is reversible. The Au nanotriangles re-dispersed into the solution once the laser was turned off (FIG. 14).

Figure 15:
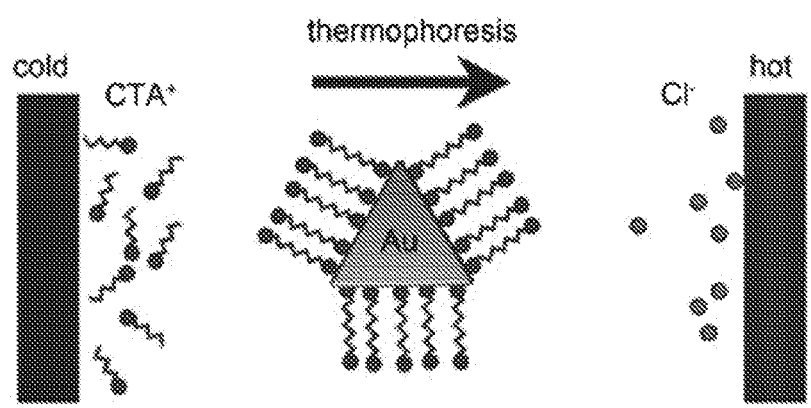
FIG. 15 is a schematic illustration of the migration of a $CTA^+$-modified Au nanotriangle from cold to hot regime in the light-induced temperature-gradient field, which is known as thermophoresis.

The assembly of the Au nanotriangles can be caused by the particle migration in the thermal-induced local electric field, i.e., thermoelectric effect (Reichl M et al. *Phys. Rev. Lett.* 2014, 112, 198101; Würger A. *Phys. Rev. Lett.* 2008, 101, 108302). As illustrated in FIG. 15, a light-induced local temperature gradient can impose a non-uniform concentration of the $CTA^+$ molecules as per the following equation:

$$\nabla \ln c = -\alpha \nabla \ln T \qquad (1)$$

where c is the molecule concentration, α is the diffusion coefficient, and T is the local temperature. A positive α drives the $CTA^+$ molecules to accumulate in the regime with the lower temperature (i.e., the cold regime). The orientation of the local electric field is determined by the separation of the positive $CTA^+$ molecules and the negative $Cl^-$ ions, which can be calculated by the relative Soret coefficient:

$$\delta S_T = S_T^+ - S_T^- \qquad (2)$$

where $S_T^+$ and $S_T^-$ denote the Soret coefficient of the positive molecules and the negative ions, respectively. Although a positive $S_T^-$ can also drive the $Cl^-$ ions towards the cold regime, the small Soret coefficient of $Cl^-$ ions ($7.18 \times 10^{-4}$ 1/K) gives a positive $\delta S_T$, which induces a local electric field E along the temperature gradient that points from cold to hot regime.

The electric force on a positive Au nanotriangle is described as F=qE, where q is the surface charge of the Au nanotriangle with a $CTA^+$ bilayer. The electric force F induced by the local electric field from the accumulation of the $CTA^+$ molecules in the cold regime drives the Au nanotriangles towards the hot regime (i.e., laser beam spot) to rapidly form the nanoparticle assembly. The speed of the formation of the nanoparticle assembly can be controlled by the incident optical power.

Figure 16:
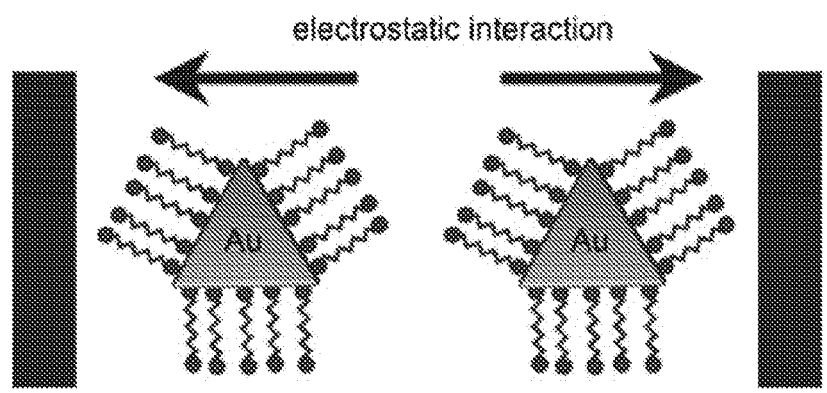
FIG. 16 is a schematic illustration of the release or re-dispersion of an Au nanotriangle assembly due to electrostatic repulsive interaction when the laser is off and the temperature-gradient field disappears.

When the nanoparticles are in close contact in the assembly, the van der Waals attraction becomes strong enough to stabilize the assembly. However, the electrostatic repulsive force between the positive $CTA^+$ molecules on the nanoparticle surfaces has a negative effect on the assembly stability, which can lead to the disassembling process. Therefore, a balance among the thermal-induced electric force, van der Waals attraction, and electrostatic repulsive force enables the reversible assembly of the nanoparticles. When the laser is turned off, the temperature-gradient field disappears and the nanoparticles in the aggregate separate from each other due to the electrostatic repulsive force (FIG. 16), leading to the re-dispersion of the nanoparticles and thus the disassembly of the aggregates.

To estimate the plasmon-enhanced photothermal effect and its role in the assembly of the plasmonic nanoparticles, the temperature-gradient profiles at the substrate-solution interfaces upon the illumination of a laser beam were simulated using computational fluid dynamic (CFD) simulations. Finite-element method-based numerical simulations (by COMSOL Multiphysics) were employed to analyze the temperature distribution around the laser beam focused at the substrate-water interface. For simplicity, a 2D axisymmetric model comprising of glass substrate, Au nanotriangle assembly and water was established. Since the physics involved is the heat transfer in solids (glass substrate and Au nanotriangles assembly) and the fluid, the pre-defined model Conjugate Heat Transfer was used. A Gaussian-beam-form heat source was given at the substrate-fluid interface to model the heating from the laser beam. For cases with Au nanotriangles sandwiched between the substrate and the fluid layer, a highly conductive layer was set to consider the heat transfer in the Au nanotriangle layer. Room temperature was set for other boundaries.

Figure 17:
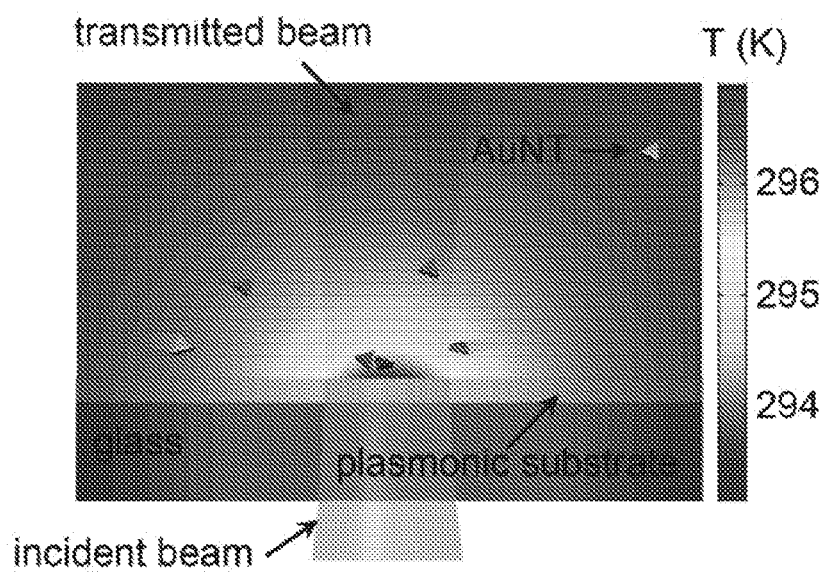
FIG. 17 shows the simulated temperature distribution at the interface between plasmonic substrate and particle solution in a cross-sectional view before the formation of Au nanotriangle assembly.
Figure 18:
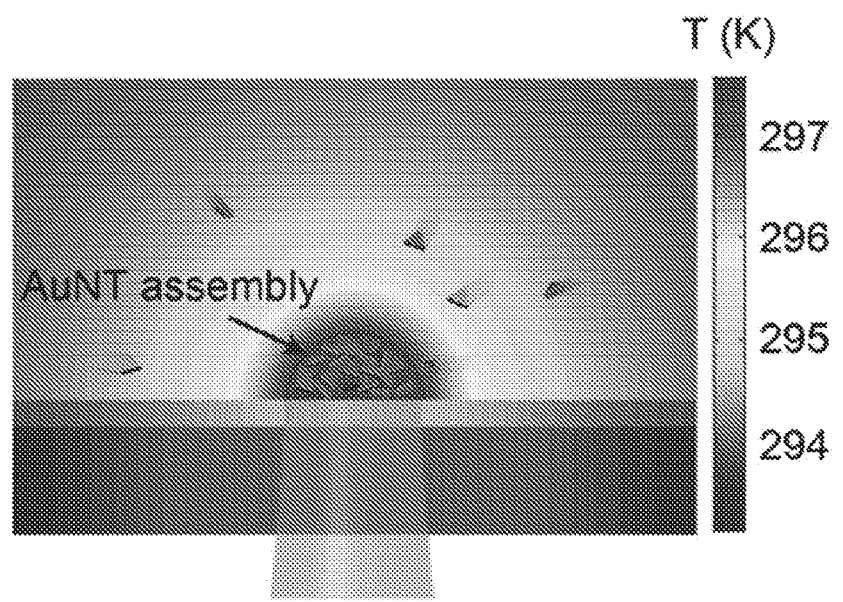
FIG. 18 shows the simulated temperature distribution at the interface between plasmonic substrate and particle solution in a cross-sectional view after the formation of Au nanotriangle assembly.
Figure 19:
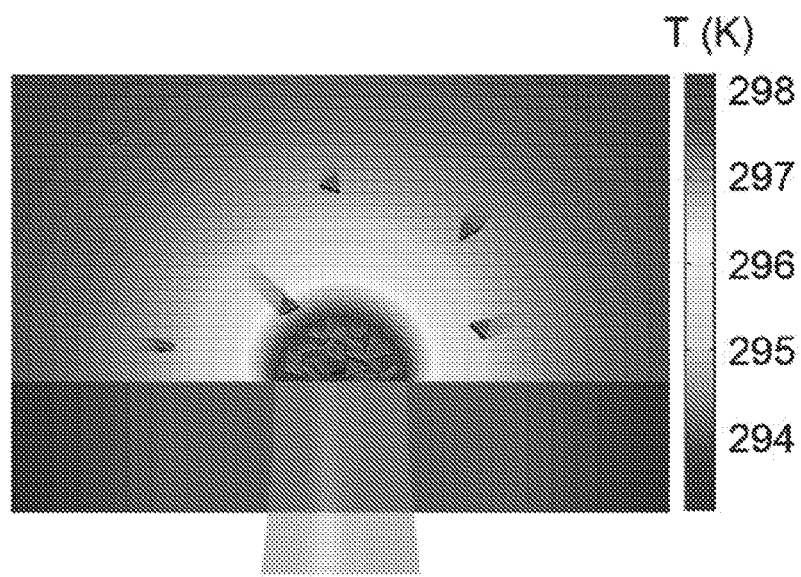
FIG. 19 shows the simulated temperature distribution at the interface between glass substrate and nanoparticle solution in a cross-sectional view.

The results of the computational fluid dynamic (CFD) simulations are displayed in FIG. 17-FIG. 19. When a 532 nm laser beam (power: 0.1 mW, diameter: 2 µm) is illuminated on the plasmonic substrate, a moderate temperature gradient of ~0.6 K/µm is obtained on top of the substrate. The rapid migration of the Au nanotriangles to the hot regime at the interface between the substrate and solution leads to the growth of the assembly. The Au nanotriangles assembled on top of the plasmonic substrate absorb the light that would otherwise transmit through the substrate, which further increases the photothermal effect and temperature gradient. As displayed in FIG. 18, when an Au nanotriangle assembly with a diameter of 2 µm forms on top of the plasmonic substrate, the transmitted light through the substrate is completely absorbed by the Au nanotriangle assembly, which leads to a temperature gradient of ~0.7 K/µm.

The optical power density used herein (~0.03 mW/µm$^2$) is at least 3 orders of magnitude lower than that used in optical tweezers for nanoparticle assembly (Tong L et al. *Lab Chip* 2009, 9, 193-195; Messina E et al. *J. Phys. Chem. C* 2011, 115, 5115-5122; Yoshikawa H et al. *Phys. Rev. E* 2004, 70, 061406).

Figure 20:
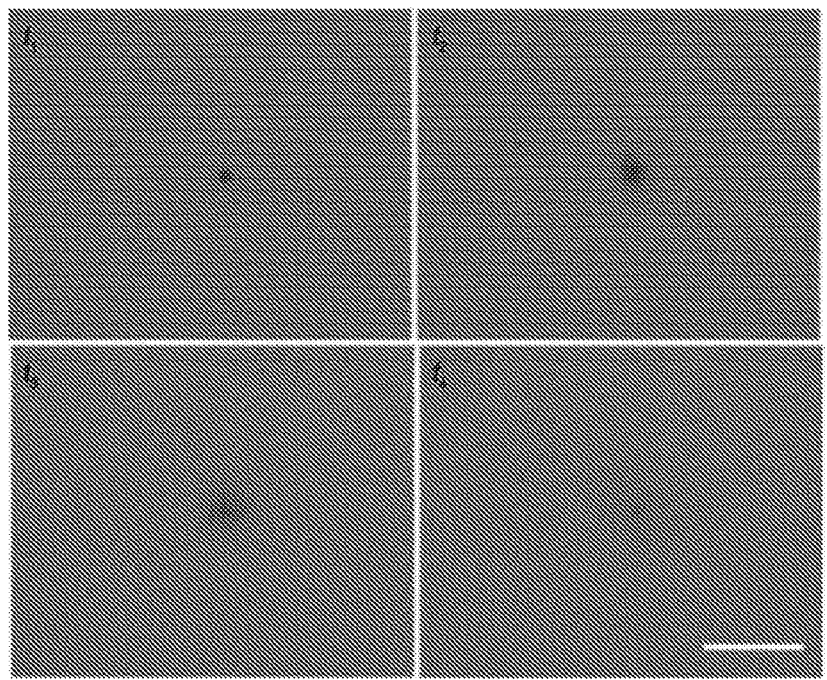
FIG. 20 shows time-evolved optical images of Au nanotriangle assembly (and disassembly) at the variable optical power. $t_1$: A stable Au nanotriangle assembly formed at optical power of 0.2 mW. $t_2$-$t_4$: An increased thermal convection disassembled the Au nanotriangle assembly when the optical power was increased to 0.5 mW. The scale bar is 10 µm.

The formation of a stable Au nanotriangle assembly depends on the optical power. If the optical power is too low (e.g., <0.03 mW/µm$^2$ for the examples herein), it cannot create a sufficiently strong local electric field to trap the nanoparticles as required for the assembling process. However, if the optical power is too high, it will induce strong thermal convection and Brownian motion of the plasmonic nanoparticles, causing the instability of the particle assembly. For example, as shown in FIG. 20, a stable Au nanotriangle assembly ($t_1$) was achieved by a 532 nm laser beam with an optical power of 0.2 mW and a diameter of 1 µm, but an increase of the optical power from 0.2 mW to 0.5 mW induced the stronger thermal convection, which disassembled the Au nanotriangle aggregate ($t_2$-$t_4$).

Figure 21:
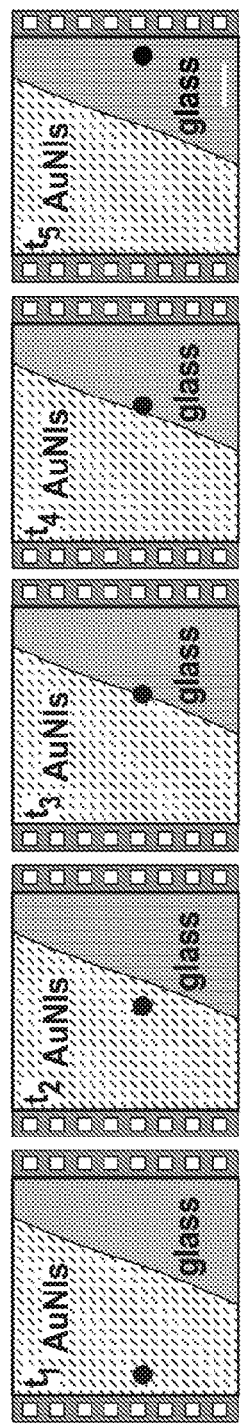
FIG. 21 shows time-evolved optical images illustrate that the Au nanotriangle assembly can be transported from the plasmonic substrate to the glass substrate by translating the sample stage. The scale bar is 10 µm.

Further, it was found that, while the Au nanoislands-based plasmonic substrate is required to initialize the light-directed assembly of nanoparticles via the plasmon-enhanced photothermal effect, it is not essential to maintain and to dynamically manipulate the nanoparticle assemblies once formed. The nanoparticle assembly itself becomes a heating source sufficient to maintain the force balance. As shown in FIG. 19, the light absorption by an Au nanotriangle assembly on a plain glass substrate can generate a temperature gradient of −0.8 K/µm, which is even higher than that on the plasmonic substrate. Unlike the plasmonic substrate where the incident light is partially reflected at the interface between Au nanoislands and glass substrate, the plain glass substrate exhibits significantly reduced reflection loss. The self-sustainability of the heating source lays the foundation for delivering a stable nanoparticle assembly over a non-plasmonic substrate. As experimentally demonstrated in FIG. 21, a stable Au nanotriangle assembly with a diameter of 4 µm was generated over the plasmonic substrate at $t_1$, and transported across the Au nanoisland/glass boundary at $t_2$-$t_4$ and over the glass substrate at $t_5$. The transport was achieved by translating the sample stage. The substrate-independent optical manipulation of nanoparticle assemblies promises a myriad of new opportunities for optofluidic applications.

The contribution of optical tweezing effect was excluded from the light-directed assembly of nanoparticles discussed herein. Experiments revealed that the initial light-directed assembly nanoparticles only occurred over the plasmonic substrate. Focusing the same laser beam at the interface of glass substrate and nanoparticle suspensions could not initiate the assembly of the nanoparticles, indicating that the optical force from the focused laser beam alone cannot trap and assemble the nanoparticles in this case. In fact, the transmitted laser beam through the non-plasmonic substrate exerts a scattering force on the nanoparticles, which pushes the nanoparticles away from the substrate and thus prevents the trapping and assembly. One may argue that the plasmon-enhanced optical force on the plasmonic substrate can improve the trapping and assembling capability of nanoparticles. However, the Au nanoislands as plasmonic substrate exhibit weak electromagnetic filed enhancement under the light illumination, which is far away from the condition for the maximum optical gradient force that is strong enough for the particle assembly (Lin L et al. *Nano Lett.* 2016, 16, 701-708). As a further test, the same laser beam was irradiated at the interface of Au nanoislands substrate and nanoparticle suspensions without CTAC surfactant, and no assembly of the nanoparticles occurred due to the absence of the thermoelectric effect.

Figure 22:
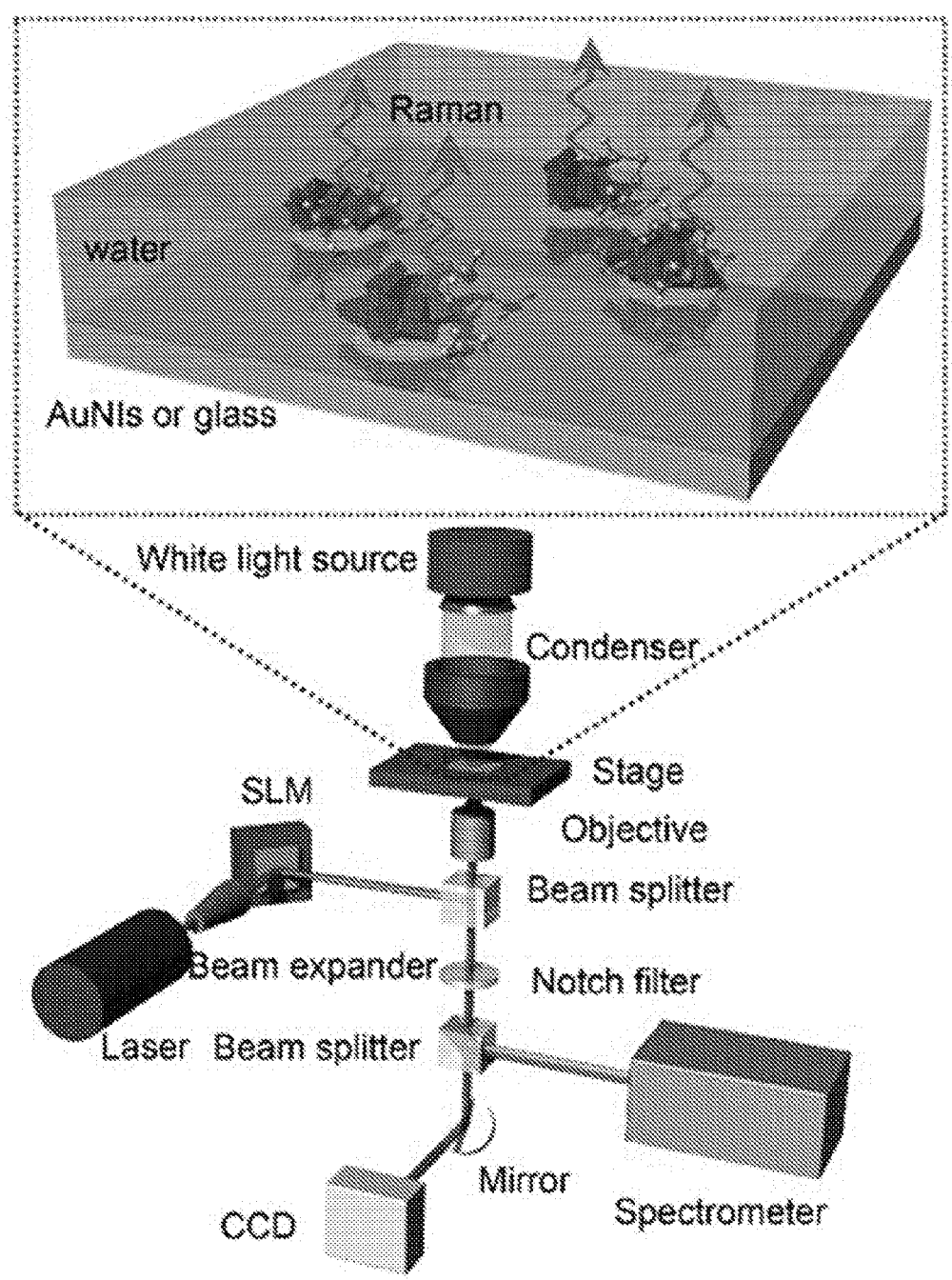
FIG. 22 shows the schematics of the optical setup for parallel and dynamic manipulation of multiple nanoparticle assemblies and "multiplex" in-situ SERS.

Taking advantage of flexible light management via holographic optics, versatile manipulation of multiple nanoparticle assemblies was also achieved. The optical setup for the parallel and dynamic manipulation of multiple nanoparticle assemblies is displayed schematically in FIG. 22. To optically assemble multiple nanoparticle assemblies, a spatial light modulator (SLM) (Boulder Nonlinear Systems, Model P512) and a 50× objective of long working distance (Mitutoyo, NA: 0.55) were used. The spatial light modulator was applied to dynamically control the laser beam in an arbitrary manner. The desired optical patterns on the plasmonic substrate were obtained by focusing an expanded laser beam that is modulated by the spatial light modulator onto the substrate.

Figure 23:
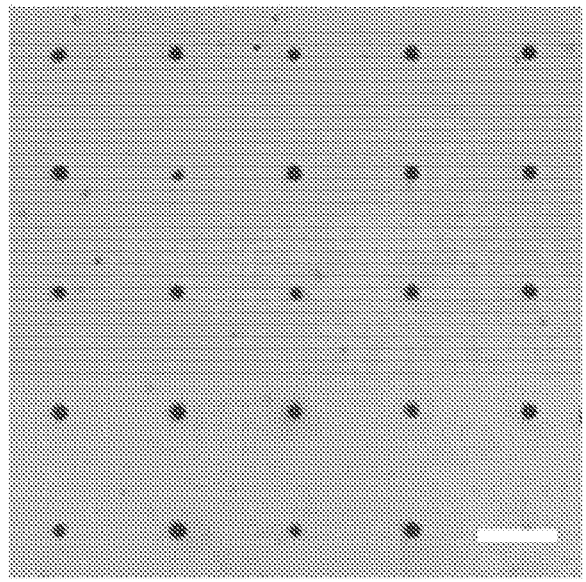
FIG. 23 is an optical image of 25 Au nanotriangle assemblies in a 5×5 square array. The total power of 532 nm working laser beam is 7.9 mW for the parallel manipulation. The diameter of individual laser beams for single assemblies is 2 µm. The scale bar is 10 µm.
Figure 24:
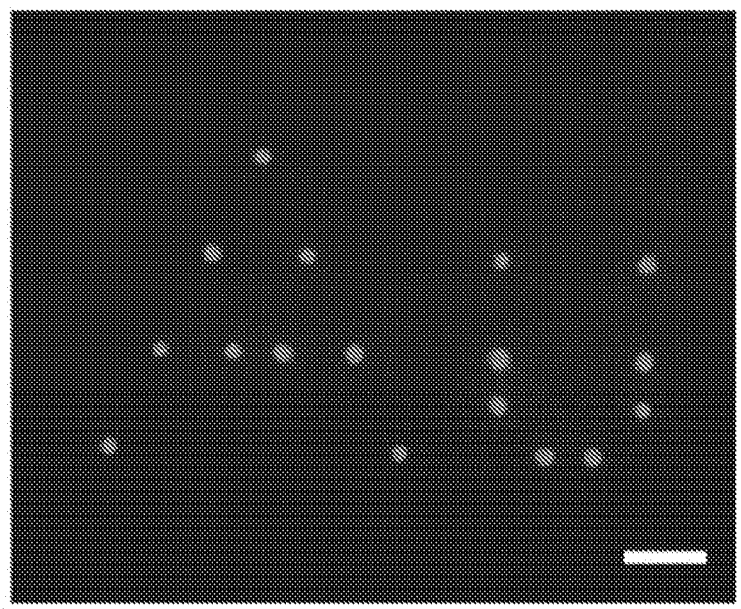
FIG. 24 is a dark-field optical image of 17 Au nanotriangle assemblies in an "Au" pattern. The total power of 532 nm working laser beam is 3.6 mW for the parallel manipulation. The diameter of individual laser beams for single assemblies is 2 μm. The scale bar is 10 μm.
Figure 25:
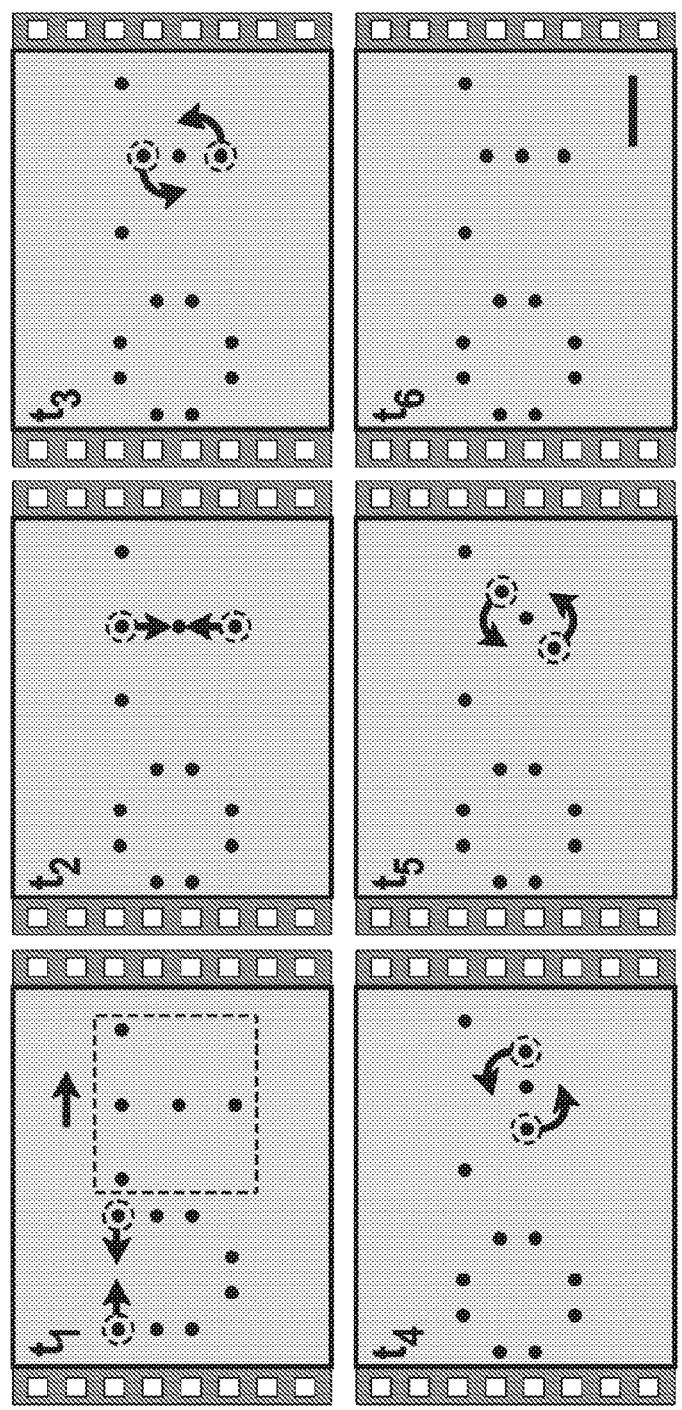
FIG. 25 shows the time-evolved optical images of dynamic manipulation of selected Au nanotriangle assemblies to transform the pattern. The total power of 532 nm working laser beam is 3.6 mW for the parallel manipulation. The diameter of individual laser beams for single assemblies is 2 μm. The scale bar is 10 μm.

Through engineering the optical patterns on the plasmonic substrate, the simultaneous generation of 25 Au nanotriangle assemblies in a 5×5 square array was demonstrated (FIG. 23). Another example was forming 17 Au nanotriangle assemblies in an "Au" pattern (FIG. 24). Despite an optical power fluctuation of −20% among the different laser beams generated by the spatial light modulator, multiple Au nanotriangle assemblies were generated with high uniformity and stability. Furthermore, dynamic manipulation of the Au nanotriangle assemblies was demonstrated, as shown in FIG. 25. In the demonstration, 13 Au nanotriangle assemblies were generated in a "UT" pattern at $t_1$, as shown in FIG. 25. A series of transport processes of selected assemblies was implemented to transform the pattern, as shown from $t_1$ to $t_6$ in FIG. 25.

Since the formation of nanoparticle assemblies relies on the photothermal effect from the plasmonic substrate and the CTAC surfactant, this technique is also applicable to general metallic nanoparticles. Along this line, the light-directed assembly of metallic nanoparticles of different compositions, sizes, and shapes was also demonstrated. This versatile manipulation of the nanoparticle assemblies can be harnessed as dynamic lithography to form arbitrary patterns of dispersed nanoparticles at the solid-liquid interfaces. With their reversible characteristics, the lithographic patterns can be "erased" and "rewritten" repeatedly. The minimum size of a single nanoparticle assembly can reach ~1 μm with the current optical setup described herein. The light-directed dynamic manipulation of multiple nanoparticle assemblies also allowed for the development of a "multiplex" in-situ surface-enhanced Raman spectroscopy (SERS) platform, as also discussed herein.

Exploiting the plasmon-enhanced electromagnetic field at plasmonic nanostructures, surface-enhanced Raman spectroscopy (SERS) is an analytical technique that can detect molecules with a sensitivity down to single-molecule level. A number of approaches have been implemented to enhance the localized electromagnetic field to improve the SERS sensitivity, including tailoring the particle shape and inducing near-field coupling. In particular, the integration of optical tweezers with SERS (also known as SERS tweezers) paves the way towards analyzing biomolecules in their native environments and developing optofluidics-based lab on a chip (Tong L et al. *Lab Chip* 2009, 9, 193-195; Messina E et al. *J. Phys. Chem. C* 2011, 115, 5115-5122; Stetciura I Y et al. *Analyst* 2015, 140, 4981-4986; Svedberg F et al. *Nano Lett.* 2006, 6, 2639-2641). However, the high optical power required for nanoparticle manipulation in optical tweezers can potentially damage the biomolecules (Fazio B et al. *Sci. Rep.* 2016, 6, 26952), which limits the applications of the SERS tweezers.

With the low-power operation and reversible assembly of plasmonic nanoparticles, the plasmon-enhanced thermophoretic technique discussed herein has advantages for its use in SERS tweezers, as demonstrated in in-situ molecular sensing herein. Meanwhile, SERS measurements can also be applied to monitor the dynamics of the light-directed nanoparticle assembly. Considering the role of CTAC in the assembly of nanoparticles, the effects of CTAC concentration on the performance of SERS based on the nanoparticle assemblies was investigated. For this study, Au nanosphere assemblies were used as the SERS substrates and rhodamine 6G as the targeted molecules.

As-prepared rhodamine 6G solutions (2 mM) were diluted to a series of concentrations of 200 μM, 20 μM and 2 μM. As-prepared methyl orange solutions (10 mM) were diluted to a series of concentrations of 1 mM, 100 μM and 10 μM. The different solutions of molecular analytes were mixed with plasmonic nanoparticle solutions of various concentrations in a 1:1 ratio. The mixtures were sonicated for 5 min 10 μL mixed solutions were sandwiched between the Au nanoislands (as a plasmonic substrate) and a coverslip with a 120 μm spacer for SERS.

Figure 26:
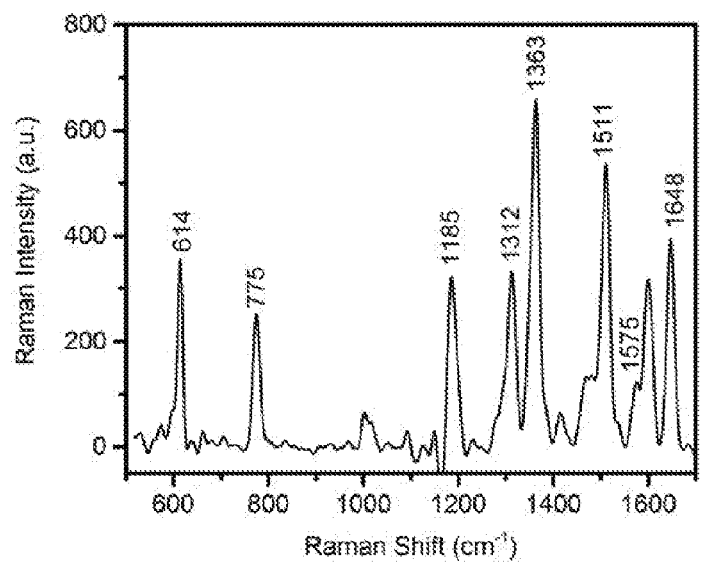
FIG. 26 shows the Raman spectrum of rhodamine 6G measured from a single Ag nanosphere assembly. The assembly size is 5.0±0.2 μm. The concentrations of CTAC and rhodamine 6G are 10 mM and 1 mM, respectively.

A single laser beam was used for both the formation of nanoparticle assembly and the Raman excitation. A typical Raman spectrum of rhodamine 6G recorded from a single Au nanosphere assembly (CTAC concentration: 10 mM) is shown in FIG. 26. Raman spectra were recorded with an Andor Shamrock 303i spectrograph (grating: 1199 l/mm and slit width: 45 μm) and a Newton EMCCD integrated with an inverted Nikon microscope. For in-situ SERS on a single nanoparticle assembly, a 660 nm DPSS laser (Laser Quantum, OPS 1500-1.5 W) was expanded with a 5× beam expander and focused onto the plasmonic substrate with a 40× objective (Nikon, NA 0.75) in the inverted microscope. The various vibration modes as indicated match those described elsewhere (Hildebrandt P et al. *J. Phys. Chem.* 1984, 88, 5935-5944). To carry out the parametric study of SERS, two modes were chosen, i.e., C—C—C ring in-plane bending mode at 614 $cm^{-1}$ and aromatic C—C stretching mode at 1510 $cm^{-1}$, for the detailed analysis.

Figure 27:
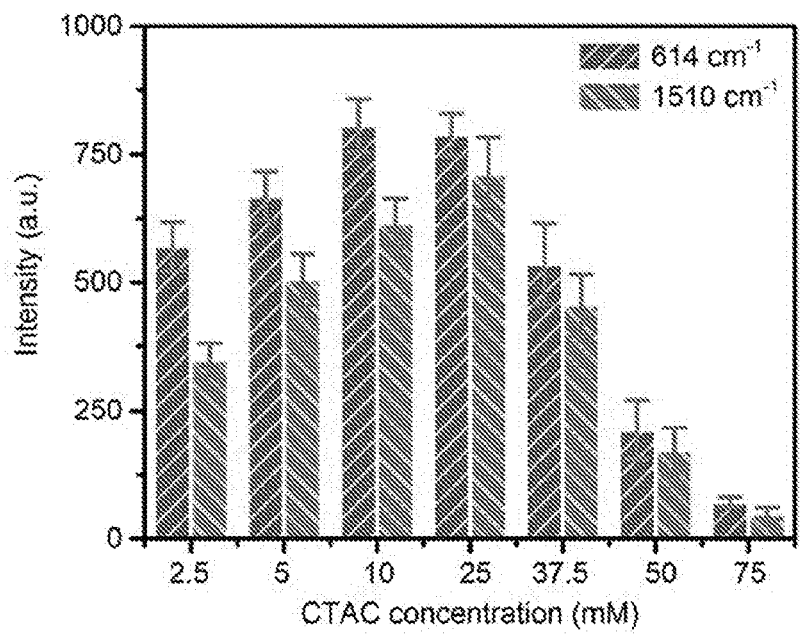
FIG. 27 shows the parametric study of SERS of rhodamine 6G based on plasmonic nanoparticle assemblies. Raman intensities of 614 cm$^{-1}$ and 1510 cm$^{-1}$ modes as a function of the CTAC concentration in Au nanosphere solution. The size of Au nanosphere assemblies over the plasmonic substrate was maintained at 4.0±0.2 μm. A 660 nm laser beam with a power of 0.27 mW and a diameter of 2 μm is used for both nanoparticle assembly and Raman measurement. The rhodamine 6G concentration is 1 mM. The acquisition time is 10 s.

As shown in FIG. 27, Raman intensities at 614 $cm^{-1}$ (C—C—C ring in-plane bending mode) and 1510 $cm^{-1}$ (aromatic C—C stretching mode) (Hildebrandt P et al. *J. Phys. Chem.* 1984, 88, 5935-5944) are highly sensitive to the CTAC concentrations. Specifically, both modes experience an increase and then a decrease in the intensity when the CTAC concentration was increased from 2.5 to 75 mM. There is an optimal CTAC concentration of 10-25 mM for the highest Raman intensities, which arises from the opposite dependency of two factors on the concentration of CTAC molecules. On one hand, the increased concentration of CTAC molecules leads to the stable nanoparticle assemblies with the stronger localized electromagnetic field and thus SERS signals. On the other hand, the increased concentration of CTAC reduces the interaction between the plasmonic nanoparticles and the targeted molecules, leading to the weaker Raman enhancement.

Figure 28:
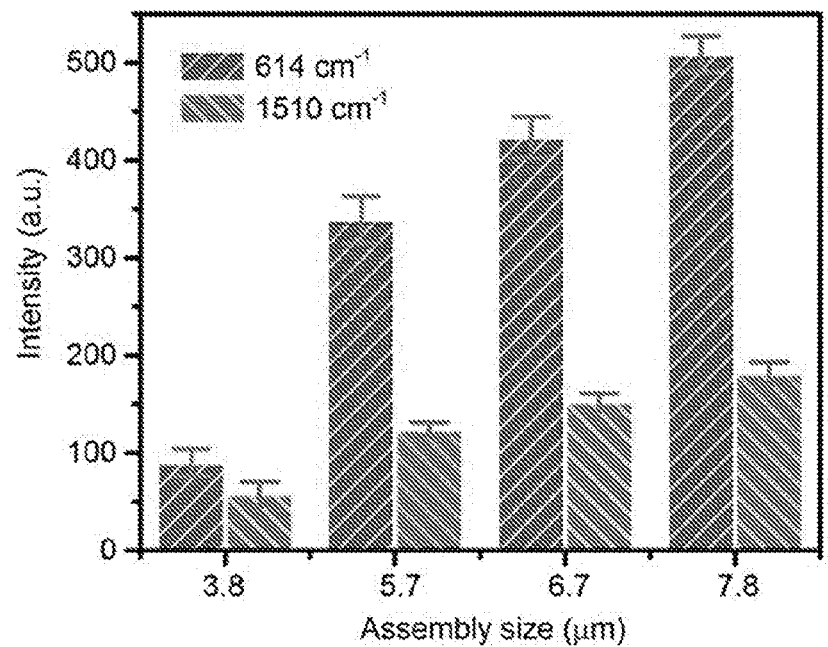
FIG. 28 shows the parametric study of SERS of rhodamine 6G based on plasmonic nanoparticle assemblies. Assembly-size-dependent Raman intensities of 614 cm$^{-1}$ and 1510 cm$^{-1}$ modes based on Au nanotriangle assemblies over the plasmonic substrate. A 660 nm laser beam with a power of 0.27 mW and a diameter of 2 μm is used for both nanoparticle assembly and Raman measurement. The rhodamine 6G concentration is 1 mM. The acquisition time is 1 s.
Figure 29:
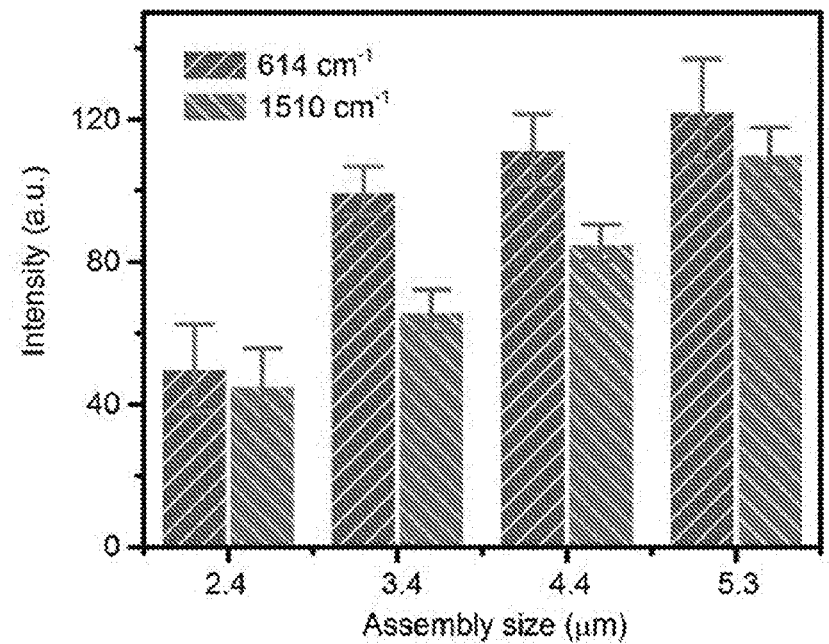
FIG. 29 shows the parametric study of SERS of rhodamine 6G based on plasmonic nanoparticle assemblies. Assembly-size-dependent Raman intensities of 614 cm$^{-1}$ and 1510 cm$^{-1}$ modes based on Au nanotriangle assemblies over the glass substrate. A 660 nm laser beam with a power of 0.27 mW and a diameter of 2 μm is used for both nanoparticle assembly and Raman measurement. The rhodamine 6G concentration is 1 mM. The acquisition time is 1 s.

The near-field coupling between the plasmonic substrates and the plasmonic nanoparticle assemblies were further exploited to improve the SERS performance. FIG. 28 and FIG. 29 summarize the assembly-size-dependent Raman intensities (of modes at 614 $cm^{-1}$ and 1510 $cm^{-1}$) measured when the Au nanotriangle assemblies were over plasmonic substrate and glass substrate, respectively. In both cases, the Raman intensities increase with the assembly size, which can be attributed to the increased number of plasmonic "hot spots" and targeted molecules in the larger assemblies. Significant improvement of SERS performance is observed for assemblies over the plasmonic substrate due to the assembly-substrate coupling. In addition, the SERS sensitivity of Au nanotriangle assemblies is almost an order of magnitude higher than that of Au nanosphere assemblies because the Au nanotriangles exhibit enhanced electromagnetic field at their tips. The Raman exposure time in FIG. 27 is ten-fold longer than that in FIG. 28 and FIG. 29.

Figure 30:
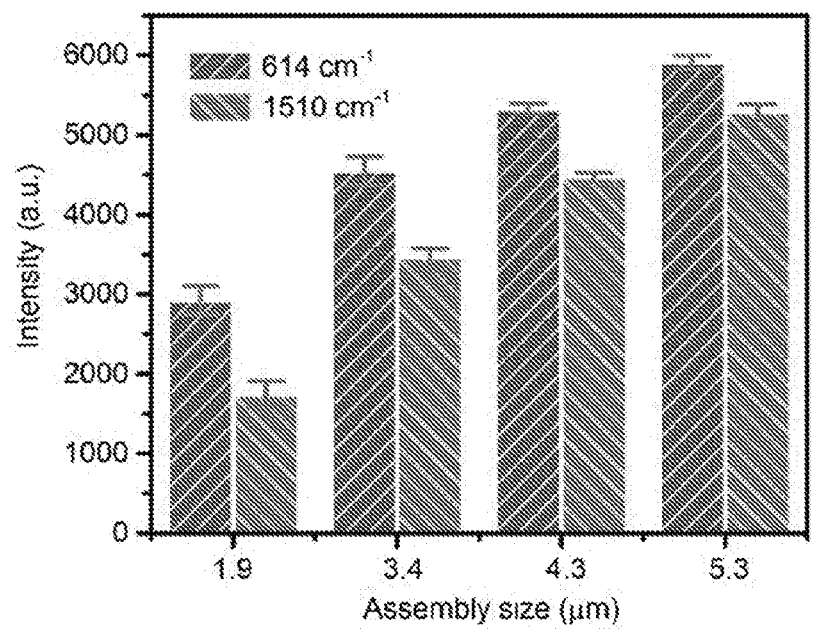
FIG. 30 shows the parametric study of SERS of rhodamine 6G based on plasmonic nanoparticle assemblies. Assembly-size-dependent Raman intensities of 614 cm$^{-1}$ and 1510 cm$^{-1}$ modes based on Ag nanosphere assemblies over the plasmonic substrate. A 660 nm laser beam with a power of 0.27 mW and a diameter of 2 μm is used for both nanoparticle assembly and Raman measurement. The rhodamine 6G concentration is 1 mM. The acquisition time is 1 s.

The technique was also extended to reversibly assemble Ag nanospheres and apply the Ag nanosphere assemblies for SERS of rhodamine 6G. FIG. 30 shows the dependence of the Raman intensities for the two modes (i.e., 614 $cm^{-1}$ and 1510 $cm^{-1}$) on the assembly size. The Ag nanospheres with a diameter of ~100 nm exhibit a plasmon resonance wavelength of 480 nm (FIG. 10), which is much shorter than the wavelength of the working laser beam (i.e., 660 nm). Compared with the Au nanotriangles, the Ag nanospheres exhibit smaller maximum assembly size because of the stronger Brownian motion of the smaller Ag nanospheres and the weaker photothermal effect at the Ag nanosphere assembly. Still, Ag nanosphere assemblies exhibit higher SERS sensitivity than Au nanotriangle assemblies, with an enhancement of one order of magnitude. This observation is consistent with the previous studies that revealed better SERS performance from Ag nanoparticles (Kreibig U and Vollmer M. *Optical Properties of Metal Clusters*. Springer: Berlin, 1995).

Figure 31:
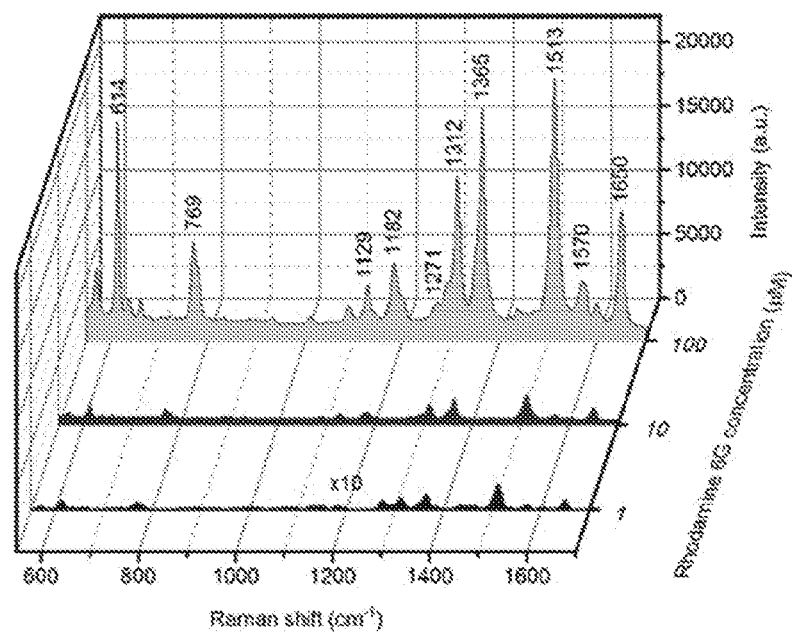
FIG. 31 shows the Raman spectra recorded from single Ag nanosphere assemblies over the plasmonic substrate for rhodamine 6G of different concentrations. The assembly size is 5.0±0.2 μm. A 660 nm laser beam with a diameter of 2 μm and a power of 0.27 mW is used for both nanoparticle assembly and Raman measurement. Raman acquisition time is 10 s.
Figure 32:
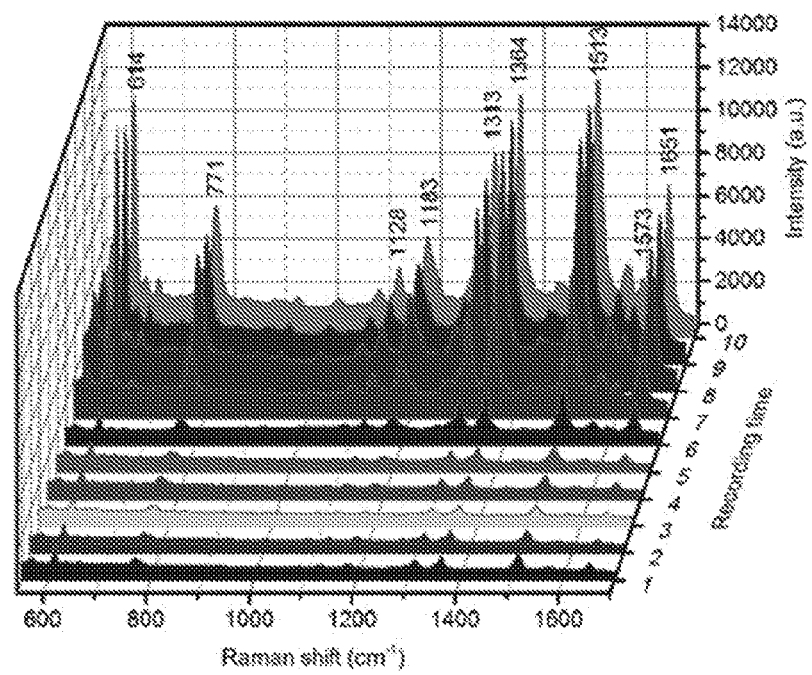
FIG. 32 shows the time-resolved Raman spectra of rhodamine 6G (10 μM) based on a single Ag nanosphere assembly during the solvent evaporation. At $t_1$, the assembly is immersed in the solvent. At $t_{10}$, the assembly is 100% dry. The assembly size increases from 4 μm to 6 μm after the complete evaporation of solvent. A 660 nm laser beam with a diameter of 2 μm and a power of 0.32 mW is used for both nanoparticle assembly and Raman measurement. Raman acquisition time is 15 s.

To evaluate the ultimate sensitivity of SERS, the dependence of Raman signals on the concentration of rhodamine 6G with a single Ag nanosphere assembly as a SERS substrate was studied. As shown in FIG. 31, a detection limit of ~1 µM for an acquisition time of 10 seconds was obtained. Two strategies were developed to further enhance the SERS sensitivity. One strategy was to dry the nanoparticle assemblies. The hydrophobic interaction between the CTA tails maintains the $CTA^+$ double layers, which exert the electrostatic repulsive force on the nanoparticles to maintain a certain inter-particle distance. The solvent removal would eliminate the hydrophobic interaction and damage the $CTA^+$ double layers, reducing the repulsive force. Therefore, it is expected that a dried nanoparticle assembly can become more compact with smaller inter-particle distance due to the stronger van der Waals interaction and the weaker electrostatic repulsive force. The more compact assemblies can enhance the localized electromagnetic field or "hot spots" that amplify the Raman signals of the molecules. FIG. 32 shows the time-evolved Raman spectra of rhodamine 6G recorded from a single Ag nanosphere assembly during the solvent evaporation. It can be seen from FIG. 32 that the solvent evaporation increases the SERS.

Figure 33:
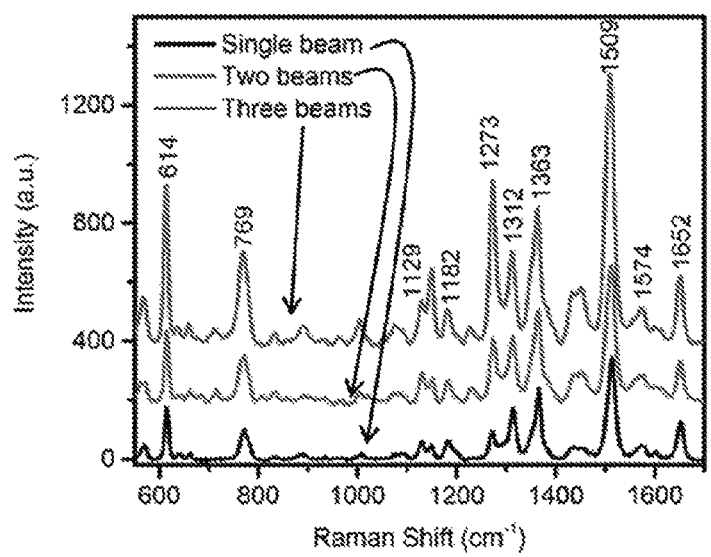
FIG. 33 shows the Raman spectra of rhodamine 6G measured from one Ag nanosphere assembly, two Ag nanosphere assemblies and three Ag nanosphere assemblies generated by single beam, two beams and three beams through spatial light modulator.

The other strategy was to use multiple nanoparticle assemblies for "multiplex" SERS. To demonstrate this concept, one, two and three nanoparticle assemblies were generated for the SERS of rhodamine 6G. For in-situ SERS on multiple nanoparticle assemblies, a spatial light modulator (SLM) (Hamamatsu, X13138-01) was added in the original optical path to create multiple beams for the "multiplex" SERS. FIG. 33 show the Raman spectra of rhodamine 6G from one Ag nanosphere assembly, two Ag nanosphere assemblies and three Ag nanosphere assemblies, respectively. A significant improvement of the SERS performance is observed when the assembly number is increased. The power variation of ~20% among individual beams generated by spatial light modulator could limit the uniformity of multiple assemblies.

Figure 34:
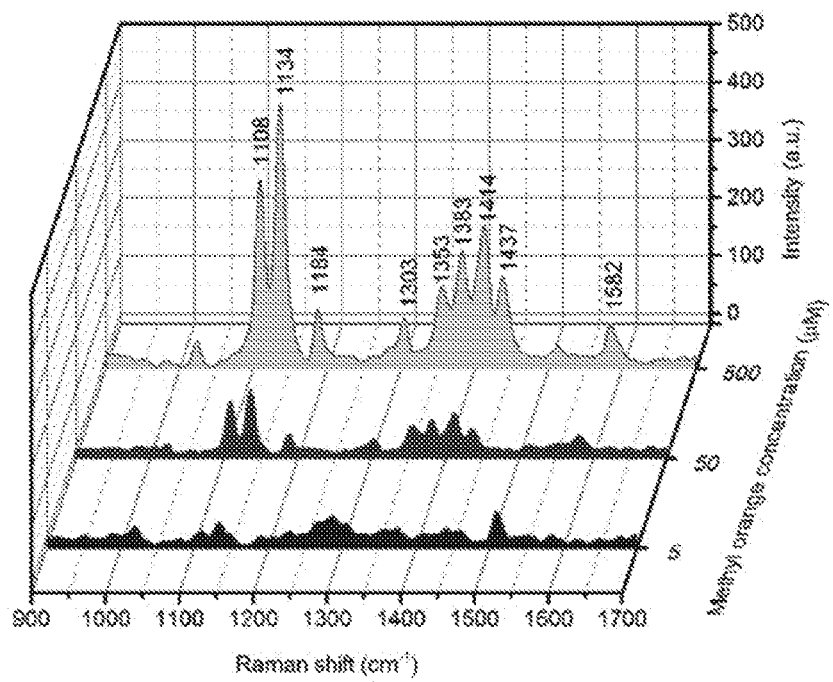
FIG. 34 shows the Raman spectra of methyl orange of variable concentrations based on Au nanotriangle assembly over the plasmonic substrate (assembly size: 5.3±0.2 μm). A 660 nm laser beam with a diameter of 2 μm and a power of 0.32 mW is used for both the nanoparticle assembly and SERS measurement. Raman acquisition time is 10 s.
Figure 35:
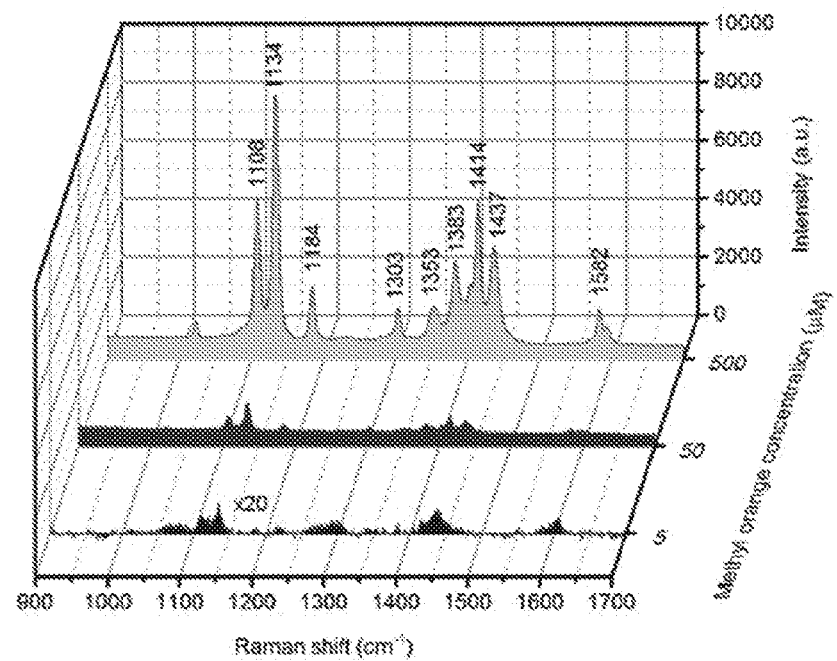
FIG. 35 shows the Raman spectra of methyl orange of variable concentrations based on Ag nanosphere assembly over the plasmonic substrate (assembly size: 3.8±0.2 μm). A 660 nm laser beam with a diameter of 2 μm and a power of 0.32 mW is used for both the nanoparticle assembly and SERS measurement. Raman acquisition time is 10 s.

The assembly-based SERS for detection of methyl orange with the concentration ranging from 5 µM to 500 µM was also demonstrated, as summarized in FIG. 34 and FIG. 35. For the Au nanotriangle assembly, Raman signals of methyl orange cannot be identified when the concentration is below 5 µM (FIG. 34). Using the Ag nanosphere assembly as SERS substrate, Raman signals (with low signal-to-noise ratio) from methyl orange were identified when the concentration is below 5 µM (FIG. 35). The SERS sensitivity can be further improved by employing plasmonic nanoparticles with optimized sizes and shapes.

A method for the light-directed reversible assembly of general plasmonic nanoparticles using the plasmon-enhanced thermophoresis was discussed herein. The non-photoresponsive CTAC surfactant forms a double layer to create a hydrophilic and positive nanoparticle surface. Such surface-functionalized nanoparticles can be driven to the hot regime on top of a plasmonic substrate under the plasmon-enhanced temperature-gradient field. The coordinated action from the thermophoretic force, electrostatic repulsive force, and van der Waals attraction enable the reversible assembly of plasmonic nanoparticles independent of their compositions, sizes, and shapes. Using a holographic optical system, parallel manipulation of multiple particle assemblies was achieved. Compared with optical tweezers, this thermophoretic method features lower optical power and higher assembly efficiency with simpler optics. Furthermore, these plasmonic nanoparticle assemblies can be applied for "multiplex" SERS. With their low-power and parallel operation, reversible nanoparticle assembly, and applicability to general nanoparticles, this technique can open up a new window of opportunities for trapping, manipulation, patterning and sensing of nanoparticles for various applications.

Example 2

Optical manipulation of plasmonic nanoparticles offers the possibility of dynamic control of light-matter interactions at the nanoscale, which is of interest for various applications in nanophotonics, materials science, and life sciences. Optical tweezers have been shown to trap metal nanoparticles at highly focused laser beams with strong light intensity, since they provide a sufficient optical gradient force (Lehmuskero A et al. *ACS Nano* 2015, 9, 3453-3469). Although the use of optical tweezers succeeded in trapping Au and Ag nanoparticles with different sizes and shapes, the use of optical tweezer suffers from certain technical obstacles. First, upon excitation of localized surface plasmons (LSPs) of the metal nanoparticles by the trapping laser beam, enhanced light absorption and scattering result in optical heating of the particles and strong optical radiation forces, thereby significantly reducing the trapping stability (Lehmuskero A et al. *ACS Nano* 2015, 9, 3453-3469; Ruijgrok P V et al. *Phys. Rev. Lett.* 2011, 107, 037401; Shao L et al. *ACS Nano* 2015, 9, 12542-12551). As a result, optical trapping is limited to near-infrared (NIR) lasers with wavelengths far away from the localized surface plasmon resonance of the metal nanoparticles (Selhuber-Unkel C et al. *Nano Lett.* 2008, 8, 2998-3003; Bosanac L et al. *Nano Lett.* 2008, 8, 1486-1491; Ruijgrok P V et al. *Phys. Rev. Lett.* 2011, 107, 037401). Second, optical tweezers can only trap metal nanoparticles with sizes significantly smaller than the laser wavelength (i.e., in the Rayleigh regime) where the nanoparticle can be treated as a dipole. Optical trapping of larger particles with sizes comparable to or larger than the laser wavelength is challenging because the enhanced light-scattering cross section increases the optical scattering force (Lehmuskero A et al. *ACS Nano* 2015, 9, 3453-3469; Min C et al. *Nat Commun* 2013, 4, 2891). Finally, high laser power is required to trap subwavelength metal nanoparticles, ranging from tens to hundreds of milliwatts. Such high optical powers can potentially damage the functional materials, surface molecules, and even the trapped metal nanoparticles (Babynina A et al. *Nano Lett.* 2016, 16, 6485-6490).

By using plasmonic nanoantennas on substrates, plasmon-enhanced optical forces can be used for low-power optical trapping of dielectric nanoparticles (Tanaka Y et al. *Nano Lett.* 2013, 13, 2146-2150; Juan M L et al. *Nat. Phys.* 2009, 5, 915-919; Jensen R A et al. *ACS Photonics* 2016, 3(3), 423-427). However, trapping metal nanoparticles in the vicinity of plasmonic nanoantennas is still challenging due to strong near-field plasmon coupling between the trapped nanoparticles and the nanoantennas, such that the particle loses its intrinsic optical features in the trap (Zhang W et al. *Nano Lett.* 2010, 10, 1006-1011). Besides, plasmonic tweezers lack the ability to dynamically manipulate and transport the trapped particle (Zheng Y et al. *Nano Lett.* 2014, 14, 2971-2976; Ndukaife J C et al. *Nat. Nanotechnol.* 2016, 11, 53-59; Berthelot J et al. *Nat. Nanotechnol.* 2014, 9, 295-299). Optical trapping of metal nanoparticles at their corresponding localized surface plasmons is expected to facilitate in-situ optical spectroscopy, leading to insights into plasmon coupling and its applications in sensing, imaging and opto-thermal therapy. By exploring the nanoparticle migration along a light-controlled thermoelectric field, an opto-thermoelectric nanotweezer (OTENT) method has been developed that can capture and manipulate metal nanoparticles at single-particle resolution.

OTENT relies on the high optothermal conversion efficiency at the excitation of localized surface plasmons on a thermoplasmonic substrate (e.g., a porous Au film). The optothermal effect or Joule loss is often recognized as an intrinsic limitation for the use of metal plasmonic nanoparticles in nanophotonic devices (Govorov A O and Richardson H H. *Nano Today* 2007, 2, 30-38; Baffou G and Quidant R. *Laser Photonics Rev.* 2013, 7, 171-187). Even though strategies have been developed to reduce losses (Kramer N J et al. *Nano Lett.* 2015, 15, 5597-5603; Regmi R et al. *Nano Lett.* 2016, 16, 5143-5151; Boltasseva A and Atwater H A. *Science* 2011, 331, 290-291), the Joule loss can also be turned into advantage in applications such as optothermal therapy (Ayala-Orozco C et al. *ACS Nano* 2014, 8, 6372-6381; Cheng X et al. *Adv. Mater.* 2017, 29, 1604894). The generated heat can also benefit optical trapping by creating a electrothermoplasmonic flow that can deliver nanoparticles to the trapping site (Ndukaife J C et al. *Nat. Nanotechnol.* 2016, 11, 53-59). However, it has been elusive to apply the thermoelectric effect as a general mechanism for manipulation at the single-nanoparticle level.

Figure 36:
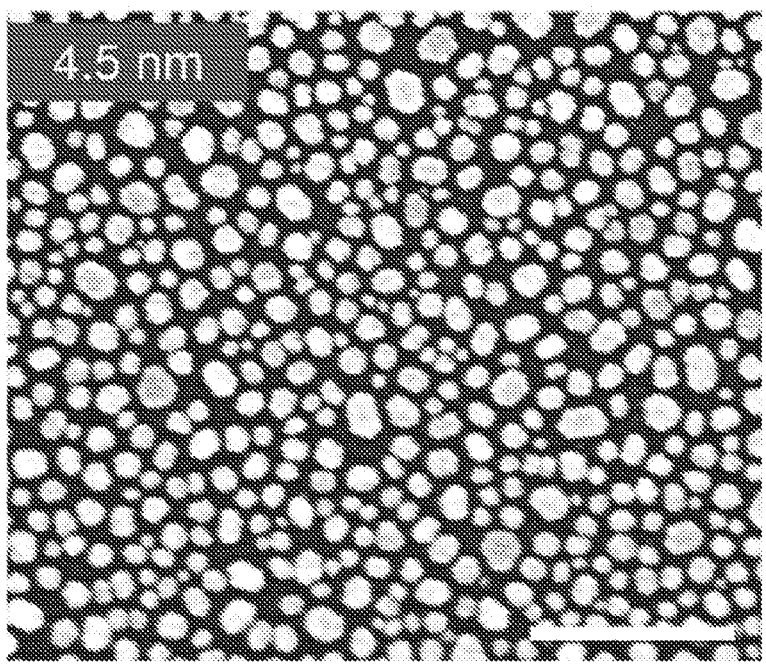
FIG. 36 is a scanning electron microscopy (SEM) image of the 4.5 nm porous Au film after thermal annealing. Scale bar: 200 nm.
Figure 37:
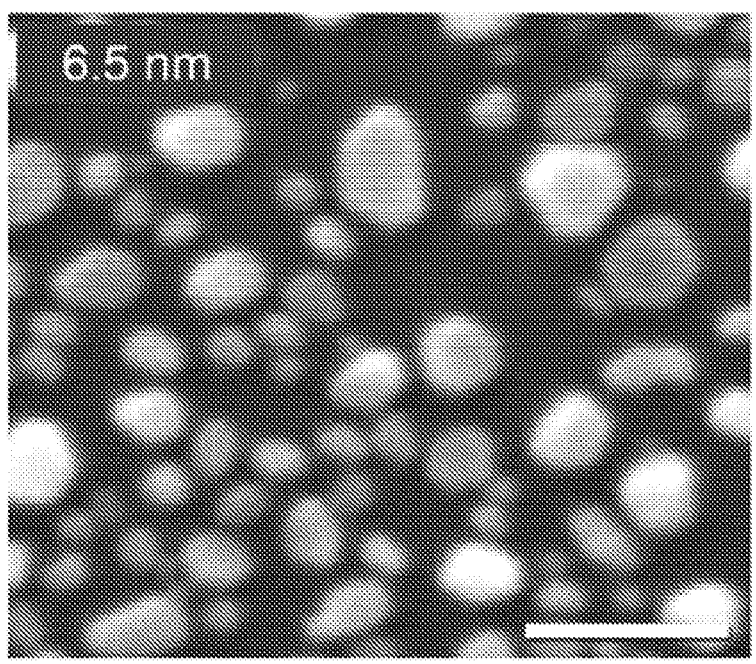
FIG. 37 is a scanning electron microscopy (SEM) image of the 6.5 nm porous Au films after thermal annealing. Scale bar: 200 nm.
Figure 38:
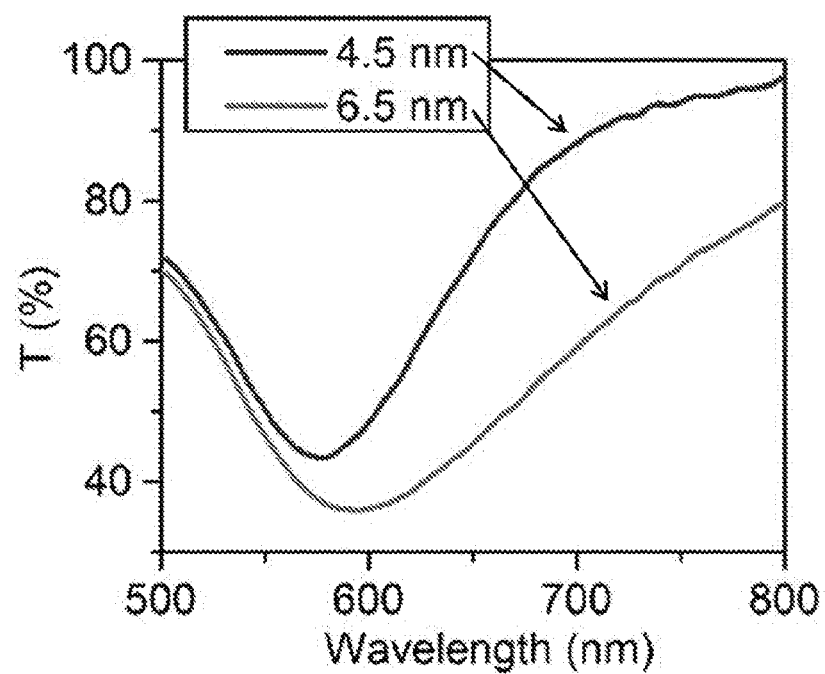
FIG. 38 is the transmission spectra of the 4.5 nm and 6.5 nm porous Au films after thermal annealing.

The development and application of OTENT to achieve single-nanoparticle manipulation under in-situ monitoring by optical spectroscopy is described herein. Thermoplasmonic substrates were prepared by depositing Au thin films on glass slides (Denton thermal evaporator, base pressure: $9 \times 10^{-6}$ Torr), followed by thermal annealing at 550° C. in air for 2 hours. Two different thicknesses of Au films were deposited, 4.5 nm and 6.5 nm, which were used for excitation with the 532 nm laser and 633 nm laser, respectively (FIG. 36-FIG. 38).

Using a laser beam matching the localized surface plasmon of the thermoplasmonic substrate, a thermal hot spot is created at an optical power that is 2-3 orders of magnitude lower than that in optical tweezers, to trap and dynamically manipulate gold and silver nanoparticles of various sizes and shapes. Since the optical force arising from the light-nanoparticle coupling is weak at such a low optical power, both resonant and non-resonant laser wavelengths to the localized surface plasmons of metal nanoparticles can be used in the OTENT.

Figure 39:
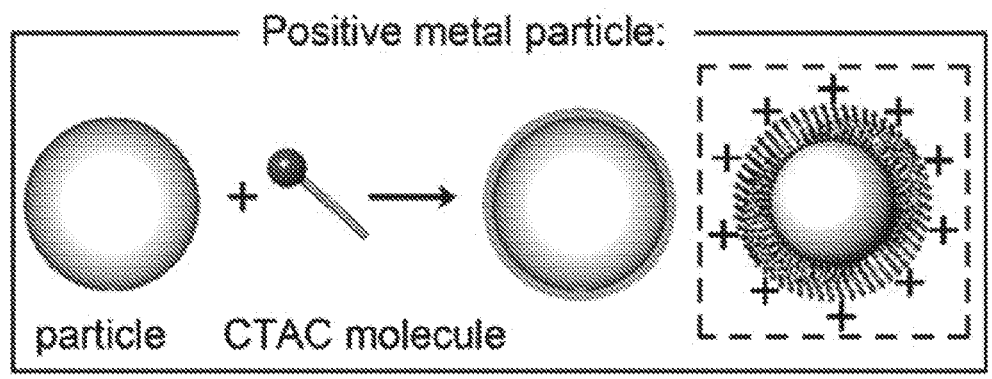
FIG. 39 is a schematic view of the surface charge modification of a metal nanoparticle by CTAC adsorption.
Figure 40:
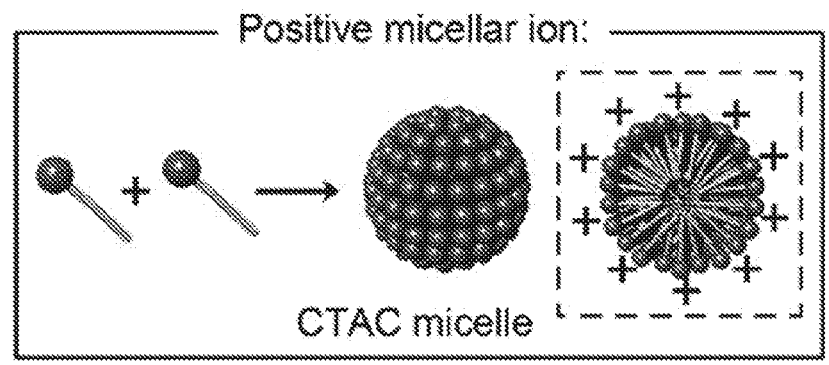
FIG. 40 is a schematic view of the formation of CTAC micelles, which can act as macro-positive ions.
Figure 41:
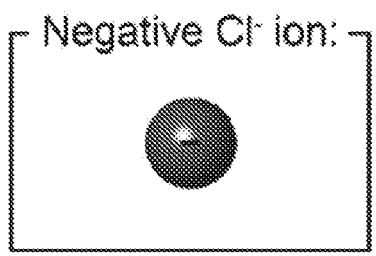
FIG. 41 is a schematic view of a Cl$^-$ ion.

Colloidal particles or molecules can undergo thermophoretic migration under a thermoelectric field, which can arise from a temperature gradient field in a solvent with dissolved salts (Lin L et al. *ACS Nano* 2016, 10, 9659-9668; Piazza R and Parola A. *J. Phys.: Condens. Matter* 2008, 20, 153102; Würger A. *Phys. Rev. Lett.* 2008, 101, 108302; Würger A. *Rep. Prog. Phys.* 2010, 73, 126601; Reichl M et al. *Phys. Rev. Lett.* 2014, 112, 198101). The resulting thermophoretic velocity is determined by the Soret coefficients of different ion species and the surface charge of the colloidal particles. For example, negatively charged particles migrate from a hot to a cold region in NaCl solution, but migrate from a cold to a hot region in NaOH solution (Würger A. *Rep. Prog. Phys.* 2010, 73, 126601). Although it has been demonstrated that optical confinement of single nanoparticles or macromolecules in the cold regions can be achieved by means of a dynamic temperature field (Braun M and Cichos F. *ACS Nano* 2013, 7, 11200-11208; Braun M et al. *Nano Lett.* 2015, 15, 5499-5505), stable trapping and even tweezing has not been achieved. To enable OTENT, a cationic surfactant, cetyltrimethylammonium chloride (CTAC), was added to the nanoparticle colloid. The CTAC molecules adsorb on the particle surface and form a positively charged molecular double layer (FIG. 39). Simultaneously, CTAC molecules self-assemble into micelles when above its critical micelle concentration (cmc, 0.13-0.16 mM). With high charge density and nanoscale size, CTAC micelles act as macro cations (known as micellar ions, FIG. 40), which, together with the Cl$^-$ counter-ions (FIG. 41) provide the thermoelectric field in OTENT.

Figure 42:
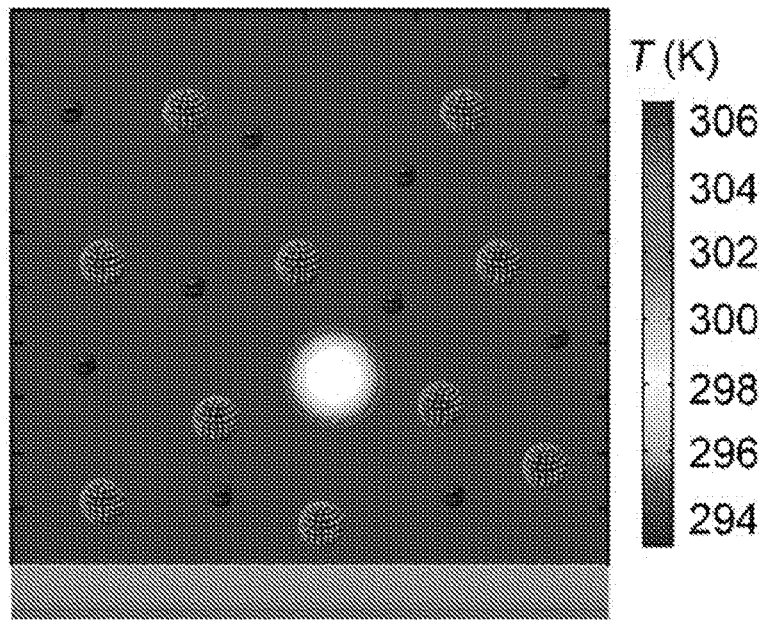
FIG. 42 is a schematic view of the dispersion of a single metal particle and multiple ions (micellar ions and Cl$^-$ ions) in the solution without optical heating.

Without optical heating, both the ions and the metal particles are randomly dispersed in the solution, without a preferred migration direction (FIG. 42). To generate an optically controllable temperature gradient field, a laser beam was directed onto a thermoplasmonic substrate, i.e., a porous Au film which was fabricated by simply deposition of an Au layer followed by thermal annealing. The porous Au film can be replaced by other opto-thermal responsive substrates, e.g., a continuous Au film or an indium tin oxide thin film. However, the porous Au film is chosen since it features high opto-thermal conversion efficiency due to the excitation of a high-density of "hot spots" and low thermal conductivity because of the spatially isolated nanoparticles on the substrate, which lead to a high temperature gradient with a low-power light illumination and temperature increment.

The finite elements method (COMSOL Multiphysics) was used to simulate both the temperature gradient distribution and temperature distribution around the laser beam focused at the substrate-solution interface. A two-dimensional axisymmetric model comprised of a glass substrate, an Au thin film, and solvent was built. Both the pre-defined conjugate heat transfer and Laminar flow models were used to include the heat transfer in solids and fluids. A Gaussian-distributed heating source was placed at the substrate-solution interface to model the optical heating from the laser beam. Room temperature was set at all other boundaries.

Figure 43:
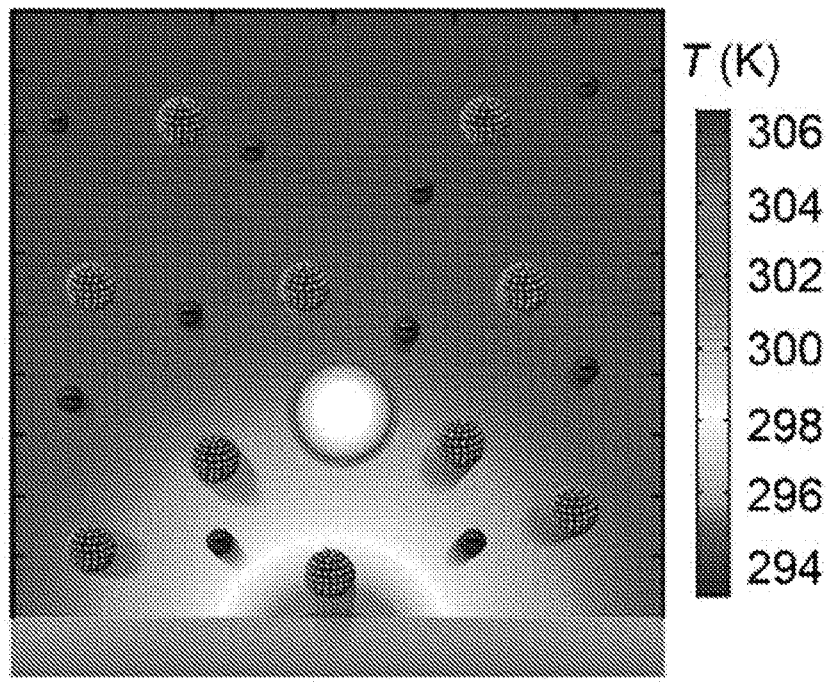
FIG. 43 is a schematic view of the thermophoretic migration of the ions under optical heating. The incident laser beam has a diameter of 2 μm and an optical power of 0.216 mW.
Figure 44:
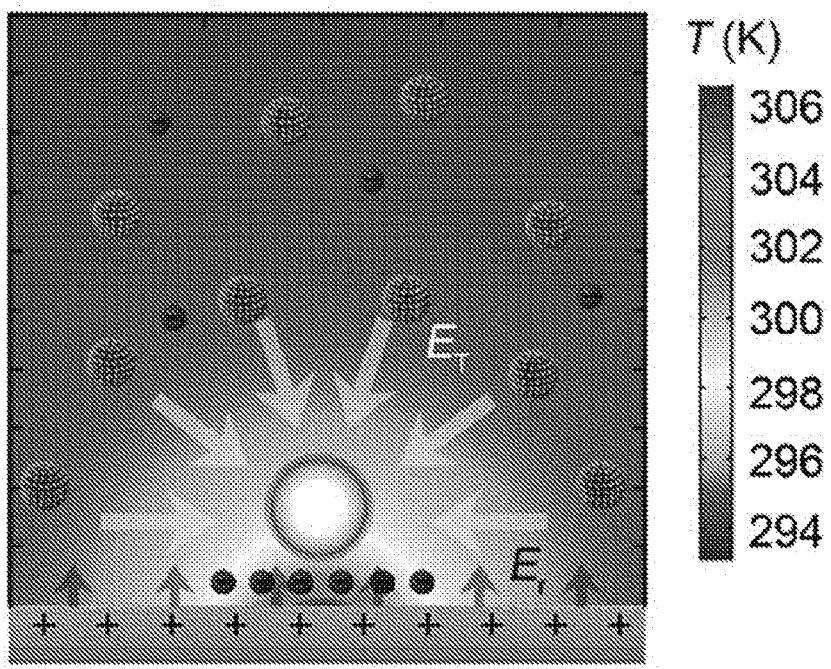
FIG. 44 is a schematic view of the steady ionic distribution under optical heating generates a thermoelectric field $E_T$ for trapping the metal nanoparticle. The repulsive electric field $E_r$ arises from the positive charge of the thermoplasmonic substrate and balances $E_T$. The incident laser beam has a diameter of 2 μm and an optical power of 0.216 mW.

A cross-sectional view of the simulated temperature distribution (embedded in the scheme) at the substrate-solution interface is shown in FIG. 43. Both the micellar ions and Cl$^-$ ions undergo thermal diffusion, migrating from a hot to a cold region. The migration of ions under the temperature gradient is associated to the heat transfer between the ions and the surrounding environment, i.e. the heat will be absorbed from the reservoir at T, and given out at the temperature T+ΔT, which provides the ability to maintain a temperature gradient during ionic transport (Eastman E D. *J. Am. Chem. Soc.* 1928, 50, 283-291). The quantity of heat absorbed from the surroundings when one mole of ions is transferred is the ionic heat of transport Q*, which creates a current along the temperature gradient (Würger A. *Rep. Prog. Phys.* 2010, 73, 126601):

$$J(Cl^-) = -D_{Cl^-}\left(\nabla n_{Cl^-} + n_{Cl^-}\frac{Q^*_{Cl^-}}{k_B T^2}\nabla T - n_{Cl^-}\frac{Z_{Cl^-} e E_0}{k_B T}\right) \quad (3)$$

where $D_{Cl^-}$ is the diffusion coefficient of Cl$^-$ ions, $n_{Cl^-}$ is the concentration of Cl$^-$ ions, T is the environmental temperature, $Z_{Cl^-}$ is the charge number of the Cl$^-$ ion, e is the elemental charge, $E_0$ is the electric field, $\nabla n_{Cl^-}$ is the concentration gradient of Cl$^-$ ions, $Q^*_{Cl^-}$ is the heat of transport of Cl$^-$ ions, $k_B$ is the Boltzmann constant and $\nabla T$ is the temperature gradient. The Soret coefficient of the Cl$^-$ ions $S_T$ (Cl$^-$) is given as $7.18 \times 10^{-4} K^{-1}$. Meanwhile, the CTAC micelles are driven along the temperature gradient by thermoosmosis (Vigolo D et al. *Langmuir* 2010, 26, 7792-7801), which arises from the osmotic imbalance in the electric double layers, with the Soret coefficient (Bregulla A P et al. *Phys. Rev. Lett.* 2016, 116, 188303):

$$S_T(\text{micelle}) = \frac{\varepsilon \zeta_{mic}^2}{8\eta T D_{mic}} \quad (4)$$

where $\varepsilon$ is the dielectric constant of the solvent, $\eta$ is the viscosity of the solvent, $D_{mic}$ is the diffusion coefficient of the CTAC micelles, and $\zeta_{mic}$ is the surface potential of CTAC micelles. At a steady state, the spatial redistribution of both CTAC micelles and Cl⁻ ions generates an electric field, which is given by (Reichl M et al. *Phys. Rev. Lett.* 2014, 112, 198101):

$$E_T = \frac{k_B T \nabla T}{e} \frac{\Sigma_i z_i n_i S_{Ti}}{\Sigma_i z_i^2 n_i} \quad (5)$$

where i indicates the ionic species, i.e. CTAC micellar ions or Cl⁻ ions. Since the CTAC micelle has a higher molecular mass and a larger Soret coefficient, i.e. $S_T$ (micelle)$>S_T$ (Cl⁻), an electric field $E_T$ pointing towards the laser beam is obtained from spatial redistribution of both the CTAC micelles and the Cl⁻ ions (Lin L et al. *ACS Nano* 2016, 10, 9659-9668), which can trap the positively charged metal nanoparticle at the laser spot, as shown in FIG. 44. The corresponding in-plane and out-of-plane temperature gradient and trapping force $F_T = qE_T$ are schematically presented in FIG. 45 and FIG. 46, where q is the charge of the metal nanoparticles. This trapping electric field is balanced by the repulsive electric field $E_T$ arising from the positive charge of the thermoplasmonic substrate. Different from optical tweezers, where the particle is trapped with the optical gradient force from a highly focused laser beam, the trapping electric field in OTENT arises from optical heating, which can relax the rigorous optics requirements of optical tweezers. Based on this general concept, the trapping and dynamic manipulation of various types of metal nanoparticles, including Au nanospheres (AuNSs), Ag nanospheres (AgNSs), Au nanotriangles (AuNTs), Au nanorods (AuNRs) and Ag nanowires (AgNWs), with in-situ optical spectroscopy at single-particle resolution is demonstrated herein.

The 200 nm Au nanospheres, 100 nm Au nanospheres (in PBS, 0.1 mM) and Au nanorods with nominal absorption peak at 700 nm were purchased from Sigma-Aldrich. The 100 nm Ag nanospheres with citrate-functionalized surfaces were purchased from nanoComposix. The nanoparticle suspension was centrifuged for 5 min (4500 rpm) and re-dispersed in CTAC solutions with the desired concentration. Au nanotriangles in 10 mM CTAC solution were prepared using previously reported synthesis protocols (Scarabelli L et al. *ACS Nano* 2014, 8, 5833-5842). Silver nanowires were synthesized using the polyol method, according to a procedure reported elsewhere (Coskun S et al. *Cryst. Growth Des.* 2011, 11, 4963-4969). At the end of the synthesis, silver nanowires were purified through multiple centrifugation steps in acetone and ethanol. Following purification, the final product was dispersed in ethanol for storage. The Ag nanowire suspensions were diluted with CTAC solution to the targeted concentration for trapping experiments.

Sharing the same concept, other ionic surfactants such as cetyltrimethylammonium bromide (CTAB) and sodium dodecyl sulfate (SDS) also work for OTENT. SDS has a negative charge and thus reverses both the trapping electric field and the sign of surface charge of the metal nanoparticles to enable the opto-thermoelectric trapping. However, a similar trapping effect cannot be achieved using non-ionic surfactants such as Triton X-100, which further verifies the working mechanism of OTENT.

First, the use of OTENT for trapping and manipulating single Au nanospheres and Ag nanospheres is demonstrated. Due to their strong light scattering at the localized surface plasmon resonance wavelengths, Au nanospheres and Ag nanospheres were tracked with in-situ dark-field optical imaging.

The optical set up for OTENTS included a 532 nm diode-pumped solid-state laser was expanded with a 5× beam expander and projected onto a digital micromirror device (DMD). The optical images were reflected by the DMD and focused onto the thermoplasmonic substrate for optical heating. The size of the beam was reduced by 200 times after being relayed by a 1000 mm doublet lens, a 200 mm doublet lens, an infinity-corrected tube lens and a 40× objective (Nikon, NA 0.75) in a Nikon inverted microscope.

Figure 45:
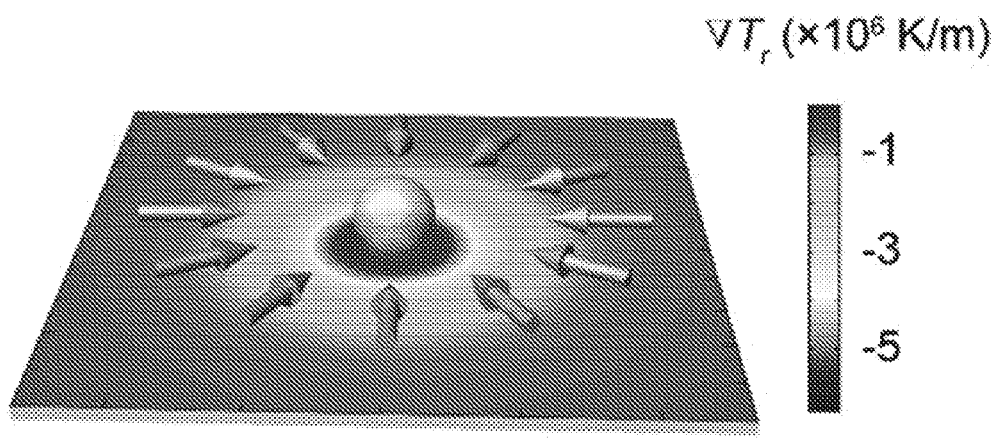
FIG. 45 is the simulated in-plane temperature gradient and direction of the corresponding trapping force. The incident laser beam has a diameter of 2 μm and an optical power of 0.216 mW. The arrows show the direction of the trapping force.
Figure 46:
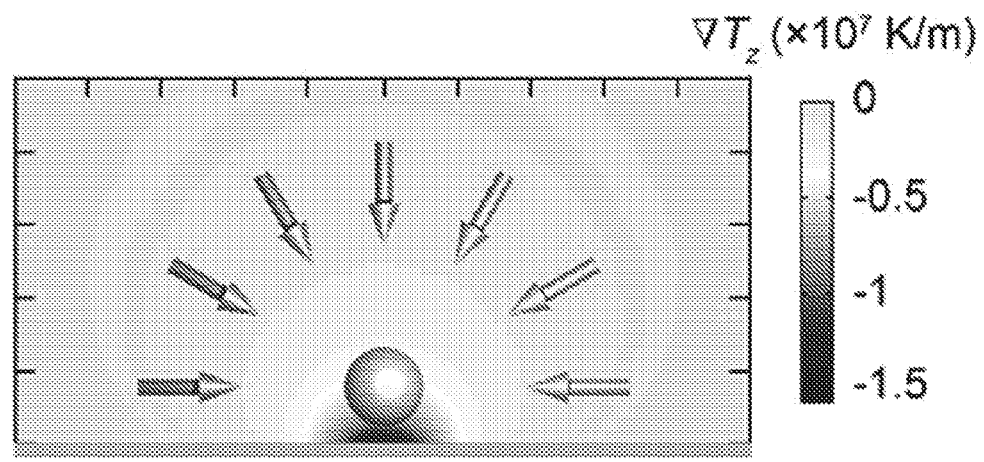
FIG. 46 is the simulated out-of-plane temperature gradient and direction of the corresponding trapping force. The incident laser beam has a diameter of 2 μm and an optical power of 0.216 mW. The arrows show the direction of the trapping force.

FIG. 47 shows the trapping process of a single 100 nm Ag nanosphere using a low-power 532 nm laser beam. Different from the plasmon-enhanced optical force on plasmonic nanoantennas, which is limited by the delay length of localized surface plasmons, the temperature gradient field has a much larger working range (FIG. 45 and FIG. 46). Thus, OTENT can effectively deliver the metal nanoparticles to the trapping center within a surrounding region of 5-10 µm in radius. OTENT can also overcome another limitation of plasmonic tweezers, namely the lack of dynamic manipulation of the trapped nanoparticles (Zheng Y et al. *Nano Lett.* 2014, 14, 2971-2976; Ndukaife J C et al. *Nat. Nanotechnol.* 2016, 11, 53-59). The substrate used herein in the OTENT is optically continuous and the optically generated temperature gradient field is uniform, which allows the trapped particle to be dynamically transported at will by directing the laser beam. As shown in FIG. 48, a trapped Ag nanosphere was delivered over a distance of ~110 µm in 9 s. The trapped particle was released as soon as the heating laser was turned off and the temperature gradient field disappeared (FIG. 49).

The trapping efficiency was evaluated by measuring escape velocities of the trapped nanoparticles. To measure the escape velocity of trapped particles, a single 532 nm laser beam with a diameter of 2 µm was created on the thermoplasmonic substrate to capture a single metal nanoparticle. A motorized sample stage with a given moving velocity was used to introduce a Stokes drag force from the fluid on the trapped particle. The escape velocity was defined as the critical velocity when the trapping force of the particle was balanced by the drag force.

Figure 50:
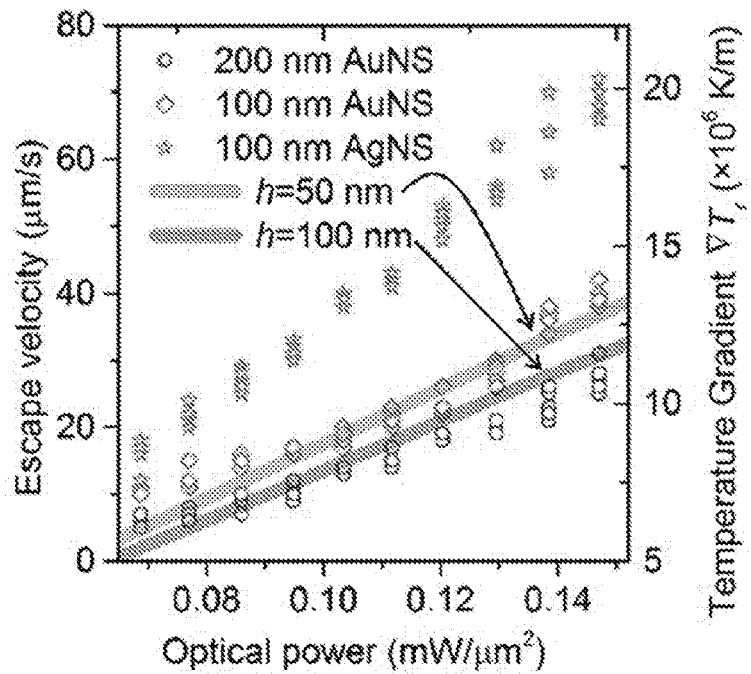
FIG. 50 is the measured escape velocities of 200 nm Au nanosphere (AuNS), 100 nm Au nanosphere, and 100 nm Ag nanosphere (ag NS), as a function of optical power. The maximum in-plane temperature gradients at the planes that are 50 nm and 100 nm above the thermoplasmonic substrate (i.e. around the center of the trapped 100 nm and 200 nm nanospheres) were simulated as a function of the optical power (h=50 nm and h=100 nm curves, respectively). CTAC concentration was 1 mM.
Figure 51:
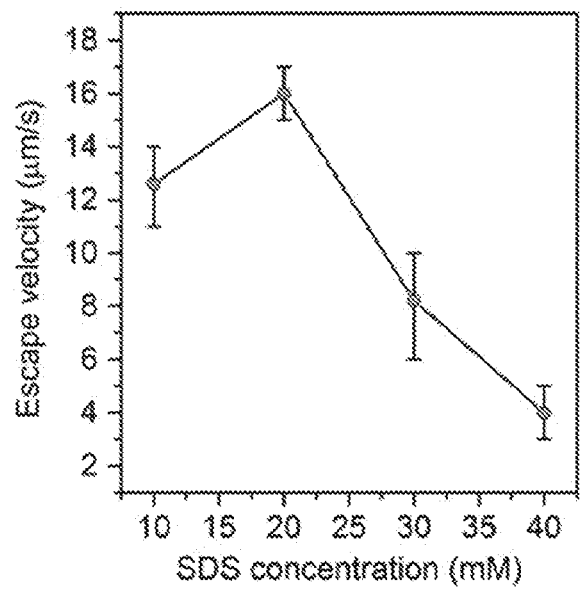
FIG. 51 is the escape velocity of a single 200 nm Au nanosphere (AuNS) as a function of SDS concentration. The Au nanosphere was trapped with a 532 nm laser beam through a 100× air objective (NA 0.9). The laser beam has a diameter of 1 μm at an optical power of 0.05 mW. A maximum escape velocity was observed at a SDS concentration of 20 mM, which is about 3 times higher than the critical micelle concentration (cmc) of SDS.
Figure 52:
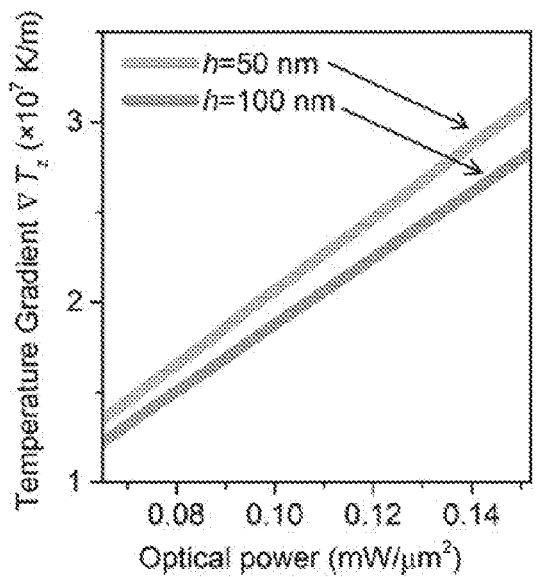
FIG. 52 is the simulated out-of-plane temperature gradients at the planes that are 50 nm and 100 nm above the substrate, corresponding to around spherical centers of the trapped 100 nm Au nanosphere and 200 nm Au nanosphere, as a function of the incident optical power.

FIG. 50 summarizes the measured escape velocities of different metal nanoparticles (200 nm Au nanospheres, 100 nm Au nanospheres and 100 nm Ag nanospheres) at different optical power (see FIG. 51 for the escape velocity measurement of a single 200 nm Au nanosphere in SDS solution). The faster escape velocities indicate stronger trapping capabilities. The escape velocities were found to increase almost linearly with the optical power for all particles, because of the increased temperature gradient. Surprisingly, the escape velocities of the 100 nm Au nanospheres were consistently faster than those for the 200 nm Au nanospheres, in contrast to what has been observed in optical tweezers. To trap a smaller metal nanoparticle using optical tweezers, one needs to increase the optical power to obtain the sufficiently large optical gradient force. To explain the faster escape velocities of the smaller nanoparticles using OTENT, the in-plane temperature gradients were simulated at the planes that are 50 nm and 100 nm above the thermoplasmonic substrate (also see FIG. 52 for the out-of-plane temperature gradients), which are around the spherical centers for 100 nm Au nanospheres and 200 nm Au nanospheres, respectively. An increased temperature gradient is observed at the plane that is 50 nm above the substrate, providing an enhanced thermoelectric field and in turn a larger trapping force. Therefore, compared with optical tweezers, OTENT is more efficient in trapping small nanoparticles at low optical power. OTENT was also applied to trap 400 nm Au nanospheres. There is expected to be no upper limit for the size for metal nanoparticles that can be trapped using OTENT. This is because, despite its increase as a function of particle size, the optical scattering force that prevents trapping is limited at such a low optical power.

In the case of 100 nm Ag nanospheres, the escape velocities were much faster than those for 100 nm Au nanospheres (FIG. 50). This velocity difference can be attributed to the different optical gradient forces experienced by the two types of nanospheres. Specifically, upon excitation by the 532 nm laser beam, the 100 nm Au nanospheres and 100 nm Ag nanospheres exhibit different signs of polarizability and optical gradient force. The optical gradient force is attractive for 100 nm Ag nanospheres with higher-frequency localized surface plasmons, thereby enhancing the trapping stability. In contrast, 100 nm Au nanospheres with lower-frequency localized surface plasmons experience a repulsive optical gradient force, leading to reduced trapping stability (Huang L and Martin O J F. *Opt. Lett.* 2008, 33, 3001-3003; Arias-Gonzalez J R and Nieto-Vesperinas M. *J. Opt. Soc. Am. A* 2003, 20, 1201-1209). Despite of not being dominant at such a low optical power in OTENT, the optical gradient force can still significantly change the trapping stability depending on the polarizability of the nanospheres, as shown in FIG. 50.

Figure 53:
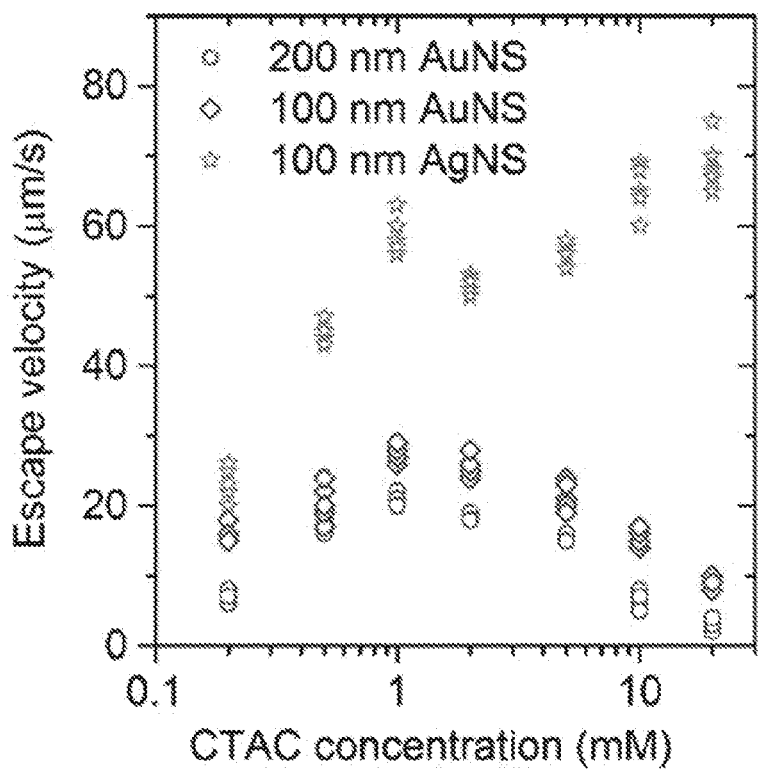
FIG. 53 is the Measured escape velocities of 200 nm Au nanosphere (AuNS, 100 nm Au nanosphere, and 100 nm Ag nanosphere (AgNS) as a function of CTAC concentration.

The trapping stability of different nanoparticles as a function of CTAC concentration was also investigated. According to the migration velocity of the particle under the electric field $$v = -\frac{\varepsilon \zeta}{\eta} E_T,$$

the Helmholtz-Smoluchowski electrophoretic mobility $$\frac{\varepsilon \zeta}{\eta}$$

is linearly dependent on the zeta potential of the particle $\zeta$. An increase of CTAC concentration leads to a higher zeta potential $\zeta$ and in turn to a higher trapping stability. Simultaneously, an increase of CTAC concentration also reduces the Soret coefficient of the micelles and thus the electric field intensity, according to equation 5. In addition, the increase of CTAC concentration will also increase the viscosity of the CTAC solution and thus the Stokes drag force that tries to release the trapped particle. Due to the tradeoff between the CTAC-dependent trapping force and the drag force, a maximum escape velocity was obtained at ~1 mM CTAC for both 100 nm Au nanospheres and 200 nm Au nanospheres (FIG. 53). However, for the 100 nm Ag nanospheres, the escape velocity increased initially, then decreased and increased again when the CTAC concentration was continuously increased. The increased escape velocity above 2 mM CTAC can be attributes to the reduced particle-substrate gap that can lead to an enhanced hydrodynamic boundary effect (Wurger A. *Phys. Rev. Lett.* 2016, 116, 138302). Both the plasmon-enhanced optical gradient force and reduced particle-substrate electrostatic interaction can significantly reduce the gap between the trapped Ag nanosphere and the thermoplasmonic substrate, with the trapping efficiency increasing logarithmically as the Ag nanosphere approaches the substrate. For Au nanospheres, the plasmon-enhanced optical repulsive force arising from the coupling between the Au nanospheres and the incident laser reduces the trapping force from the incident laser, and the balance between the trapping force and the electrostatic repulsive force is achieved at a larger particle-substrate gap, as compared with that observed in the trapping of Ag nanospheres. Thus, the hydrodynamic boundary effect is much weaker in the trapping of Au nanospheres.

Figure 54:
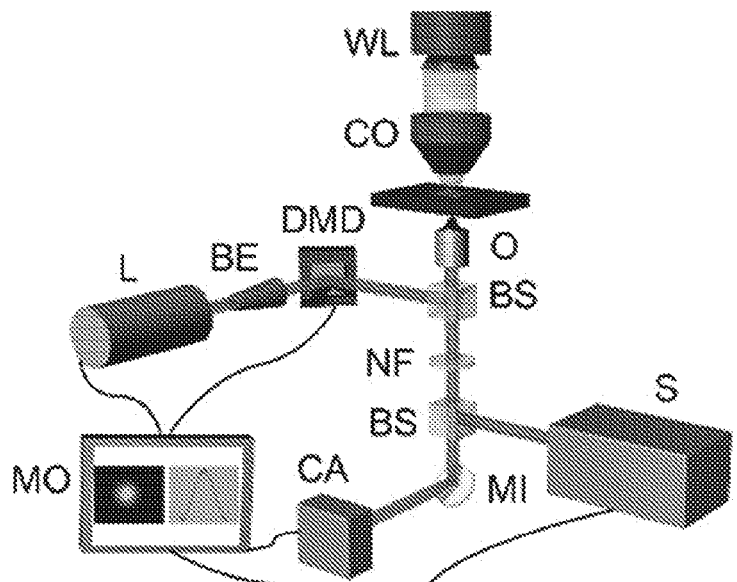
FIG. 54 is a schematic diagram of the optical setup of the OTENT with in-situ dark-field optical imaging and spectroscopy. The listed optical components: L—Laser; BE—Beam expander; DMD—Digital micromirror device; WL—White light; CO—Condenser; O—Objective; BS—Beam splitter; NF—Notch filter; MO—Monitor; CA—Camera; MI—Mirror; S—Spectrometer. For trapping and spectroscopy of Au nanospheres and Ag nanospheres, a 660 nm laser with a 650 nm shortpass filter was used. For trapping and spectroscopy of Au nanotriangles (AuNTs) and Au nanorods (AuNRs), a 532 nm laser with a 533 nm notch filter was used.

To carry out in-situ optical spectroscopy of the trapped metal nanoparticles, a high-performance spectrometer was incorporated into the OTENT, as shown in FIG. 54. For in-situ spectroscopy, the DMD was removed from the optics and a 100× oil objective (Nikon, NA 0.5-1.3) was used to focus the laser beam and to record the scattering signal. An oil condenser (NA 1.43-1.20) was used to focus the incident white light onto the sample from the top. The single-particle scattering spectra of both Ag nanospheres and Au nanospheres were taken when the particles were trapped by a 660 nm laser (without DMD), with a 650 nm shortpass filter inserted between the objective and the spectrometer to block the laser beam. The scattering signal from the trapped metal nanoparticles was directed to a two-dimensional detector in a spectrometer (Andor). Either the 500 nm grating or 860 nm grating was used for detection, depending on the spectral location of the trapped particles. Reference spectra were recorded when the trapped particles were released from the laser spots and the laser was on. The reference spectra were subtracted to get the scattering signal of the trapped particles. The spectra were finally normalized with the light source spectra.

Figure 55:
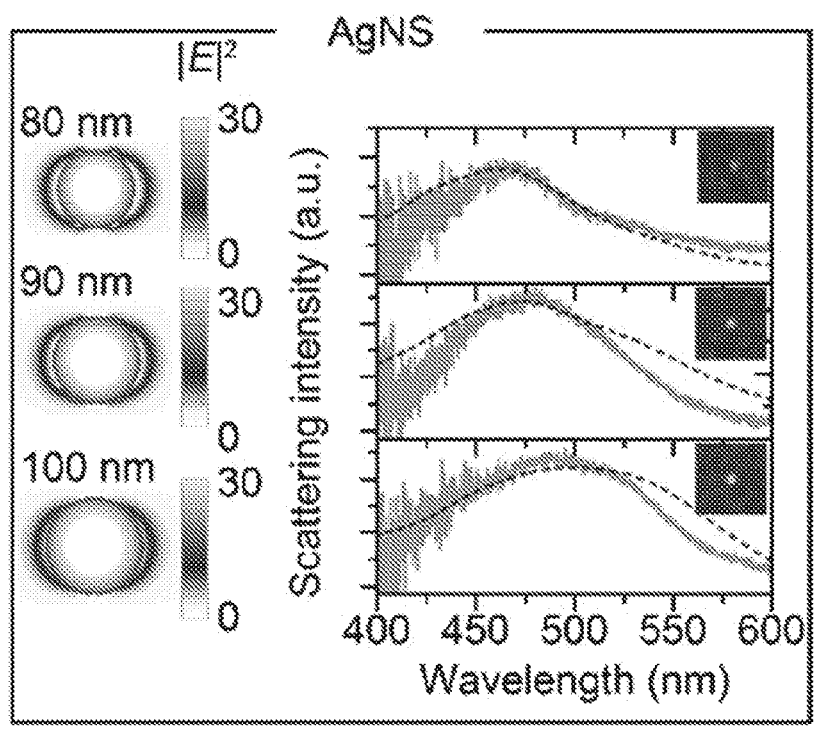
FIG. 55 is the dark-field optical images (insets in right panels), experimental and simulated scattering spectra (right panels), and electric field profiles (left) of single Ag nanospheres with diameters of 80 nm (top), 90 nm (middle) and 100 nm (bottom). The solid and dashed curves represent experimental and simulated scattering spectra, respectively.

Dark-field optical scattering images and spectra were thus recorded from single metal nanoparticles. In FIG. 55, single Ag nanospheres were selectively trapped according to the scattered color from the particles and recorded their scattering spectra (Prikulis J et al. *Nano Lett.* 2004, 4, 115-118). By matching the experimental spectra with the simulated spectra, the sizes of the Ag nanospheres were verified.

The scattering spectra of plasmonic nanoparticles were simulated using FDTD methods (Lumerical FDTD). A refractive index of 1.33 was set for the water environment. A mesh size of 1 nm was applied to define the metal nanoparticles. The electric field distribution was recorded by excitation at the resonant wavelength of the localized surface plasmons.

Figure 56:
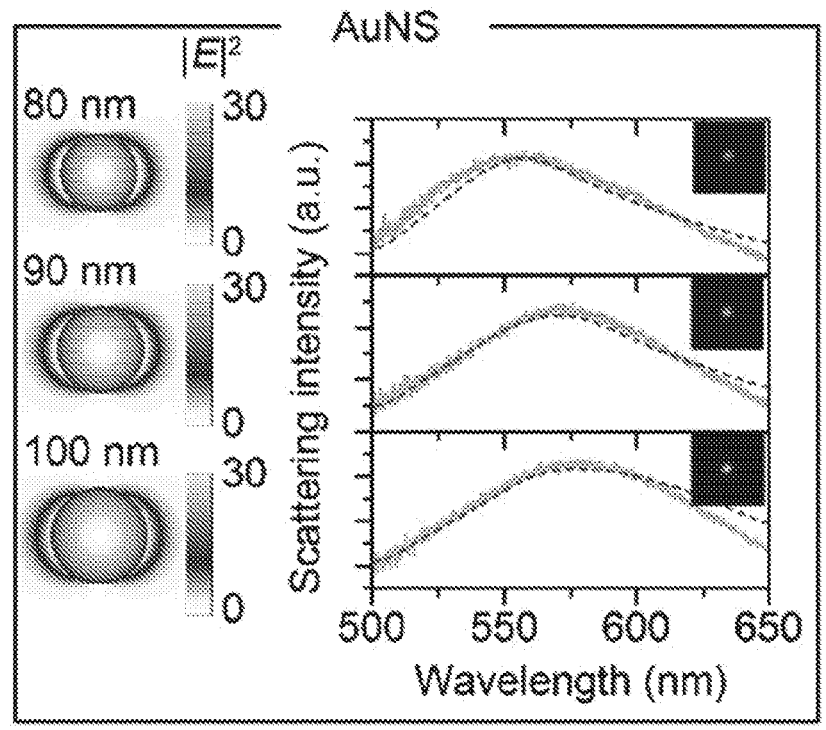
FIG. 56 is the dark-field optical images (insets in right panels), experimental and simulated scattering spectra (right panels), and electric field profiles (left) of single Au nanospheres with diameters of 80 nm (top), 90 nm (middle) and 100 nm (bottom). The solid and dashed curves represent experimental and simulated scattering spectra, respectively.
Figure 57:
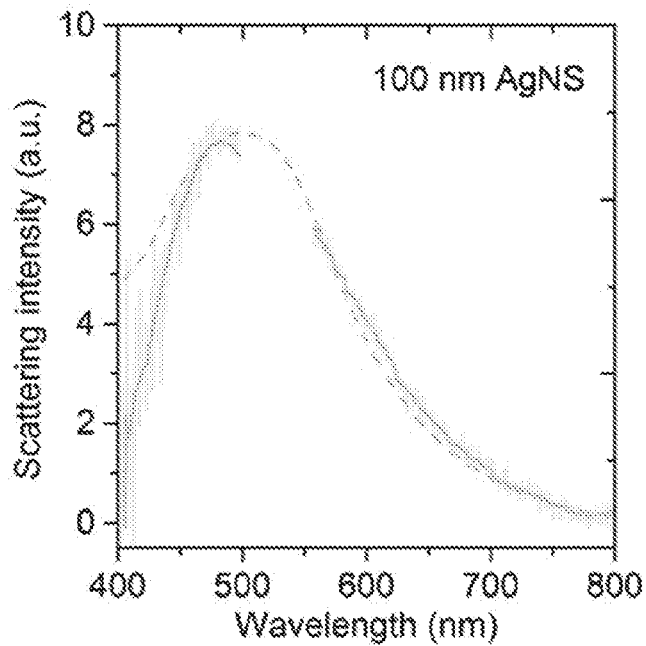
FIG. 57 is the in-situ scattering spectra of a 100 nm Ag nanosphere rapped with a 532 nm laser beam. The solid and dashed curves are the experimental and simulated spectra. Since a 533 nm notch filter was used to record the spectra, the data around 533 nm was removed.
Figure 58:
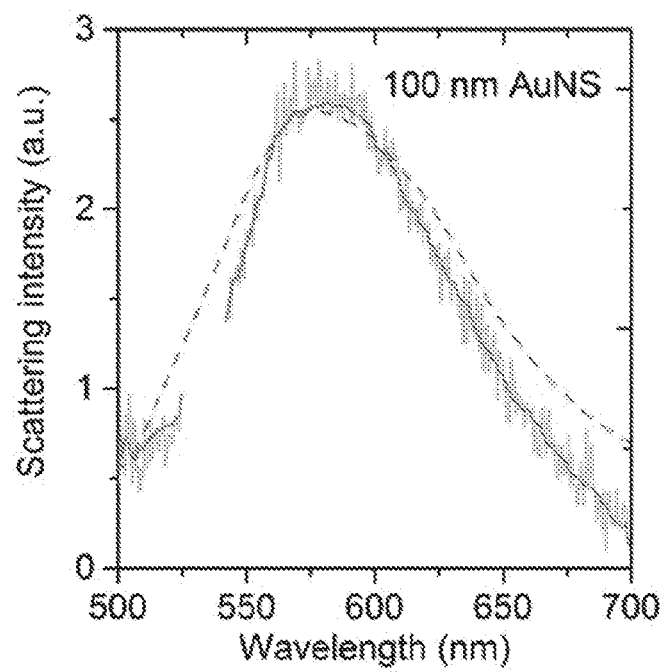
FIG. 58 is the in-situ scattering spectra of a 100 nm Au nanosphere trapped with a 532 nm laser beam. The solid and dashed curves are the experimental and simulated spectra. Since a 533 nm notch filter was used to record the spectra, the data around 533 nm was removed.

The color of Ag nanospheres changes from violet to blue when the diameter increases from 80 nm to 100 nm, with an improved polarizability and reduced electric field enhancement factor. From the in-situ scattering imaging and spectroscopy of single Au nanospheres, it can be seen that the color changes from green to yellow when the diameter of the Au nanospheres increases from 80 nm to 100 nm (FIG. 56), with the localized surface plasmon peak wavelength red-shifting from 556 nm to 578 nm. Optical trapping of metal nanoparticles has certain requirements on the laser wavelength. For example, it would be challenging to trap Au nanospheres with a 532 nm laser using optical tweezers, due to the enhanced repulsive optical force by excitation of the localized surface plasmon. However, with OTENT trapping can be achieved using lasers with working wavelengths either close to or far away from the resonance wavelength of the metal nanoparticle. A 660 nm red laser was used to trap the particles for recording the full spectra in FIG. 55 and FIG. 56. The 532 nm laser can also be used to trap Ag nanospheres (FIG. 57) and Au nanospheres (FIG. 58), which have localized surface plasmons close to the laser wavelength.

Figure 59:
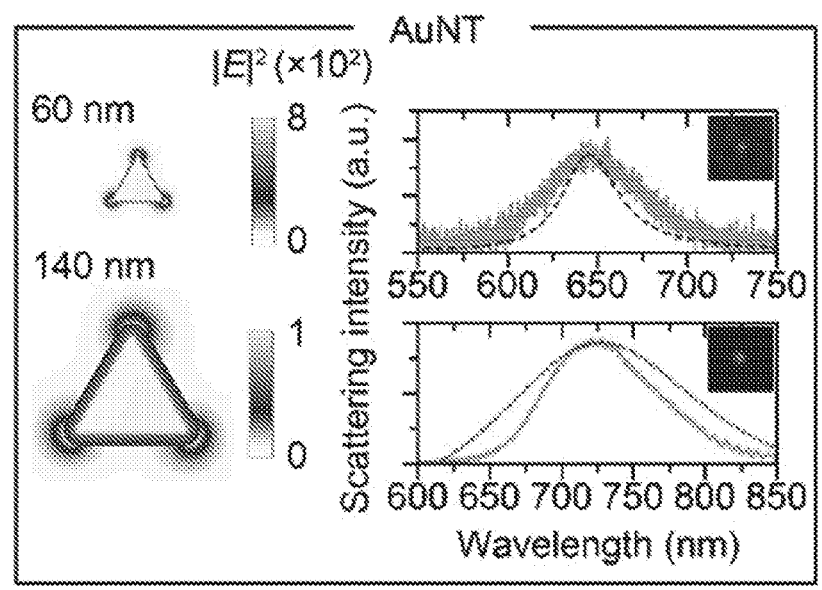
FIG. 59 is the dark-field optical images (insets in right panels), experimental and simulated scattering spectra (right panels), and electric field profiles (left) of single Au nanotriangles with side lengths of 60 nm (top) and 140 nm (bottom). The solid and dashed curves represent experimental and simulated scattering spectra, respectively.
Figure 60:
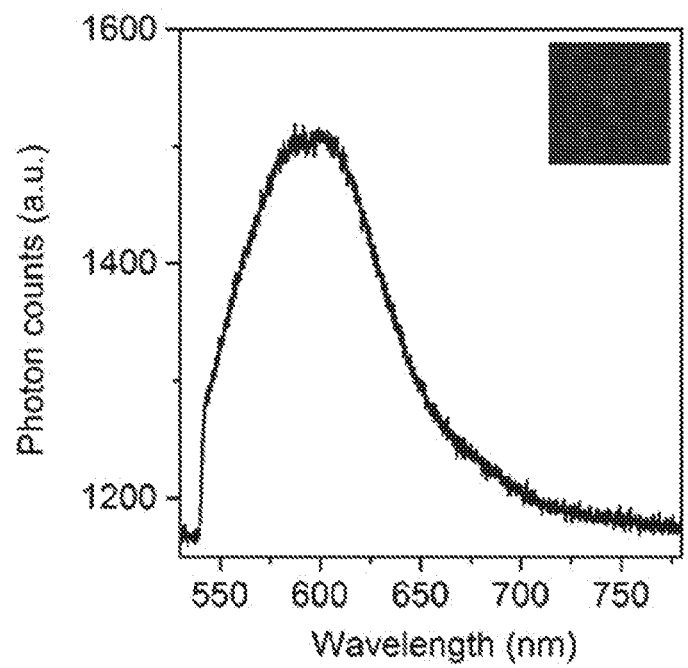
FIG. 60 is the background spectrum of the thermoplasmonic substrate recorded by turning on the 532 nm laser beam without trapping of any particle.
Figure 61:
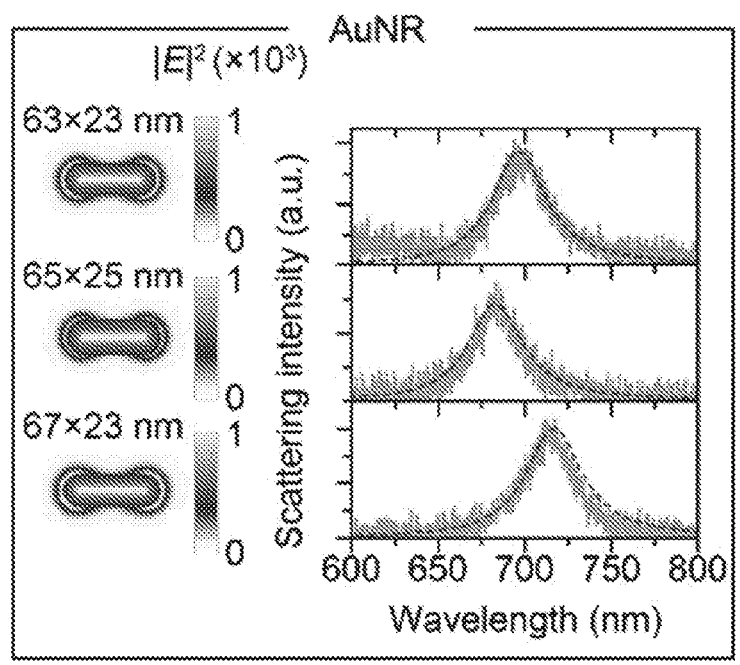
FIG. 61 is the dark-field optical images (insets in right panels), experimental and simulated scattering spectra (right panels), and electric field profiles (left) of single Au nanorods with dimensions of 63 nm×23 nm (top), 65 nm×25 nm (middle), and 67 nm×25 nm (bottom) (length×diameter). The solid and dashed curves represent experimental and simulated scattering spectra, respectively.
Figure 62:
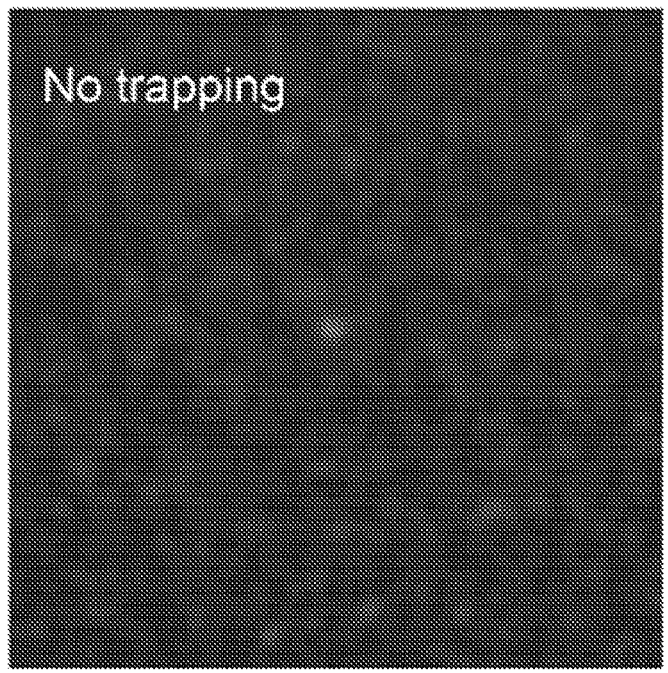
FIG. 62 is the dark-field optical image recorded before a single Au nanorod (AuNR) was trapped by a single 532 nm laser beam.
Figure 63:
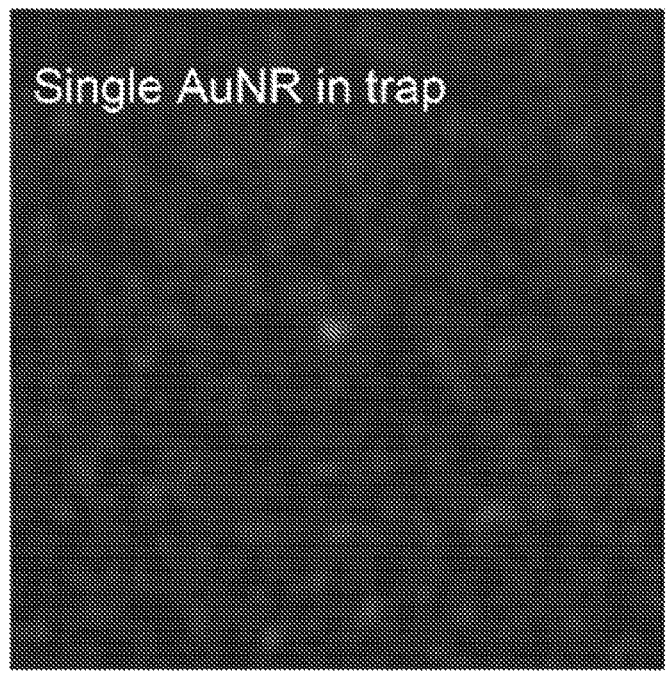
FIG. 63 is the dark-field optical image recorded after a single Au nanorod (AuNR) was trapped by a single 532 nm laser beam. The scattering intensity of the Au nanorod was much weaker than the transmitted laser beam and the fluorescence light from the thermoplasmonic substrate, preventing the observation of the red color from the single Au nanorod.
Figure 64:
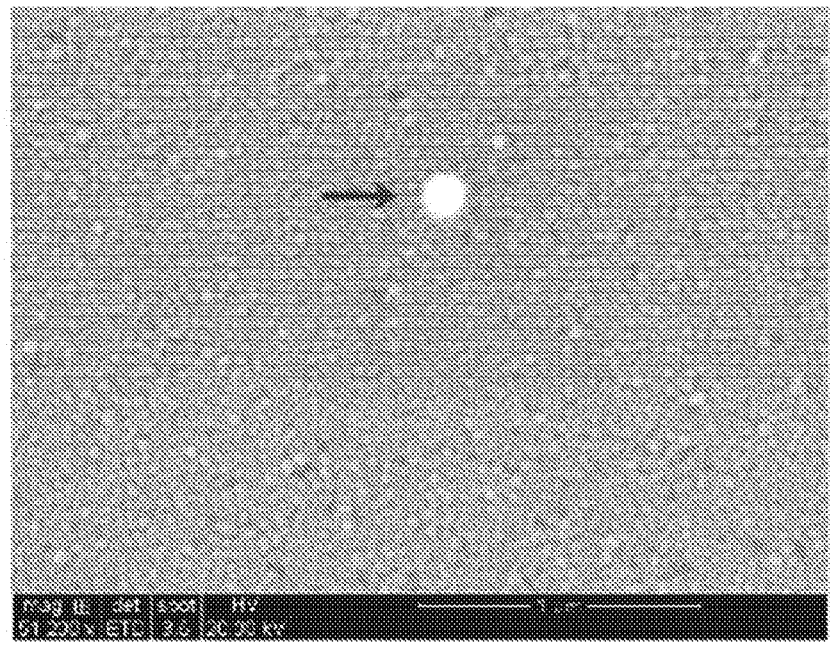
FIG. 64 is a SEM image of a single 100 nm Au nanosphere printed on the thermoplasmonic substrate after being trapped by the opto-thermoelectric nanotweezers (OTENTs). The micrograph further verified the single nanoparticles trapped by our OTENTs. The printed particle is indicated by the arrow. Scale bar: 1 μm.
Figure 65:
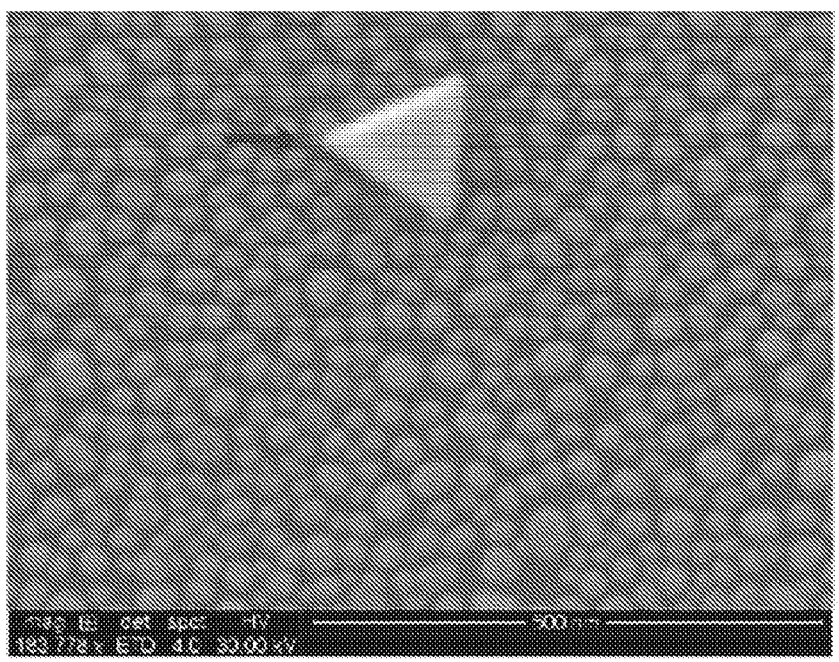
FIG. 65 is a SEM image of a single 150 nm Au nanotriangle printed on the thermoplasmonic substrate after being trapped by the opto-thermoelectric nanotweezers (OTENTs). The micrograph further verified the single nanoparticles trapped by our OTENTs. The printed particle is indicated by the arrow. Scale bar: 500 nm.
Figure 66:
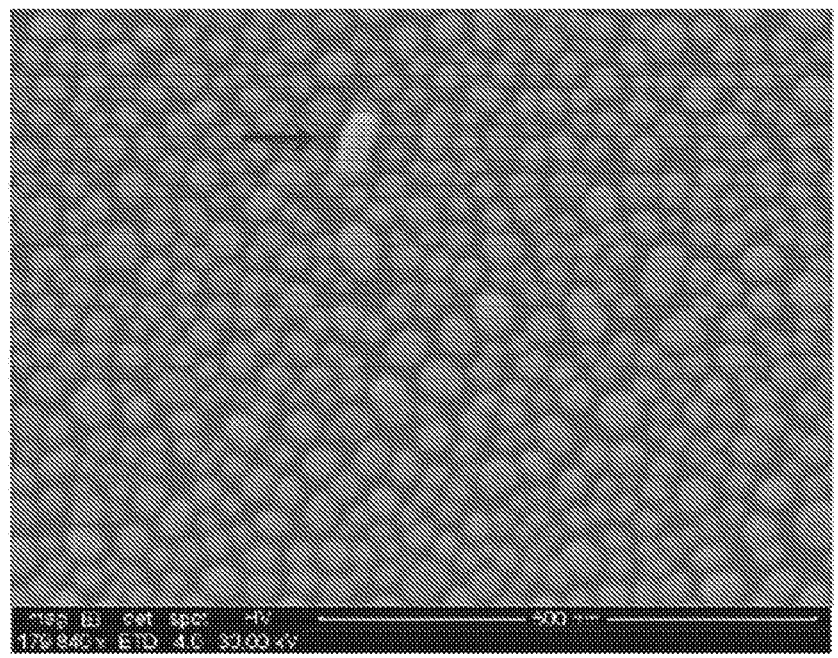
FIG. 66 is a SEM image of a single Au nanorod printed on the thermoplasmonic substrate after being trapped by the opto-thermoelectric nanotweezers (OTENTs). The micrograph further verified the single nanoparticles trapped by our OTENTs. The printed particle is indicated by the arrow. Scale bar: 500 nm.

The versatility of OTENT was explored by trapping nanoparticles with different morphologies. Shown in FIG. 59 is the trapping of single anisotropic Au nanotriangles with side length of 140 nm, which display a scattering peak at 721 nm, with a red color observed by a camera. Even though smaller 60 nm Au nanotriangles, with a blue-shifted localized surface plasmon peak wavelength at 646 nm, were also expected to show a red color, the reduced particle size was found to significantly decrease the polarizability and the scattering intensity. As a result, the trapped 60 nm Au nanotriangle shows a yellow color, which arises from a mixture of the red light scattered by the Au nanotriangle and the fluorescence and scattering light from the thermoplasmonic substrate (FIG. 60). As a further demonstration of the capability of OTENT to trap small metal nanoparticles, stable trapping of single small Au nanorods was achieved without increasing the incident optical power (FIG. 61). The fluorescence light from the thermoplasmonic substrate dominated over the weak scattered light from the single Au nanorod, due to its small size. As a result, an overall green color was observed from the trapped Au nanorod (FIG. 62 and FIG. 63). To further verify that single metal nanoparticles were trapped, the particles were printed on the substrates by increasing the optical power after the particles were trapped at the laser spot, which significantly increases the trapping force to lock the particles on the substrate. The samples were then imaged using scanning electron microscopy (SEM), after the samples were rinsed and dried (FIG. 64-FIG. 66).

Figure 67:
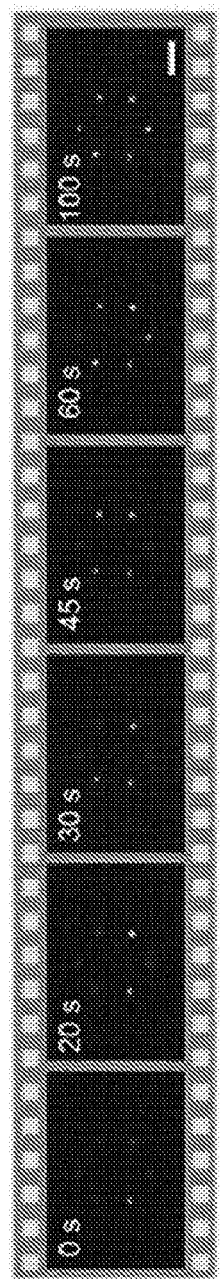
FIG. 67 is a schematic illustration and successive optical images showing parallel trapping of six 100 nm Ag nanospheres into a circular pattern, with six laser beams where each beam traps one Ag nanosphere.
Figure 68:
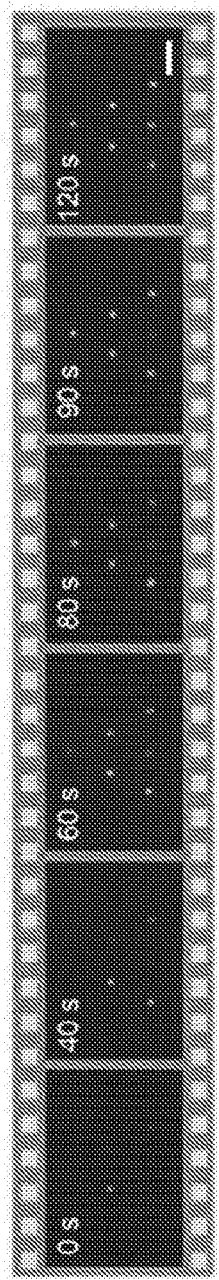
FIG. 68 is a schematic illustration and successive optical images showing parallel trapping of six 150 nm Au nanotriangles into a triangular pattern with six laser beams, where each beam traps one Au nanotriangle.

The arbitrary light manipulation by means of a digital micromirror device (DMD) allows multiple metal nanoparticles to be trapped and manipulated in parallel using OTENT. For the imaging of parallel trapping of both Ag nanospheres and Au nanotriangles, an air condenser (NA 0.95-0.8) was used to focus the white light in the OTENT optical setup. As shown in FIG. 67, six laser beams were created with the DMD to capture six 100 nm Ag nanospheres, with one nanosphere in each beam. The successive dark-field optical images show the six Ag nanospheres trapped into a circle pattern. As another example, six laser beams were created and arranged into a triangular pattern, where each beam trapped a single 150 nm Au nanotriangle (FIG. 68). Such a parallel nanoparticle manipulation represents an opportunity for dynamic lithography at single-particle resolution.

Figure 69:
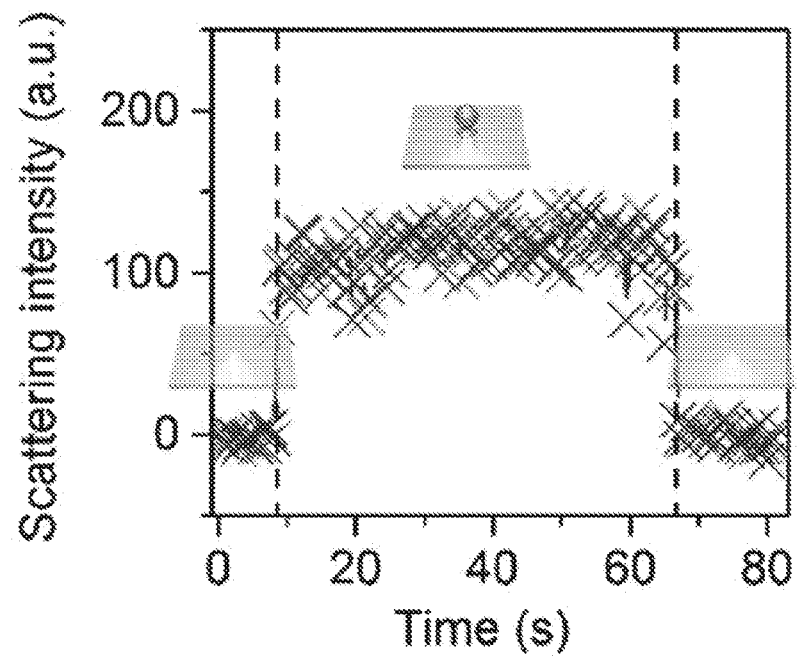
FIG. 69 is the scattering intensity as a function of time, showing the trapping dynamics of a single 100 nm Au nanosphere. The scattering intensity was recorded at a wavelength of 580 nm.
Figure 70:
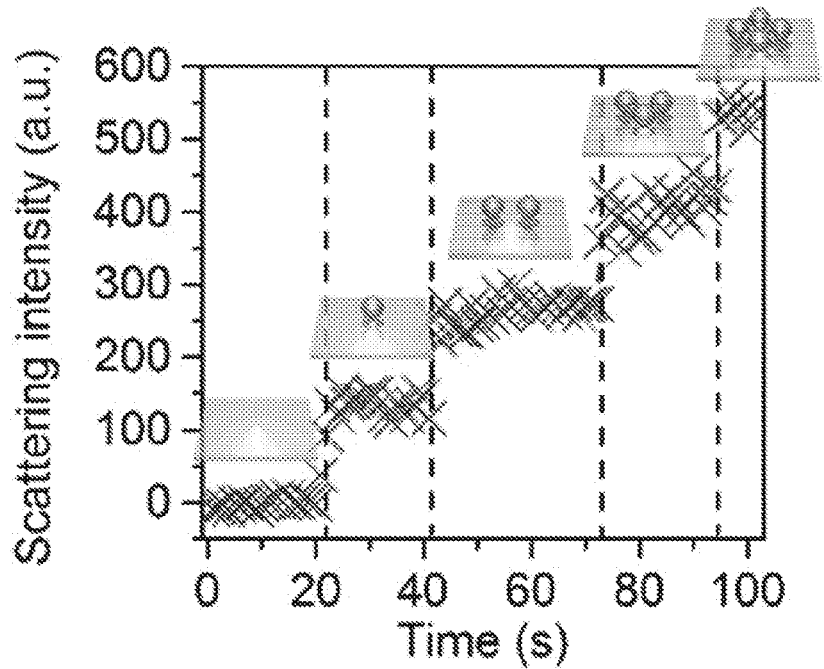
FIG. 70 is the scattering intensity as a function of time showing the trapping dynamics of multiple 100 nm Au nanospheres at a single laser beam. The scattering intensity was recorded at a wavelength of 580 nm.

In-situ monitoring of the trapping dynamics was demonstrated by recording the time-dependent scattering intensity at a specific wavelength. A CTAC concentration of 1 mM was selected to avoid near-field coupling between the trapped particles, and the background from the thermoplasmonic substrate was removed. Once a single 100 nm Au nanosphere was captured by the thermoelectric field, the scattering intensity at 580 nm increased immediately (FIG. 69). The scattering intensity fell back to zero once the particle was released. Without significant near-field coupling between the trapped particles, the number of trapped particles can be estimated according to the photon counts. As shown in FIG. 70, the photon counts increase linearly with the number of Au nanospheres in the trap, which also verifies that no obvious near-field plasmonic coupling occurs to the trapped multiple Au nanospheres in the 1 mM CTAC solution.

Figure 71:
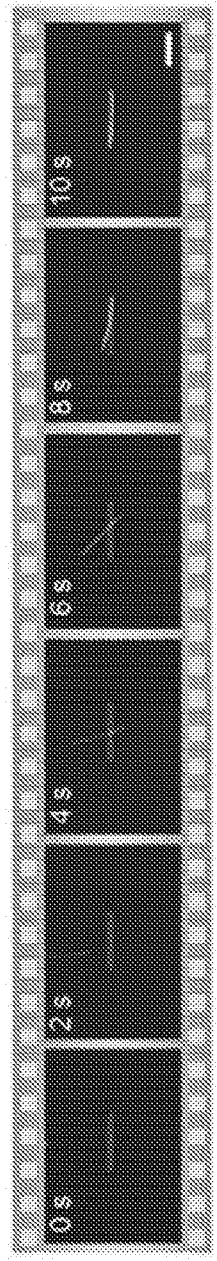
FIG. 71 is a schematic illustration and successive optical images showing the trapping process of a single Ag nanowire (AgNW) with a 1D optical image. Scale bar: 10 μm.
Figure 71:
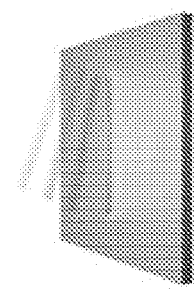
Figure 72:
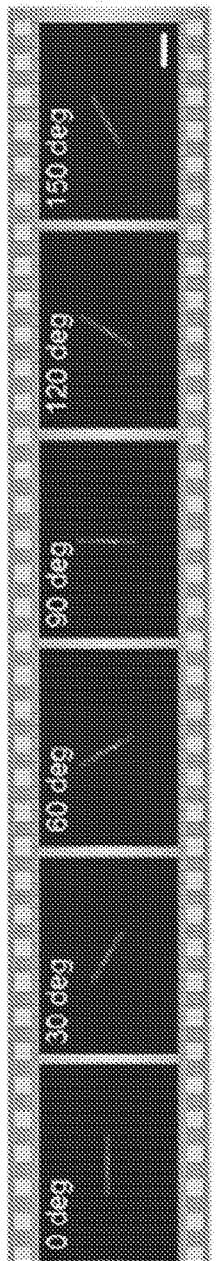
FIG. 72 is a schematic illustration and successive optical images showing the rotation of a single Ag nanowire with a 1D optical image. The grey line represents the 1D optical image. Scale bar: 10 μm.
Figure 72:
Figure 73:
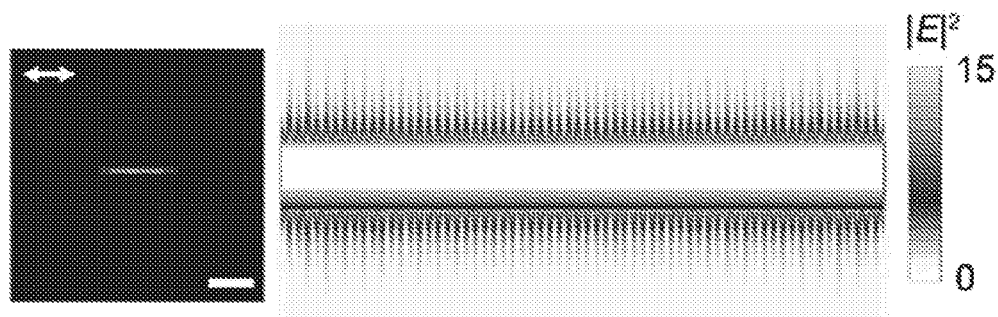
FIG. 73 is the dark-field optical image (left) and simulated electric field intensity (right) when longitudinal surface plasmons are excited along the nanowire ($\lambda$=703 nm). The Ag nanowire has a length of 11.7 μm. The arrows in the optical image show the polarization of the incident white light. Scale bar: 10 μm.
Figure 74:
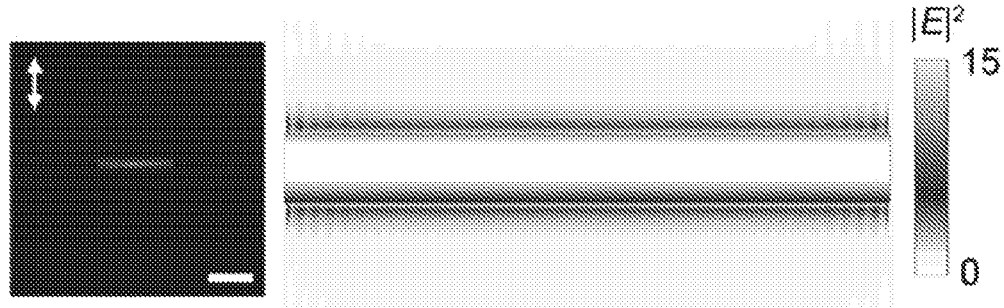
FIG. 74 is the dark-field optical image (left) and simulated electric field intensity (right) when transverse surface plasmons are excited along the nanowire ($\lambda$=420 nm). The Ag nanowire has a length of 11.7 µm. The arrows in the optical image show the polarization of the incident white light. Scale bar: 10 µm.

One-dimensional (1D) metal nanostructures with high aspect ratio (e.g. metal nanowires) can confine surface plasmons on the metal surfaces with longitudinal propagation, which are also known as surface plasmon resonators (Ditlbacher H et al. *Phys. Rev. Lett.* 2005, 95, 257403). The multiple longitudinal plasmon resonances dramatically increase the absorption and scattering of light, which amplify the optical scattering force and make optical trapping extremely challenging (Yan Z et al. *ACS Nano* 2013, 7, 8794-8800; Yan Z et al. *ACS Nano* 2012, 6, 8144-8155; Tong L et al. *Nano Lett.* 2010, 10, 268-273). With its low-power operation and versatility of light management, OTENT can trap metal nanowires with precise location and orientation control. As shown in FIG. 71, a 1D optical image was created on the thermoplasmonic substrate to trap a single Ag nanowire. Different from optical tweezers, which rely on highly focused laser beams, the generated thermoelectric field can be well controlled by rational design of the optical images projected on the substrate. The thermoelectric field exerts a trapping force on the Ag nanowire that tends to align it with the optical image. The alignment allows for further control of the nanowire orientation by rotating the optical image, as shown in FIG. 72. The scattering optical images of the trapped Ag nanowire excited with differently polarized light were also recorded. A linear visible polarizer (Thorlabs) was inserted between the white light source and the condenser to control the incident light polarization for the dark-field imaging of Ag nanowires. When the polarization was tuned along the Ag nanowire, the multiple longitudinal surface plasmons were excited (right panel in FIG. 73), with a bright scattering optical image observed. When the polarization was perpendicular to the Ag nanowire, only the transverse mode ($\lambda$=420 nm) can be excited, with the scattering intensity greatly suppressed (FIG. 74).

Optical heating arising from light absorption and photon-to-phonon conversion is considered as an intrinsic loss in metal nanomaterials, which limits some applications based on plasmonics. In plasmon-enhanced optical trapping, various strategies have been developed to suppress optothermal effects and in turn reduce thermal convection and thermophoresis for improved trapping efficiency. Herein, these optothermal effects are taken advantage of, by developing a low-power optical tweezing technique, termed opto-thermoelectric nanotweezers (OTENT). This technique can be used to trap and manipulate diverse metal nanoparticles by optically heating a thermoplasmonic substrate. A light-directed thermoelectric field can be generated due to spatial separation of dissolved ions within the heating laser spot, which allows metal nanoparticles of a wide range of materials, sizes, and shapes to be confined with single-particle resolution. Dynamic manipulation of the trapped nanoparticles can be accomplished by steering the laser beam or engineering the beam profile. In combination with dark-field optical imaging, nanoparticles can be selectively trapped and their spectroscopic response can be resolved in-situ. Besides their conventional role in surface modification of metal nanoparticles, ionic surfactants were further exploited to act as micellar ions that create light-controlled thermoelectric fields. As a general tweezing technique, OTENT is applicable to a wide range of metal, semiconductor, polymer and dielectric nanostructures, using various ionic surfactants such as CTAB and SDS. With its simple and flexible optics, simple fabrication of the substrate, low-power and non-invasive operation, diverse options in the trapping wavelength, and generality in the size, shape, and composition of the trapped nanoparticles, OTENT can become a powerful tool in colloid science, life sciences and nanotechnology.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method comprising:
    illuminating a first location of a plasmonic substrate with electromagnetic radiation at a power density of 0.1 mW/µm2 or less;
        wherein the electromagnetic radiation comprises a wavelength that overlaps with at least a portion of the plasmon resonance energy of the plasmonic substrate such that the plasmonic substrate converts at least a portion of the electromagnetic radiation into thermal energy by plasmon-enhanced photothermal effects; and
        wherein the plasmonic substrate is in thermal contact with a liquid sample comprising a plurality of capped metal particles and a surfactant, the liquid sample having a first temperature;
        wherein the plurality of capped metal particles comprise a plurality of metal particles capped with a capping material;
        wherein the capping material comprises a cationic material or an anionic material, such that the plurality of capped metal particles have a surface charge;
        wherein the surfactant comprises a cationic surfactant or an anionic surfactant, such that the surfactant has a charge;
        wherein the surface charge of the plurality of capped metal particles and the charge of the surfactant are both positive or are both negative; thereby,
        generating a first confinement region at a location in the liquid sample proximate to the first location of the plasmonic substrate by plasmon-enhanced photothermal effects, wherein at least a portion of the first confinement region has a second temperature that is greater than the first temperature such that the first confinement region is bound by a temperature gradient;
    repulsing at least a portion of the surfactant from the first confinement region via thermophoresis, such that the surfactant has a nonuniform concentration in the liquid sample, thereby inducing a thermoelectric field within the liquid sample; and
    trapping at least a portion of the plurality of capped metal particles within the first confinement region via thermophoresis and a thermoelectric effect, said portion of the plurality of capped metal particles being a trapped portion of the plurality of capped metal particles.

2. The method of claim 1, wherein the electromagnetic radiation is provided by a light source and the light source is a laser.

3. The method of claim 2, wherein the light source is configured to illuminate a mirror and the mirror is configured to reflect the electromagnetic radiation from the light source to illuminate the first location of the plasmonic substrate.

4. The method of claim 3, wherein the mirror comprises a digital micromirror device.

5. The method of claim 1, wherein the plasmonic substrate comprises a plurality of plasmonic particles and the plurality of plasmonic particles comprise a metal selected from the group consisting of Au, Ag, Al, and combinations thereof.

6. The method of claim 1, wherein the capping material and the surfactant are the same material.

7. The method of claim 1, wherein the surfactant is selected from the group consisting of cetrimonium bromide (CTAB), cetrimonium chloride (CTAC), sodium dodecyl sulfate (SDS), and combinations thereof.

8. The method of claim 1, wherein the surfactant has a concentration in the liquid sample and the concentration of the surfactant in the liquid sample is above the critical micelle concentration of the surfactant, such that the surfactant forms a plurality of surfactant micelles in the liquid sample.

9. The method of claim 1, wherein the trapped portion of the plurality of capped metal particles is one capped metal particle.

10. The method of claim 1, wherein the trapped portion of the plurality of capped metal particles is further trapped by an electrostatic force, a van der Waals force, or combinations thereof.

11. The method of claim 1, further comprising illuminating a second location of the plasmonic substrate thereby:
    generating a second confinement region at a location in the liquid sample proximate to the second location of the plasmonic substrate by plasmon-enhanced photothermal effects, wherein at least a portion of the second confinement region has a third temperature that is greater than the first temperature such that the second confinement region is bound by a temperature gradient; and
    translocating the trapped portion of the plurality of capped metal particles from the first confinement region to the second confinement region, trapping at least a second portion of the plurality of capped metal particles within the second confinement region, or a combination thereof.

12. The method of claim 11, wherein:
    the plasmonic substrate is translocated to illuminate the second location;

the electromagnetic radiation is provided by a light source and:
  the light source is translocated to illuminate the second location; or
  the light source is configured to illuminate a mirror and the mirror is configured to reflect the electromagnetic radiation from the light source to illuminate the plasmonic substrate, and the mirror is translocated to illuminate the second location;
or a combination thereof.

13. The method of claim 1, wherein the plasmonic substrate comprises a portion of a substrate, the substrate further comprising a non-plasmonic portion and wherein the substrate is in thermal contact with the liquid sample, wherein the method further comprises illuminating a location of the non-plasmonic portion of the substrate, thereby:
  generating a second confinement region at a location in the liquid sample proximate to the location of the non-plasmonic portion of the substrate, wherein at least a portion of the second confinement region has a third temperature that is greater than the first temperature such that the second confinement region is bound by a temperature gradient; and
  translocating the trapped portion of the plurality of capped metal particles from the first confinement region to the second confinement region.

14. The method of claim 13, wherein:
the substrate is translocated to illuminate the location of the non-plasmonic portion of the substrate;
the electromagnetic radiation is provided by a light source and:
  the light source is translocated to illuminate the location of the non-plasmonic portion of the substrate; or
  the light source is configured to illuminate a mirror and the mirror is configured to reflect the electromagnetic radiation from the light source to illuminate the substrate, and the mirror is translocated to illuminate the location of the non-plasmonic portion of the substrate;
or a combination thereof.

15. The method of claim 13, wherein the non-plasmonic portion of the substrate comprises glass, quartz, silicon dioxide, a polymer, or a combination thereof.

16. The method of claim 1, wherein the trapping of the trapped portion of the plurality of capped metal particles is reversible.

17. The method of claim 1, further comprising removing the illumination, such that the temperature of the liquid sample equilibrates, thereby:
  eliminating the first confinement region;
  redispersing the surfactant in the liquid sample, such that the surfactant has a uniform concentration in the liquid sample; and
  releasing the trapped portion of the plurality of capped metal particles.

* * * * *

UNITED STATES PATENT AND TRADEMARK OFFICE
CERTIFICATE OF CORRECTION

PATENT NO. : 11,060,976 B2  
APPLICATION NO. : 16/331249  
DATED : July 13, 2021  
INVENTOR(S) : Yuebing Zheng et al.

Page 1 of 1

It is certified that error appears in the above-identified patent and that said Letters Patent is hereby corrected as shown below:

In the Claims

• In Claim 1, at Column 43, Lines 63-64 should read:  
"both positive or are both negative;  
thereby:  
generating a first confinement region at a location in the"

• In Claim 12, at Column 45, Line 5, should read:  
"the light source is configured to illuminate a mirror, and"

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*